(12) United States Patent
Iida et al.

(10) Patent No.: US 11,953,135 B2
(45) Date of Patent: Apr. 9, 2024

(54) FITTING ASSEMBLY FOR FLUID DEVICE

(71) Applicant: NIPPON PILLAR PACKING CO., LTD., Osaka (JP)

(72) Inventors: Toshihide Iida, Osaka (JP); Tatsuya Fujii, Osaka (JP); Katsunori Sugita, Osaka (JP); Takahito Konishi, Osaka (JP); Tomoyuki Koike, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 281 days.

(21) Appl. No.: 16/608,402

(22) PCT Filed: Jun. 15, 2018

(86) PCT No.: PCT/JP2018/023024
§ 371 (c)(1),
(2) Date: Oct. 25, 2019

(87) PCT Pub. No.: WO2019/009049
PCT Pub. Date: Jan. 10, 2019

(65) Prior Publication Data
US 2021/0108747 A1    Apr. 15, 2021

(30) Foreign Application Priority Data

Jul. 4, 2017 (JP) ................. 2017-130823
Jul. 4, 2017 (JP) ................. 2017-130824
Jul. 4, 2017 (JP) ................. 2017-130825

(51) Int. Cl.
*F16L 37/098* (2006.01)
*F16L 37/107* (2006.01)

(52) U.S. Cl.
CPC ........... *F16L 37/098* (2013.01); *F16L 37/107* (2013.01)

(58) Field of Classification Search
CPC ....... F16L 19/005; F16L 25/12; F16L 37/098; F16L 37/0985; F16L 37/252; F16L 47/04; F16L 37/113
(Continued)

(56) References Cited

U.S. PATENT DOCUMENTS

| 489,107 | A | * | 1/1893 | Storz | ............... F16L 37/252 |
| | | | | | 285/379 |
| 770,049 | A | * | 9/1904 | Dorgans | ............ F16L 37/113 |
| | | | | | 285/70 |

(Continued)

FOREIGN PATENT DOCUMENTS

| CH | 386 790 | 1/1965 |
| CN | 102016364 A | 4/2011 |

(Continued)

OTHER PUBLICATIONS

International Search Report dated Aug. 21, 2018 in PCT/JP2018/023024 filed on Jun. 15, 2018.

(Continued)

*Primary Examiner* — Matthew Troutman
*Assistant Examiner* — Alexander T Rufrano
(74) *Attorney, Agent, or Firm* — Oblon, McClelland, Maier & Neustadt, L.L.P.

(57) ABSTRACT

A fitting assembly for fluid device is provided, which includes a first port, a second port, a first annular member, a second annular member, and a connector. The first port is annular and installed at a first fluid device to be connected with its first fluid channel. The second port is annular and installed at a second fluid device to be connected with its second fluid channel. The first annular member is installed at the first port and has a first coupler. The second annular member is installed at the second port and has a second coupler to be coupled with the first coupler to fix the second (Continued)

annular member to the first annular member. The connector is installed between the first port and the second port and seals gaps between the connector and the first and second ports.

4 Claims, 28 Drawing Sheets

(58) Field of Classification Search
USPC .......................................................... 285/92
See application file for complete search history.

(56) References Cited

U.S. PATENT DOCUMENTS

| | | | | |
|---|---|---|---|---|
| 882,497 | A | * | 3/1908 | Gunnell ................ F16L 37/252 285/379 |
| 1,112,850 | A | * | 10/1914 | Sherer .................. F16L 37/252 285/84 |
| 1,584,278 | A | * | 5/1926 | Dessaints ............. F16L 37/113 285/332.1 |
| 1,794,905 | A | | 3/1931 | Kass |
| 1,860,038 | A | * | 5/1932 | Lange ................... F16L 37/113 285/99 |
| 2,862,731 | A | | 12/1958 | Hedden et al. |
| 4,523,778 | A | * | 6/1985 | Ebert .................... F16L 37/113 285/73 |
| 4,619,470 | A | * | 10/1986 | Overath ................ F16L 23/02 285/55 |
| 4,913,657 | A | * | 4/1990 | Naito .................... F16L 25/01 439/194 |
| 5,078,429 | A | * | 1/1992 | Braut ................... F16L 37/098 285/4 |
| 5,228,724 | A | | 7/1993 | Godeau |
| 5,547,229 | A | | 8/1996 | Eidsmore |
| 5,636,876 | A | | 6/1997 | Eidsmore |
| 5,645,302 | A | * | 7/1997 | Horimoto ............. F16L 37/004 285/70 |
| 5,738,143 | A | * | 4/1998 | Faughn ................ F16L 37/113 137/614.03 |
| 5,743,572 | A | | 4/1998 | Nishio |
| 5,857,713 | A | * | 1/1999 | Horimoto ............. F16L 37/252 285/119 |
| 6,106,030 | A | | 8/2000 | Nader et al. |
| 7,207,605 | B2 | | 4/2007 | Olechnowicz et al. |
| 8,740,254 | B2 | * | 6/2014 | Mason .................. F16L 57/005 285/376 |
| 9,791,084 | B2 | * | 10/2017 | Fujii ..................... F16L 19/028 |
| 9,879,809 | B2 | * | 1/2018 | Horimoto ............. F16L 37/113 |
| 11,174,971 | B2 | * | 11/2021 | Chen .................... F16L 23/22 |
| 2001/0040378 | A1 | | 11/2001 | Babuder et al. |
| 2006/0070437 | A1 | | 4/2006 | Diederichs |
| 2009/0072536 | A1 | * | 3/2009 | Katsura ............... F16L 19/0231 285/345 |
| 2011/0031745 | A1 | | 2/2011 | Nakata et al. |
| 2012/0013119 | A1 | | 1/2012 | Johnson |
| 2014/0300106 | A1 | | 10/2014 | Kim et al. |
| 2015/0176744 | A1 | | 6/2015 | Glassman et al. |
| 2018/0299042 | A1 | | 10/2018 | Ishibashi et al. |

FOREIGN PATENT DOCUMENTS

| | | | |
|---|---|---|---|
| CN | 203363493 U | * | 12/2013 |
| DE | 35 36 784 A1 | | 4/1987 |
| DE | 10 2014 220 012 A1 | | 4/2016 |
| EP | 0 937 935 A1 | | 8/1999 |
| EP | 1 909 017 A1 | | 4/2008 |
| GB | 173261 | | 12/1921 |
| JP | 57-117491 U | | 7/1982 |
| JP | 2568470 Y2 | * | 12/1991 |
| JP | 6-1 4681 U | | 2/1994 |
| JP | 6-80090 U | | 11/1994 |
| JP | 7-233887 A | | 9/1995 |
| JP | 10-54489 A | | 2/1998 |
| JP | 2568470 Y2 | * | 4/1998 |
| JP | 10-507247 A | | 7/1998 |
| JP | 2001-516862 A | | 10/2001 |
| JP | 2006-83972 A | | 3/2006 |
| JP | 2008-51 4957 A | | 5/2008 |
| JP | 2017-67176 A | | 4/2017 |
| JP | 2018013185 A | * | 1/2018 |
| WO | WO 2016/167100 A1 | | 10/2016 |

OTHER PUBLICATIONS

Chinese Office Action dated Nov. 27, 2020, in Chinese Patent Application No. 201880028421.1 (with English translation), 19 pages.
Extended European Search Report dated Mar. 17, 2021 in European Patent Application No. 18828286.7, 7 pages.
Office Action dated Mar. 12, 2021 in corresponding Japanese Patent Application No. 2017/130823 (with English Translation), 14 pages.
Office Action dated Nov. 20, 2020 in corresponding Japanese Patent Application No. 2017-130824 (with English Translation), 15 pages.
Korean Office Action dated Jan. 27, 2023 in Korean Patent Application No. 10-2019-7031399 (wht English Translation), 10 pages.

* cited by examiner

FITTING ASSEMBLY FOR FLUID DEVICE

TECHNICAL FIELD

The invention relates to fitting assemblies for fluid device.

BACKGROUND ART

Fluid devices installed in manufacturing equipment used in fields such as manufacture of semiconductors, drugs and medical supplies, food processing, and chemical industry, are connected with each other through pipe fittings described in Patent Literature 1. In application to such manufacturing equipment, it is preferable to connect a first fluid device, which is equipped with a first fitting, with a second fluid device, which is equipped with a second fitting, to allow fluid to flow from one of the fluid devices to the other. In this case, an additional member such as a tube connects the first fitting with the second fitting.

CITATION LIST

Patent Literature

[Patent Literature 1]
Japanese Unexamined Patent Application Publication No. H10-54489 A

SUMMARY OF INVENTION

Conventional fitting assemblies for fluid device each need a tube to connect the first fluid device with the second fluid device through the first and second fittings such that the first and second fluid devices allow fluid to flow between each other. In addition, the first and second fittings each need an inner ring and a union nut of relatively large axial size to couple a longitudinal end of the tube with the first or second fitting.

Accordingly, such connection between the first and second fluid devices requires space for the tube and the inner rings and union nuts between the first and second fittings. This prevents reduction in space for installation of the first and second fluid devices.

In view of the above-mentioned problems, the invention is conceived. An object of the invention is to provide a fitting assembly that can reduce space for installation of fluid devices.

The first invention is a fitting assembly for fluid device connecting a first fluid device with a second fluid device. The fitting assembly includes a first port, a second port, a first annular member, a second annular member, and a connector. The first port is annular, installed at the first fluid device, and connected with a first fluid channel of the first fluid device. The second port is annular, installed at the second fluid device, and connected with a second fluid channel of the second fluid device. The first annular member is installed at the first port and has a first coupler. The second annular member is installed at the second port and has a second coupler coupled with the first coupler to fix the second annular member to the first annular member. The connector is installed between the first port and the second port, seals a gap between the connector and the first port, and seals a gap between the connector and the second port.

This fitting assembly can continue to fix the first and second annular members, while it can connect the first fluid device with the second fluid device to allow fluid to flow between the first and second fluid devices. In addition, the fitting assembly can prevent fluid leakage from the junction of the fluid devices. The fitting assembly needs no member such as a tube between the first and second fluid devices to connect the first fluid device with the second fluid device such that fluid can flow between the first and second fluid devices. Accordingly, the first fluid device is placed as close to the second fluid device as possible to reduce space for installation of the first and second fluid devices.

According to the first invention, the first annular member may include a first body and a first hook, and the second annular member may include a second body and a second hook or a hook rest. The first body is placed on an outer periphery of the first port and fixed to the first port. The first hook is installed at the first body, protrudes in an axial direction of the first annular member, and is bendable with respect to the first body. The second body is placed on an outer periphery of the second port and fixed to the second port. The second hook or the hook rest faces the first hook and is to be coupled with the first hook. The second hook or the hook rest is installed at the second body and protrudes in an axial direction of the second annular member. The first annular member and the second annular member may be inhibited from separating from each other when the first hook is coupled with the second hook or the hook rest.

The first port may have the same shape as the second port, and the first annular member may have the same shape as the second annular member.

The first port and the second port may be arranged coaxially and connected with each other only through the connector.

The connector may include an extending portion between the first port and the second port.

The second invention is a fitting assembly for fluid device connecting a first fluid device with a second fluid device. The fitting assembly includes a first port, a second port, a first annular member, a second annular member, a connector, and a securing member. The first port is annular, installed at the first fluid device, and connected with a first fluid channel of the first fluid device. The second port is annular, installed at the second fluid device, and connected with a second fluid channel of the second fluid device. The first annular member is installed radially outside the first port. The second annular member is installed radially outside the second port. The connector is installed between the first port and the second port, seals a gap between the connector and the first port, and seals a gap between the connector and the second port. The securing member secures one of the first annular member and the second annular member to the other to bring the one closer to the other when the connector is installed between the first port and the second port.

This fitting assembly uses the securing member to connect the first fluid device with the second fluid device to allow fluid to flow between the first and second fluid devices. The fitting assembly needs no member such as a tube between the first and second fluid devices to connect the first fluid device with the second fluid device such that fluid can flow between the first and second fluid devices. Accordingly, the first fluid device is placed as close to the second fluid device as possible to reduce space for installation of the first and second fluid devices. In addition, two sealing portions can prevent fluid leakage from the junction of the fluid devices.

According to the second invention, the first annular member and the second annular member may face each other.

The first annular member may have a first tapered portion, and the second annular member may have a second tapered portion. The securing member may include a first slope and a second slope. The first slope is in contact with the first tapered portion in an axial direction of the first annular member. The second slope is in contact with the second tapered portion in an axial direction of the second annular member.

The connector may include an extending portion between the first port and the second port.

The first port may have the same shape as the second port.

The third invention is a fitting assembly for fluid device connecting a first fluid device with a second fluid device. The fitting assembly includes a first port, a second port, a first annular member, a second annular member, and a connector. The first port is annular, installed at the first fluid device, and connected with a first fluid channel of the first fluid device. The second port is annular, installed at the second fluid device, and connected with a second fluid channel of the second fluid device. The first annular member is installed at the first port and has a first thread on an outer periphery. The second annular member is installed at the second port and has a second thread on an inner periphery. The second thread can engage with the first thread to fix the second annular member to the first annular member. The connector is installed between the first port and the second port, seals a gap between the connector and the first port, and seals a gap between the connector and the second port.

This fitting assembly can continue to fix the first and second annular members, while it can connect the first fluid device with the second fluid device to allow fluid to flow between the first and second fluid devices. In addition, the fitting assembly can prevent fluid leakage from the junction of the fluid devices. The fitting assembly needs no member such as a tube between the first and second fluid devices to connect the first fluid device with the second fluid device such that fluid can flow between the first and second fluid devices. Accordingly, the first fluid device is placed as close to the second fluid device as possible to reduce space for installation of the first and second fluid devices.

The first annular member may radially face the second annular member.

The first port may be fixed to the first annular member with a third thread, and/or the second port may be fixed to the second annular member with a fourth thread. The direction in which the first thread and the second thread wrap may be opposite to the direction in which the third thread and the fourth thread wrap.

The connector may include an extending portion between the first port and the second port.

The first port may have the same shape as the second port.

The inventions can each reduce space for installation of the first and second fluid devices.

DESCRIPTION OF EMBODIMENTS

A first embodiment of the first invention will be explained with reference to the drawings.

Figure 1:
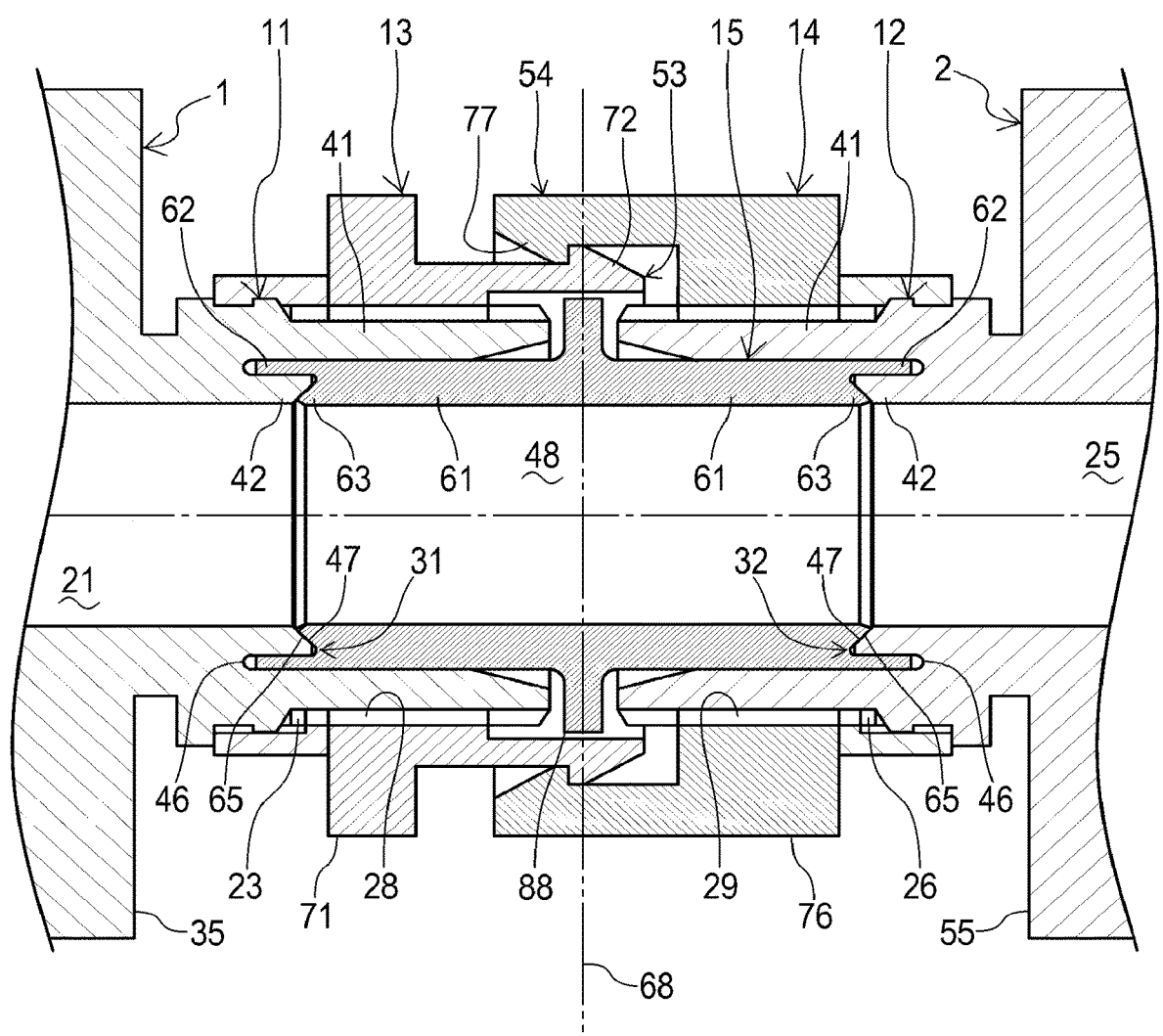
FIG. 1 is a cross-sectional view of a fitting assembly for fluid device according to a first embodiment of the first invention.
Figure 2:
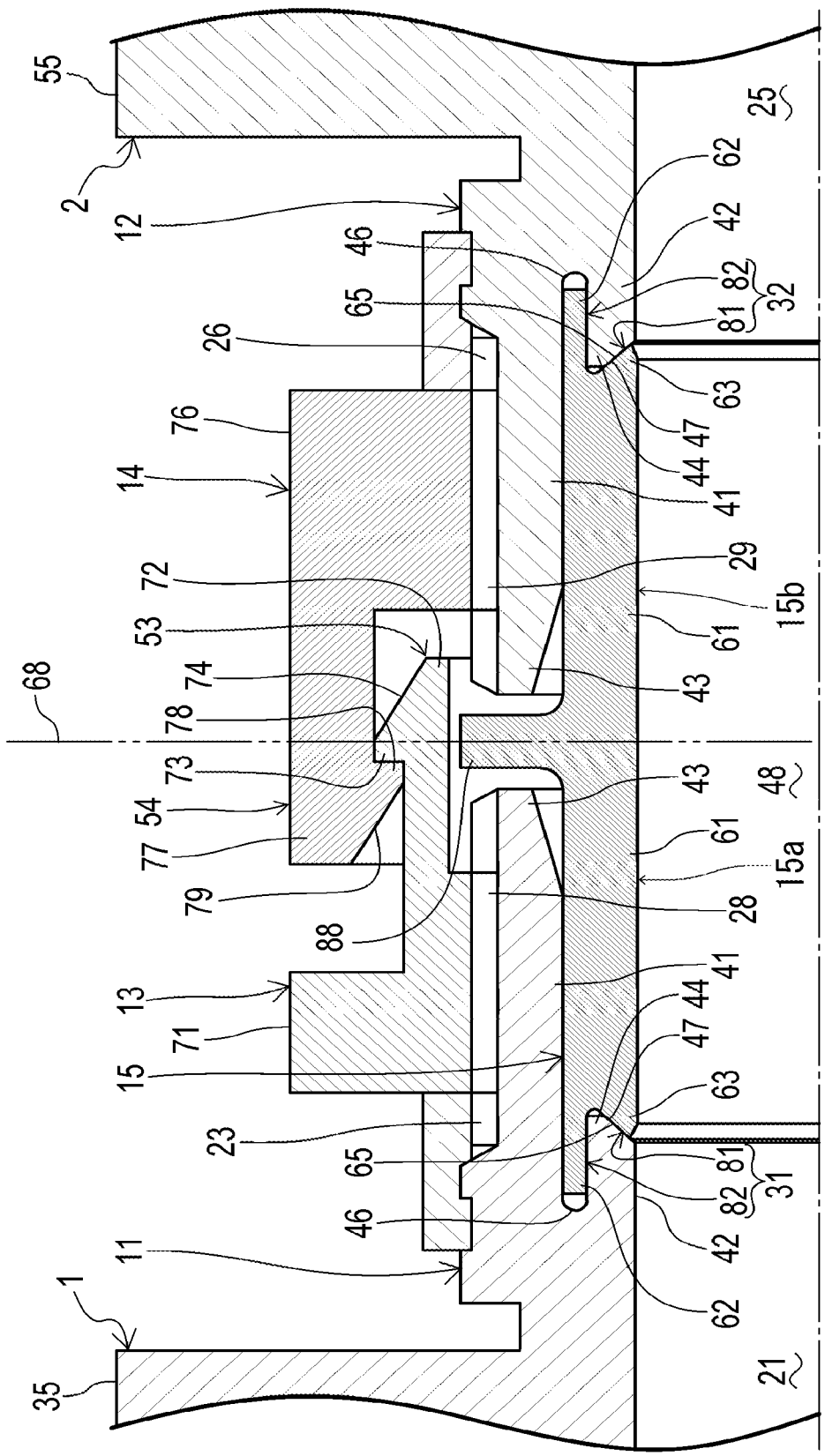
FIG. 2 is a partially enlarged view of FIG. 1.

FIG. 1 is a cross-sectional view of a fitting assembly for fluid device according to the first embodiment of the first invention. FIG. 2 is a partially enlarged view of FIG. 1. FIG.

Figure 4:
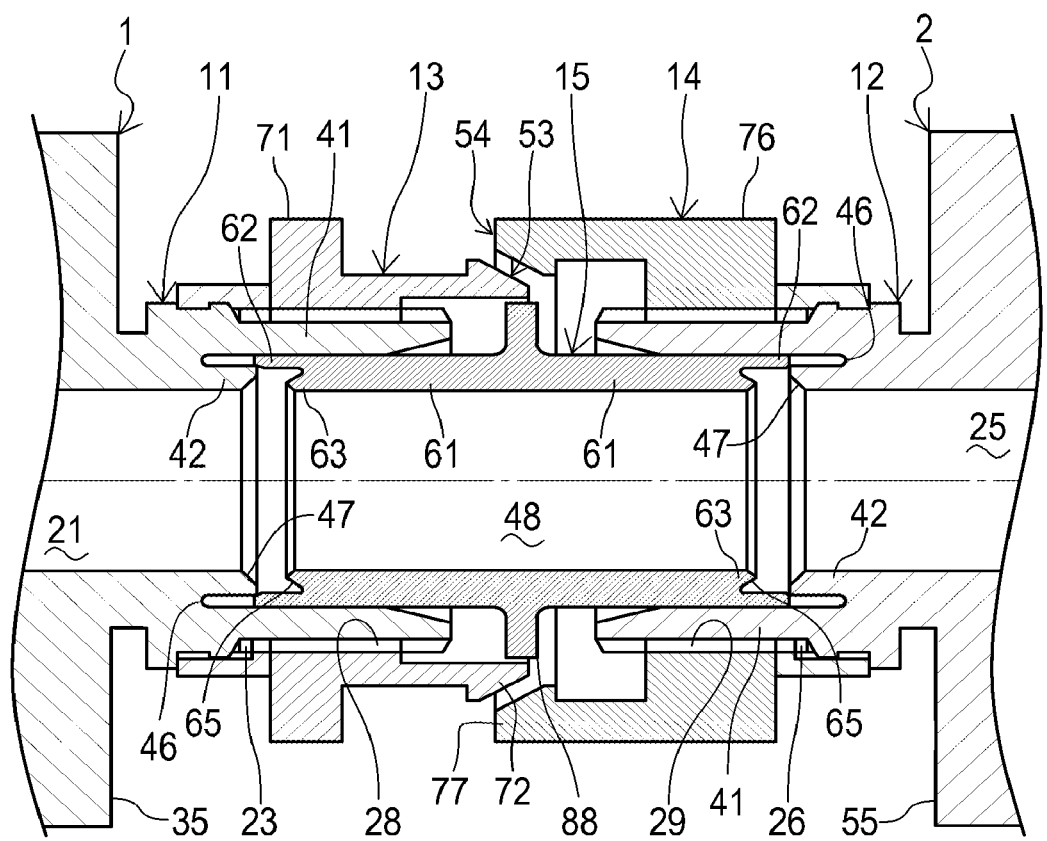
FIG. 4 is a diagram showing the two fluid devices of the fitting assembly of FIG. 1 during a process of connecting one of them with the other.

3 is a diagram showing two fluid devices 1 and 2 of the fitting assembly of FIG. 1 separated from each other. FIG. 4 is a diagram showing the two fluid devices 1 and 2 of the fitting assembly of FIG. 1 during a process of connecting one of them with the other.

As shown in FIGS. 1-4, the fitting assembly is used to connect the first fluid device 1 with the second fluid device 2 to allow fluid to flow between the devices 1 and 2 through the fitting assembly.

The first and second fluid devices 1 and 2 have shapes to be aligned closely and in parallel. Examples of the first and second fluid devices 1 and 2 include, but are not limited to, valves, fluid meters, pumps, and fittings.

The fitting assembly has a first port 11, a second port 12, a first annular member 13, a second annular member 14, and a connector 15.

The first port 11 is installed at the first fluid device 1. The first port 11 is connected with a first fluid channel 21 in the first fluid device 1. The first port 11 has an annular shape.

The second port 12 is installed at the second fluid device 2. The second port 12 is connected with a second fluid channel 25 in the second fluid device 2. The second port 12 has an annular shape.

The first annular member 13 has a first coupler 53. The first annular member 13 is installed at the first port 11.

The second annular member 14 has a second coupler 54, which can be coupled with the first coupler 53. The second annular member 14 is installed at the second port 12.

The connector 15 is installed between the first port 11 and the second port 12. The connector 15 seals a gap between the connector 15 and the first port 11 and seals a gap between the connector 15 and the second port 12.

The fitting assembly uses coupling of the second coupler 54 with the first coupler 53 to fix the second annular member 14 to the first annular member 13.

The two fluid devices 1 and 2 are arranged to make their respective ports 11 and 12 axially face each other.

The first port 11 is installed at the first fluid device 1 and integrated with the casing 35 of the first fluid device 1. Note that the first port 11 is not limited to be integrated with the casing 35, but it is separated from the casing 35.

The first port 11 has an outer sleeve 41 and an inner sleeve 42. The outer sleeve 41 is an annular body of substantially constant inner diameters and installed around the opening of the first fluid channel 21 in the casing 35 to protrude to the outside of the casing 35.

The outer sleeve 41 allows a portion of the connector 15 to enter the tip end (i.e. the first axial end) 43 of the outer sleeve 41. When the outer sleeve 41 receives the portion of the connector 15, there is substantially no radial gap between the outer sleeve 41 and the portion of the connecter 15.

The outer sleeve 41 includes a first thread 23, which extends on an outer periphery of the outer sleeve 41 in the axial direction of the outer sleeve 41. The first thread 23 is an external thread.

The inner sleeve 42 is an annular body of substantially constant outer diameters smaller than the inner diameter of the outer sleeve 41. The inner sleeve 42 is installed around the opening of the first fluid channel 21 in the casing 35 to protrude in the same direction as the outer sleeve 41, i.e. in the first axial direction of the first port 11. The inner sleeve 42 is located inside the outer sleeve 41 to be separated by a radial distance from the outer sleeve 41 and to extend coaxially with the outer sleeve 41.

The tip end 44 of the inner sleeve 42 is located nearer to the casing 35 than the tip end 43 of the outer sleeve 41. In other words, the inner sleeve 42 protrudes from the casing 35 to a distance shorter than the outer sleeve 41. Thus, the first port 11 has a twofold-annular structure on the second axial side (i.e. the side nearer to the casing 35) of the outer sleeve 41.

The inner sleeve 42 has substantially the same inner diameter as the first fluid channel 21 and the connector 15. To make the first port 11 connect the first fluid device 1 with the connector 15 to allow fluid to flow between them, the inner sleeve 42 is placed between the first fluid device 1 and the connector 15 to connect the first fluid channel 21 with the internal space 48 of the connector 15.

An annular groove 46 is provided between the outer periphery of the inner sleeve 42 and the inner periphery of the outer sleeve 41, which face each other. The groove 46 is open in the direction in which the outer and inner sleeves 41 and 42 protrude, i.e. to the second port 12. The groove 46 extends along the whole circumference of the outer and inner sleeve 41 and 42. A slope 47 is provided near the tip end 44 of the inner sleeve 42 to increase in diameter from the first fluid channel 21 toward the tip end 44 of the inner sleeve 42.

The first port 11 is made of certain resin, for example, fluoropolymer such as tetrafluoroethylene-perfluoroalkylvinylether copolymer (perfluoroalkoxy alkane (PFA)), polyvinylidene fluoride (PVDF), ethylene-tetrafluoroethylene copolymer (ETFE), tetrafluoroethylene-hexafluoropropylene copolymer (fluorinated ethylene propylene (FEP)), or polytetrafluoroethylene (PTFE). The resin is not limited to fluoropolymer, or alternatively it may be polypropylene (PP) or other resin.

The second port 12 has a reflected shape of the first port 11 with respect to a virtual center plane 68, and it is installed at the casing 55 of the second fluid device 2. Since the second port 12 has substantially the same shape as the first port 11, components of the second port 12 corresponding to ones of the first port 11 are marked with the same reference signs as the corresponding ones of the first port 11, and explanation on the components is omitted. For the explanatory convenience, substantially the same components can be marked with different reference signs, such as the first thread 23 and the second thread 26.

The connector 15 has a first sealing portion 31 and a second sealing portion 32. The first sealing portion 31 seals a gap between the connector 15 and the first port 11. The second sealing portion 32 seals a gap between the connector 15 and the second port 12.

The connector 15 has an annular shape. The connector 15 has a first portion 15a in contact with the first port 11 and a second portion 15b in contact with the second port 12. See FIG. 2. The first portion 15a is an annular body of substantially constant inner diameters and has a fluid channel, which is a portion of the internal space 48 of the connector 15. The first portion 15a is mounted on the first port 11 such that it is placed on the outer sleeve 41 to connect its fluid channel with the first fluid channel 21.

The first portion 15a includes a body 61, a first protrusion 62, and a second protrusion 63. The body 61 has a circular cylindrical shape, which is coupled with the whole inner periphery of the outer sleeve 41 to be surrounded by it when the first portion 15a is mounted on the first port 11. The first and second protrusions 62 and 63 are located at the first axial end (i.e. the end nearer to the first fluid device 1) of the body 61.

The first and second protrusions 62 and 63 each have a circular ring shape. The first protrusion 62 is pressed into the whole circumference of the groove 46 of the first port 11 when the first portion 15a is mounted on the first port 11.

The first protrusion 62 does not contact the inner face of the groove 46 nearest to the first fluid device 1.

The second protrusion 63 has a tapered face 65, which reduces in inner diameter from the virtual center plane 68 toward the first fluid device 1. In a radial direction of the first portion 15a, the tapered face 65 is located inside the first protrusion 62. In an axial direction of the first portion 15a, the tapered face 65 faces the slope 47 of the inner sleeve 42. The tapered face 65 is pressed on the slope 47 when the first portion 15a is mounted on the first port 11.

The connector 15 has a shape symmetric with respect to the virtual center plane 68, which is perpendicular to the axial direction of the connector 15 and located at the axial center of the connector 15. In other words, the second portion 15b has substantially the same shape of the first portion 15a. Accordingly, components of the second portion 15b corresponding to ones of the first components 15a are marked with the same reference signs as the corresponding ones of the first components 15a, and explanation on the components is omitted.

The connector 15 is made of certain resin, for example, fluoropolymer such as PFA, PVDF, ETFE, FEP, or PTFE, or other thermoplastic resin.

The connector 15 is a body integrated with the first and second portions 15a and 15b, which have substantially the same shape. Alternatively, the connector 15 may be an assembly of first and second portions, which differ in shape.

The first annular member 13 surrounds the first port 11, especially its outer sleeve 41. The first annular member 13 has, in addition to the first coupler 53, a third thread 28 to be engaged with the first thread 23. The third thread 28 is provided on the inner periphery of the first annular member 13.

The second annular member 14 surrounds the second port 12, especially its outer sleeve 41. The second annular member 14 has, in addition to the second coupler 54, a fourth thread 29 to be engaged with the second thread 26. The fourth thread 29 is provided on the inner periphery of the second annular member 14.

The first annular member 13 has a first body 71 in addition to the first coupler 53.

The first body 71 is placed on and fixed to the outer periphery of the first port 11. The first body 71 has an annular shape. The third thread 28 is provided on the inner periphery of the first body 71.

The first body 71 is mounted on the first port 11 to surround the whole circumference of the outer sleeve 41 of the first port 11 when the third thread 28 is engaged with the first thread 23. The first body 71 extends in an axial direction of the first annular member 13. The first body 71 is located at the second axial side (i.e. the side nearer to the first fluid device 1) of the first annular member 13.

The first coupler 53 has a first hook 72, which protrudes in an axial direction of the first annular member 13 and is bendable in a radial direction of the first body 71.

The first hook 72 of the first coupler 53 is located at the first axial side of the first annular member 13, i.e. at the opposite side of the first annular member 13 with respect to the first fluid device 1. The first hook 72 protrudes from the end of the first body 71 to the first axial direction of the first annular member 13, i.e. toward the second fluid device 2. The tip end of the first hook 72 has a first corner 73.

The number of the first hook 72 is at least one. When the number is one, the first hook 72 has a partial ring shape such as C, which is arranged coaxially with the first body 71. Accordingly, the first hook 72 is flexible. When the number is two or more, the first hooks 72 are arranged along the circumference of the first body 71 at certain intervals.

The first hook 72 includes a tapered portion 74, which reduces in diameter from its side nearer to the casing 35 of the first fluid device 1 in the first axial direction of the first annular member 13, i.e. toward the second fluid device 2. The first hook 72 is flexible to transiently bend toward the radial inside of the first annular member 13, when receiving external force stronger than a certain level.

The second annular member 14 has a second body 76 in addition to the second coupler 54.

The second body 76 is placed on and fixed to the outer periphery of the second port 12. The second body 76 has an annular shape, whose inner periphery has a fourth thread 29.

The second body 76 is mounted on the second port 12 to surround the whole circumference of the outer sleeve 41 of the second port 12 when the fourth thread 29 is engaged with the second thread 26. The second body 76 extends in an axial direction of the second annular member 14 and is located at the second axial side (i.e. the side nearer to the second fluid device 2) of the second annular member 14.

The second coupler 54 has a second hook 77 to be engaged with the first hook 71. The second hook 77 protrudes in an axial direction of the second annular member 14.

The second hook 77 of the second coupler 54 is located at the second axial side of the second annular member 14, i.e. at the opposite side of the second annular member 14 with respect to the second fluid device 2. The second hook 77 protrudes from an end of the second body 76 to the second axial direction of the second annular member 14, i.e. toward the first fluid device 1. The tip end of the second hook 77 has a second corner 78.

The number of the second hook 77 is at least one. When the number is one, the second hook 77 has a partial ring shape such as C, which is arranged coaxially with the second body 76. Accordingly, the first hook 72 is flexible. When the number is two or more, the second hooks 77 are arranged along the circumference of the second body 76 at certain intervals.

The second hook 77 includes a tapered portion 79, which reduces in diameter from the second axial direction of the second annular member 14, i.e. from its side nearer to the second fluid device 2, to the first axial direction of the second annular member 14, i.e. toward the first fluid device 1. The second hook 77 surrounds the side of the first hook 72 nearer to the first fluid device 1. The second hook 77 has an inner diameter larger than the second body 76.

Instead of the second hook 77, the second coupler 54 may have a hook rest such as a dent to be engaged with the first hook 72. The second coupler 54 may have a shape to be engaged with the first body 71 of the first annular member 13.

The first annular member 13 is coupled with the second annular member 14 when the first hook 72 faces the second hook 77. The first annular member 13 is placed coaxially with the second annular member 14. The first annular member 13 is located radially inside the second annular member 14 to make the first corner 73 axially face the second corner 78.

Thus, the first and second hooks 72 and 77 engaged with each other prevent the first and second annular members 13 and 14 from separating from each other. The first and second hooks 72 and 77 make the first and second corners 73 and 78 contact each other, and accordingly, the first and second corners 73 and 78 are engaged with each other in the common axial direction of the first and second annular members 13 and 14.

When the first hook 72 is engaged with the second hook 77, the first and second annular members 13 and 14 press the first protrusions 62 of the connector 15 into the corresponding grooves 46 and press the tapered faces 65 of the second protrusions 63 of the connector 15 onto the corresponding slopes 47 of the tip ends 44 of the inner sleeves 42.

The first annular member 13 is made of certain resin, for example, fluoropolymer such as PFA, PVDF, ETFE, FEP, or PTFE. Similarly, the second annular member 14 is made of certain resin, for example, fluoropolymer such as PFA, PVDF, ETFE, FEP, or PTFE.

Figure 3:
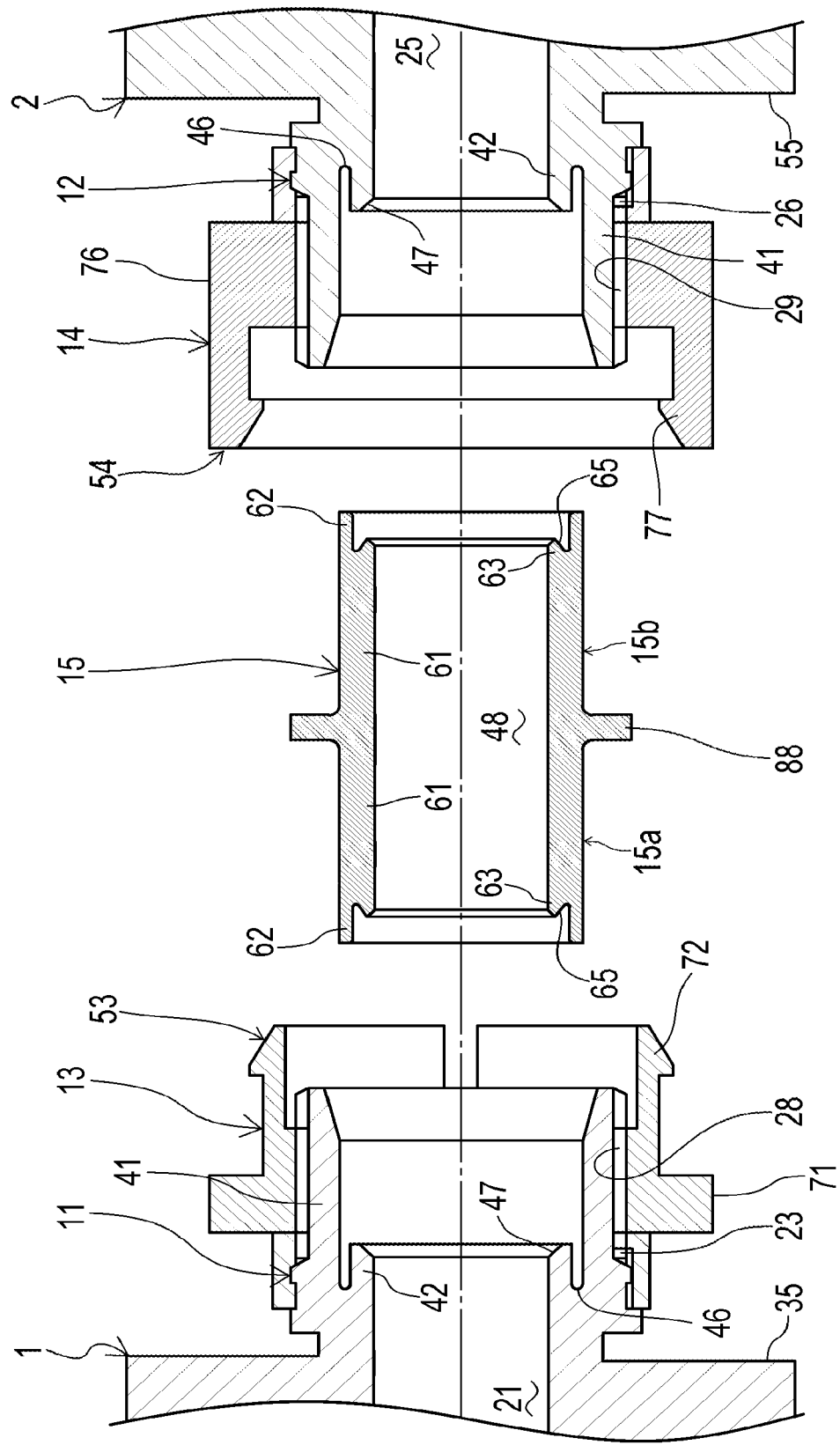
FIG. 3 is a diagram showing two fluid devices of the fitting assembly of FIG. 1 separated from each other.

The first fluid device 1 is connected with the second fluid device 2 as follows. First, as shown in FIG. 3, the third thread 28 is engaged with the first thread 23 to releasably fix the first annular member 13 to the first port 11. The fourth thread 29 is engaged with the second thread 26 to releasably fix the second annular member 14 to the second port 12. Next, the connector 15 is placed inside one of the first and second ports 11 and 12. As shown in FIG. 4, the first fluid device 1 faces the second fluid device 2 at a remove from the second fluid device 2, and the connector 15 approaches the other of the first and second ports 11 and 12. After that, the first hook 72 of the first annular member 13 transiently bends toward the radial inside of the first annular member 13 to allow the first annular member 13 to be placed inside the second annular member 14. Then, the first hook 72 is engaged with the second hook 77. Thus, the first annular member 13 is fixed to the second annular member 14 to prevent the annular members 13 and 14 from being axially separated from each other.

Since the first annular member 13 is fixed to the second annular member 14, the first and second ports 11 and 12 are prevented from moving away from each other. This maintains connection between the first and second fluid devices 1 and 2 to allow fluid to flow between the fluid devices 1 and 2, i.e. connection among the first fluid channel 21, the second fluid channel 25, and the internal space 48 of the connector 15.

Engagement of the first hook 72 with the second hook 77 forms the first and second sealing portions 31 and 32. In other words, the engagement causes the connector 15 to press its first protrusions 62 into the corresponding grooves 46 and press the tapered faces 65 of its second protrusions 63 onto the corresponding slopes 47 of the tip ends 44 of the inner sleeves 42.

The first and second sealing portions 31 and 32 each form a primary sealing area 81 where axial sealing force acts and a secondary sealing area 82 where radial sealing force acts. An operator uses his/her hands and/or a tool to place the first hook 72 of the first annular member 13 inside the second hook 77 of the second annular member 14.

The fitting assembly according to the first embodiment of the first invention can prevent fluid leakage from the junction of the first and second fluid devices 1 and 2. In addition, connection between the first and second fluid devices 1 and 2 to allow fluid to flow therebetween does not need any member such as a tube between the first and second fluid devices 1 and 2. This can place the two fluid devices 1 and 2 as closely to each other as possible, and reduce space for installation of the fluid devices 1 and 2.

The connector 15 includes an extending portion 88, which is located between the first port 11 and the second port 12 when the first fluid device 1 is connected with the second fluid device 2 to allow fluid to flow between them.

The extending portion 88 is placed between the first and second ports 11 and 12, and it is separated from both the ports 11 and 12. The extending portion 88 extends toward the radial outside of the connector 15 and has a ring shape.

The extending portion 88 has an outer diameter larger than each tip end 43 of the first and second ports 11 and 12. The extending portion 88 is located on the virtual center plane 68 of the connector 15, i.e. on an axial intermediate portion (the boundary between the first portion 15a and the second portion 15b) of the connector 15.

The extending portion 88 is arranged in a gap between the tip ends 43 and 43 of the first and second ports 11 and 12 when the connector 15 is placed on the ports 11 and 12. The extending portion 88 axially faces the tip ends 43 and 43 of the first and second ports 11 and 12. The extending portion 88 facilitates release of the connector 15 from the first and second ports 11 and 12.

The following explains second through fifth embodiments of the first invention with reference to FIGS. 5-8. Components of fitting assemblies substantially corresponding to ones of the fitting assembly according to the first embodiment are marked in FIGS. 5-8 with the same reference signs as the corresponding ones, and explanation on the components is omitted.

Figure 5:
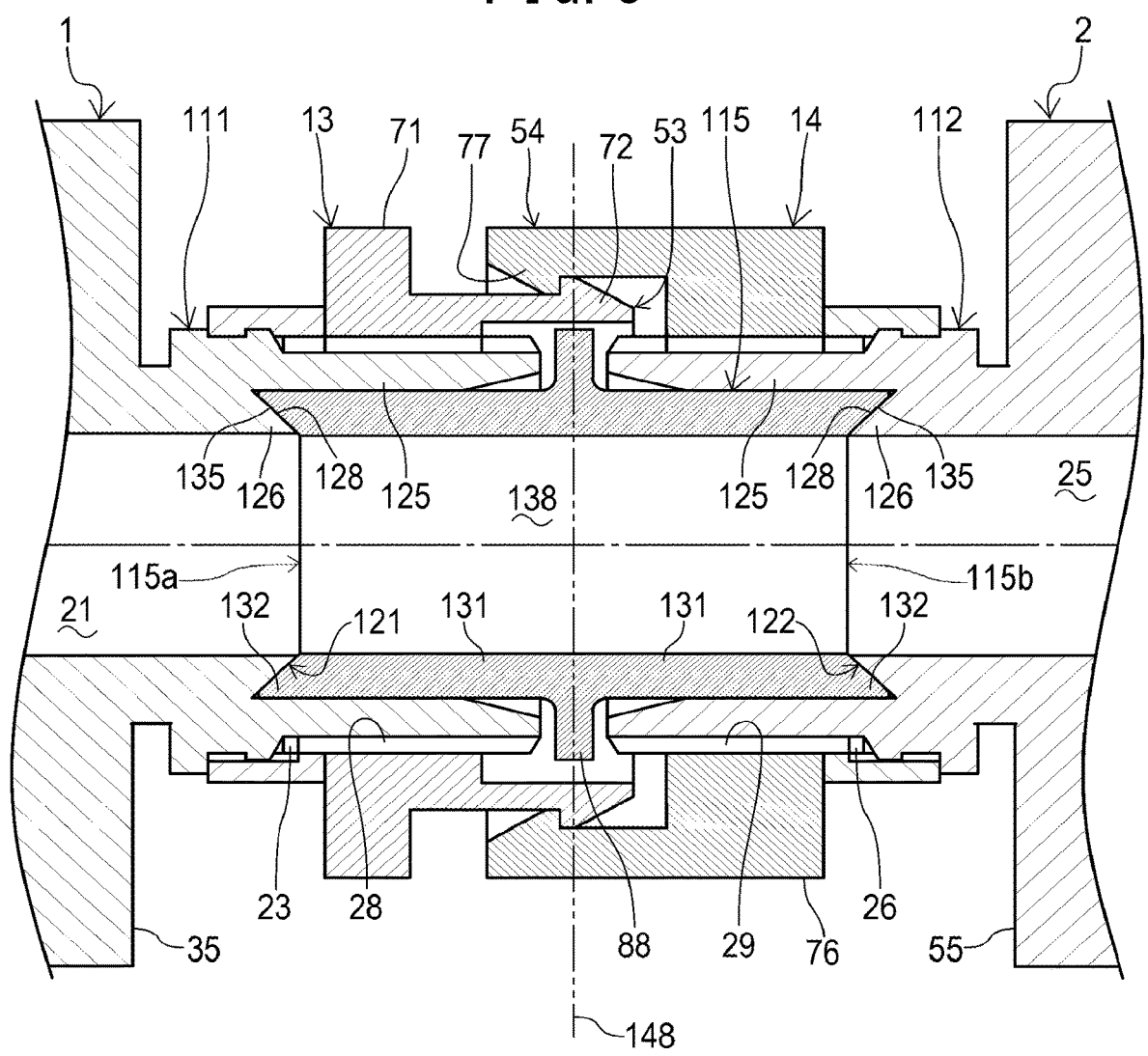
FIG. 5 is a cross-sectional view of a fitting assembly for fluid device according to a second embodiment of the first invention.

FIG. 5 is a cross-sectional view of a fitting assembly according to the second embodiment of the first invention. As shown in FIG. 5, the fitting assembly differs from one according to the first embodiment in the following configuration: a first sealing portion 121 that seals a gap between the first port 111 and the connector 115; and a second sealing portion 122 that seals a gap between the second port 112 and the connector 115.

The first port 111 is installed at the first fluid device 1 and integrated with the casing 35 of the first fluid device 1. The first port 111 has an annular body 125 and a protruding ring 126. The annular body 125 is a circular cylinder of substantially constant inner diameters, which is installed around the opening of the first fluid channel 21 in the casing 35 to protrude toward the outside of the casing 35.

The annular body 125 allows a portion of the connector 115 to enter the tip end (i.e. the first axial end) of the annular body 125. When the annular body 125 receives the portion of the connector 115, there is substantially no gap between the annular body 125 and the portion of the connector 115 except for the tip end of the annular body 125 and its vicinity. On the outer periphery of the annular body 125, the first thread 23 extends in the axial direction of the annular body 125. The first thread 23 is an external thread.

The protruding ring 126 is a ring-shaped body of an outer diameter smaller than the inner diameter of the annular body 125. The protruding ring 126 is installed around the opening of the first fluid channel 21 in the casing 35 to protrude in the same direction as the annular body 125, i.e. in the first axial direction of the annular body 125. The protruding ring 126 is placed inside the annular body 125 with separated by a radial distance from the annular body 125.

The protruding ring 126 has substantially the same inner diameter as the first fluid channel 21 and the connector 115. The protruding ring 126 is located between the first fluid device 1 and the connector 115 and connects the first fluid channel 21 with the internal space 138 of the connector 115. The first port 111 connects the first fluid device 1 with the connector 115 to allow fluid to flow between them.

The outer periphery of the protruding ring 126 includes a tapered face 128, which reduces in outer diameter to the direction in which the protruding ring 126 protrudes, i.e. to the first axial direction of the first port 111. The tapered face 128 extends along the whole circumference of the protruding ring 126. The tapered face 128 is separated by a distance from the inner periphery of the annular body 125.

The second port 112 has substantially the same shape as the first port 111. Accordingly, components of the second port 112 corresponding to ones of the first port 111 are marked with the same reference signs as the corresponding ones of the first port 111, and explanation on the components is omitted. For the explanatory convenience, substantially the same components can be marked with different reference signs, such as the first thread 23 and the second thread 26.

The connector 115 has a first portion 115a in contact with the first port 111 and a second portion 115b in contact with the second port 112. The first portion 115a is a circular cylinder of substantially constant inner diameters, whose internal space serves as a fluid channel. The first portion 115a is mounted on the first port 111 such that it is placed in the annular body 125 to connect its fluid channel with the first fluid channel 21.

The first portion 115a includes a body 131 and a protrusion 132. The body 131 has a circular cylindrical shape, which is placed on the inner periphery of the annular body 125 when the first portion 115a is mounted on the first port 111. From the first axial end (i.e. the axial end nearer to the first fluid device 1) of the body 131, the protrusion 132 protrudes in the axial direction.

The protrusion 132 has a circular ring shape, whose inner periphery has a slope 135. When the first portion 115a is mounted on the first port 111, the protrusion 132 presses the slope 135 onto the tapered face 128 of the protruding ring 126. The slope 135 increases in diameter to the direction in which the protrusion 132 protrudes, i.e. toward the first fluid device 1. The slope 135 extends along the whole circumference of the protrusion 132.

The connector 115 has a shape symmetric with respect to a virtual center plane 148, which is perpendicular to the axial direction of the connector 115 and located at the axial center of the connector 115. In other words, the first and second portions 115a and 115b have substantially the same shape.

The above-described fitting assembly, like one according to the first embodiment, can reduce space for installation of the first and second fluid devices 1 and 2 connected with each other to allow fluid to flow between each other. During connection between the first and second fluid devices 1 and 2, the connector 115 forms the first sealing portion 121 and the second sealing portion 122; the connector 115 presses the slope 135 of the first portion 115a onto the tapered face 128 of the first port 111 and presses the slope 135 of the second portion 115b onto the tapered face 128 of the second port 112.

This can prevent fluid leakage from the junction of the first and second fluid devices 1 and 2 and achieve short-distance connection between the first and second fluid devices 1 and 2 without any member such as a tube.

Figure 6:
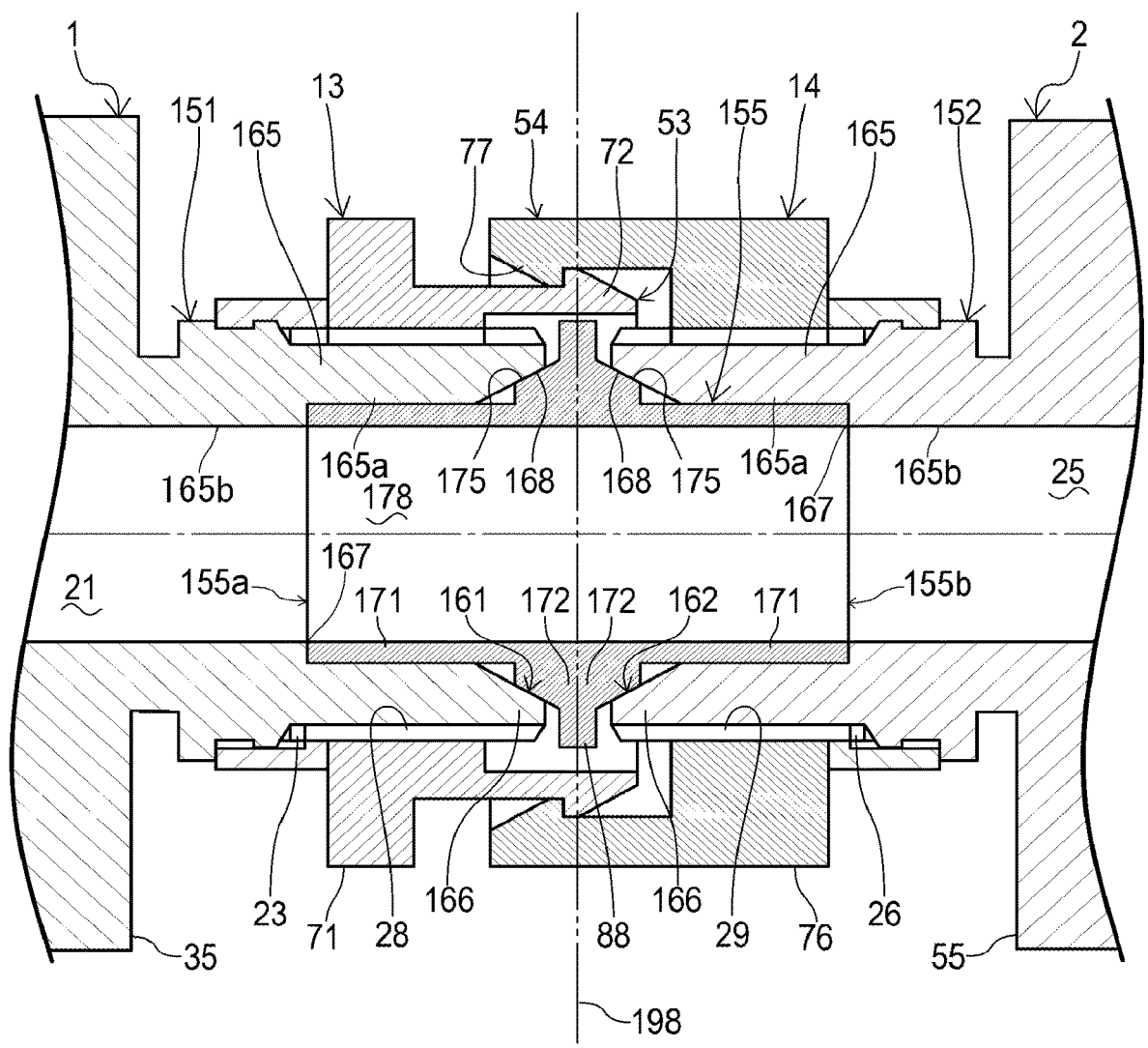
FIG. 6 is a cross-sectional view of a fitting assembly for fluid device according to a third embodiment of the first invention.

FIG. 6 is a cross-sectional view of a fitting assembly according to the third embodiment of the first invention. As shown in FIG. 6, the fitting assembly differs from one according to the first embodiment in the following configuration: a first sealing portion 161 that seals a gap between the first port 151 and the connector 155; and a second sealing portion 162 that seals a gap between the second port 152 and the connector 155.

The first port 151 is installed at the first fluid device 1 and integrated with the casing 35 of the first fluid device 1. On the outer periphery of the first port 151, the first thread 23 extends in the axial direction of the first port 151. The first thread 23 is an external thread.

The first port 151 has an annular body 165 and a protrusion 166. The annular body 165 is a circular cylinder with a step on its inner periphery and protrudes away from the casing 35. The annular body 165 is located near the opening of the first fluid channel 21 in the casing 35.

The annular body 165 has a first annular portion 165a on the first axial side of the step 167, i.e. near the opening of the first port 151. The first annular portion 165a allows a portion of the connector 155 to enter the first annular portion 165a. When receiving the portion of the connector 155, the first annular portion 165a closely contacts substantially the whole outer periphery of the portion of the connector 155.

The annular body 165 has a second annular portion 165b on the second axial side of the step 167, i.e. near the first fluid device 1. The second annular portion 165b has substantially the same inner diameter as the first fluid channel 21 and the connector 115. The second annular portion 165b is placed between the first fluid device 1 and the connector 155 to connect the first fluid channel 21 with the internal space 178 of the connector 155 so that the first port 151 connects the first fluid device 1 with the connector 155 to allow fluid to flow between them.

The protrusion 166 is a ring and protrudes from the first annular portion 165a to the first axial direction of the annular body 165. The inner periphery of the protrusion 166 has a slope 168, which increases in diameter from the annular body 165 toward the tip end of the protrusion 166, i.e. toward the opening of the first port 151. The slope 168 extends along the whole circumference of the protrusion 166.

The second port 152 has a reflected shape of the first port 151 with respect to a virtual center plane 198, i.e. substantially the same shape as the first port 151.

The connector 155 has a first portion 155a in contact with the first port 151 and a second portion 155b in contact with the second port 152. The first portion 155a is a circular cylinder of substantially constant inner diameters, whose internal space serves as a fluid channel. The first portion 155a is mounted on the first port 151 such that it is placed on the annular body 165, and thus, the first portion 155a connects its internal space 178, which serves as the fluid channel, with the first fluid channel 21.

The first portion 155a includes a body 171 and a protrusion 172. The body 171 has a circular cylindrical shape. When the first portion 155a is mounted on the first port 151, the body 171 is coupled with the whole circumference of the annular body 165 to be surrounded by it. From an end of the body 171, i.e. from an axially intermediate portion of the connector 155, the protrusion 172 protrudes toward the radial outside of the connector 155.

The protrusion 172 has a circular ring shape. When the first portion 155a is mounted on the first port 151, the protrusion 172 presses its outer periphery, i.e. a tapered face 175, onto the slope 168 of the protrusion 166. The tapered face 175 increases in diameter from the annular body 165 to its axial outside. The tapered face 175 extends along the whole circumference of the protrusion 172.

The connector 155 has a shape symmetric with respect to the virtual center plane 198, which is perpendicular to the axial direction of the connector 155 and located at the axial center of the connector 155. In other words, the first portion 155a and the second portion 155b have substantially the same shape.

During connection between the first and second fluid devices 1 and 2, the connector 155 forms the first and second sealing portions 161 and 162; the connector 155 presses the tapered face 175 of the first portion 155a onto the slope 168 of the first port 151 and presses the tapered face 175 of the second portion 155b onto the slope 168 of the second port 152. This can prevent fluid leakage from the junction of the first and second fluid devices 1 and 2 and achieve short-distance connection between the first and second fluid devices 1 and 2 without any member such as a tube.

Therefore, the fitting assembly, like one according to the first embodiment, can reduce space for installation of the first and second fluid devices 1 and 2 connected with each other to allow fluid to flow between each other.

Figure 7:
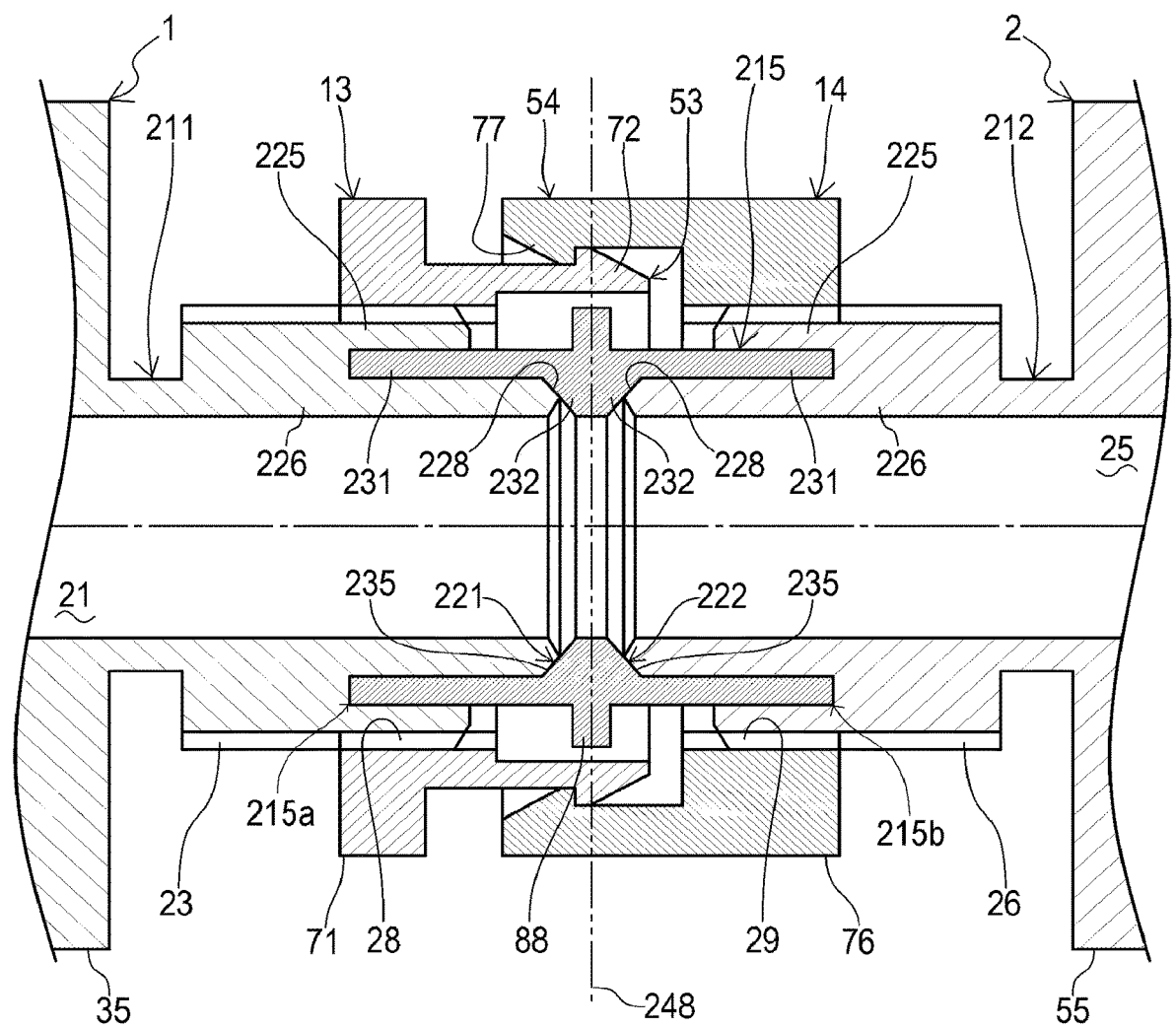
FIG. 7 is a cross-sectional view of a fitting assembly for fluid device according to a fourth embodiment of the first invention.

FIG. 7 is a cross-sectional view of a fitting assembly according to the fourth embodiment of the first invention. As shown in FIG. 7, the fitting assembly differs from one according to the first embodiment in the following configuration: a first sealing portion 221 that seals a gap between the first port 211 and the connector 215; and a second sealing portion 222 that seals a gap between the second port 212 and the connector 215.

The first port 211 is installed at the first fluid device 1 and integrated with the casing 35 of the first fluid device 1. The first port 211 has an outer sleeve 225 and an inner sleeve 226. The outer sleeve 225 is a circular cylinder of substantially constant inner diameters, which is installed near the first fluid channel 21 in the casing 35 to protrude toward the outside of the casing 35.

The outer sleeve 225 allows a portion of the connector 215 to enter the tip end (i.e. the first axial end) of the outer sleeve 225. When the outer sleeve 225 receives the portion of the connector 215, there is substantially no gap between the outer sleeve 225 and the portion of the connector 215. On the outer periphery of the outer sleeve 225, the first thread 23 extends in the axial direction of the outer sleeve 225. The first thread 23 is an external thread.

The inner sleeve 226 is a circular cylinder of substantially constant outer diameters smaller than the inner diameter of the outer sleeve 225. The inner sleeve 226 protrudes in the same direction as the outer sleeve 225, i.e. in the first axial direction of the first port 211. The inner sleeve 226 is located near the first fluid channel 21 in the casing 35. The inner sleeve 226 is located inside the outer sleeve 225 and separated by a radial distance from the outer sleeve 225.

The tip end of the inner sleeve 226 is located farther from the first or second fluid device 1 or 2 than the tip end of the outer sleeve 225, i.e. the inner sleeve 226 protrudes from the casing 35 to a distance longer than the outer sleeve 225. Thus, the first port 211 has a twofold-annular structure at the axially intermediate portion of the outer sleeve 225.

The inner sleeve 226 has substantially the same inner diameter as the first fluid channel 21 and the connector 215. The inner sleeve 226 is located between the first fluid device 1 and the connector 215 to connect the first fluid channel 21 with the internal space of the connector 215. The first port 211 connects the first fluid device 1 with the connector 215 to allow fluid to flow between them.

The tip end of the inner sleeve 226 is tapered toward the direction in which the inner sleeve 226 protrudes. The outer periphery of the tip end of the inner sleeve 226 has a tapered face 228, which reduces in diameter toward a virtual center plane 248, i.e. to the direction in which the inner sleeve 226 protrudes (or to the first axial direction of the first port 211). The tapered face 228 extends along the whole circumference of the tip end of the inner sleeve 226.

The second port 212 has substantially the same shape as the first port 211.

The connector 215 has a first portion 215a in contact with the first port 211 and a second portion 215b in contact with the second port 212. The first portion 215a is a circular cylinder, whose internal space serves as a fluid channel. The first portion 215a is mounted on the first port 211 such that the first portion 215a is coupled with the inner sleeve 226, and thus, the first portion 215a connects its fluid channel with the first fluid channel 21.

The first portion 215a includes a body 231 and a protrusion 232. The body 231 has a circular cylindrical shape. When the first portion 215a is mounted on the first port 211, the body 231 is placed on the outer periphery of the inner sleeve 226. From the first axial end of the body 231 (i.e. from an intermediate portion of the connector 215), the protrusion 232 protrudes to the radial inside of the connector 215.

The protrusion 232 has a circular ring shape, whose inner periphery has a slope 235. When the first portion 215a is mounted on the first port 211, the protrusion 232 presses the slope 235 onto the tapered face 228 of the inner sleeve 226. The slope 235 increases in diameter from the virtual center plane 248 toward the first or second fluid device 1 or 2. The slope 235 extends along the whole circumference of the protrusion 232.

The connector 215 has a shape symmetric with respect to the virtual center plane 248, which is perpendicular to the axial direction of the connector 215 and located at the axial center of the connector 215. In other words, the first portion 215a and the second portion 215b have substantially the same shape.

During connection between the first and second fluid devices 1 and 2, the connector 215 forms the first and second sealing portions 221 and 222; the connector 215 presses the slope 235 of the first portion 215a onto the tapered face 228 of the first port 211 and presses the slope 235 of the second portion 215b onto the tapered face 228 of the second port 212. This can prevent fluid leakage from the junction of the first and second fluid devices 1 and 2 and achieve short-distance connection between the first and second fluid devices 1 and 2 without any member such as a tube.

Therefore, the fitting assembly, like one according to the first embodiment, can reduce space for installation of the first and second fluid devices 1 and 2 connected with each other to allow fluid to flow between each other.

The following explains a fifth embodiment of the first invention.

Figure 8:
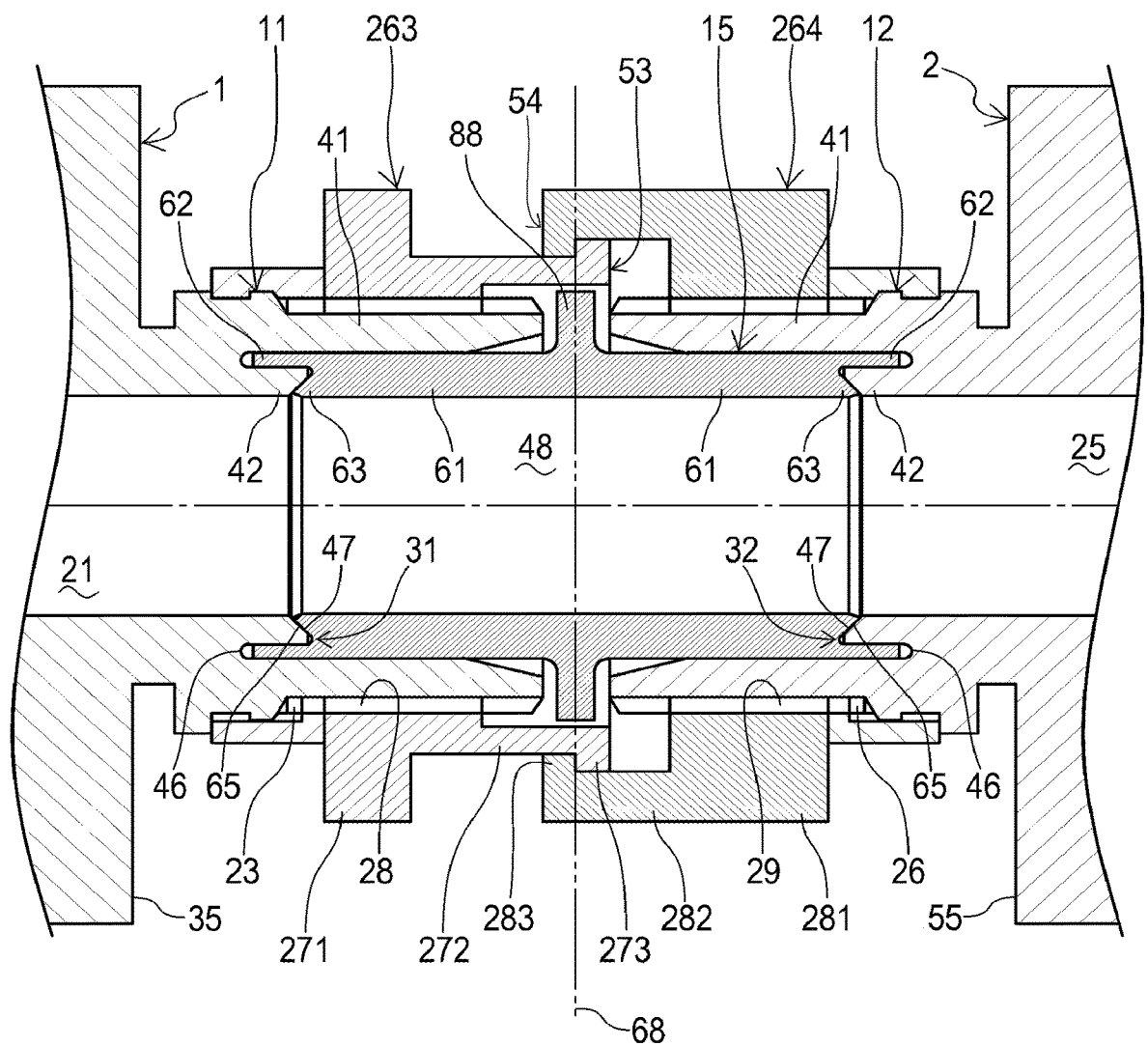
FIG. 8 is a cross-sectional view of a fitting assembly for fluid device according to a fifth embodiment of the first invention.
Figure 9:
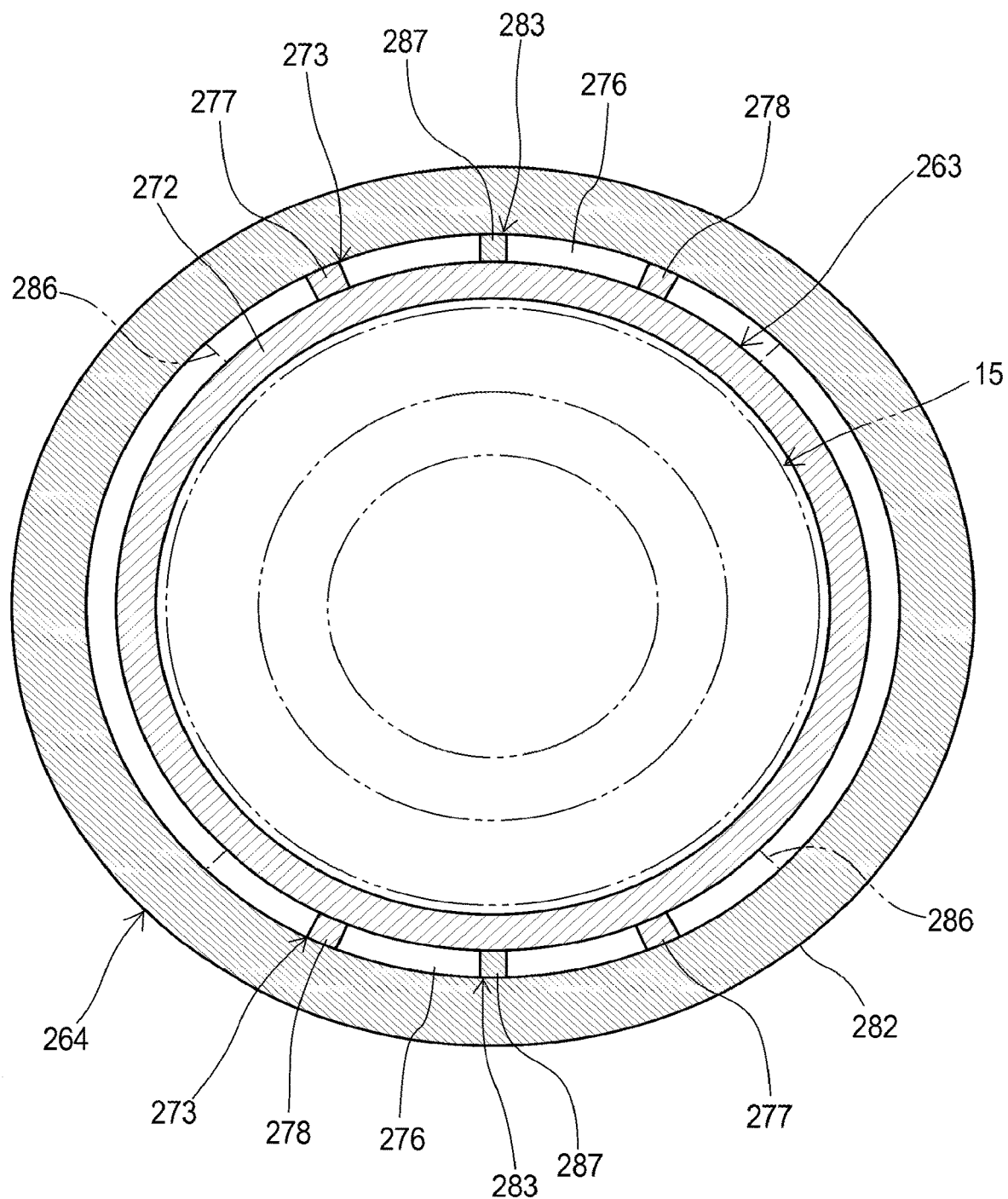
FIG. 9 is a partial cross-sectional view of a first coupler of a first annular member and a second coupler of a second annular member of FIG. 8 from the first fluid device.
Figure 10:
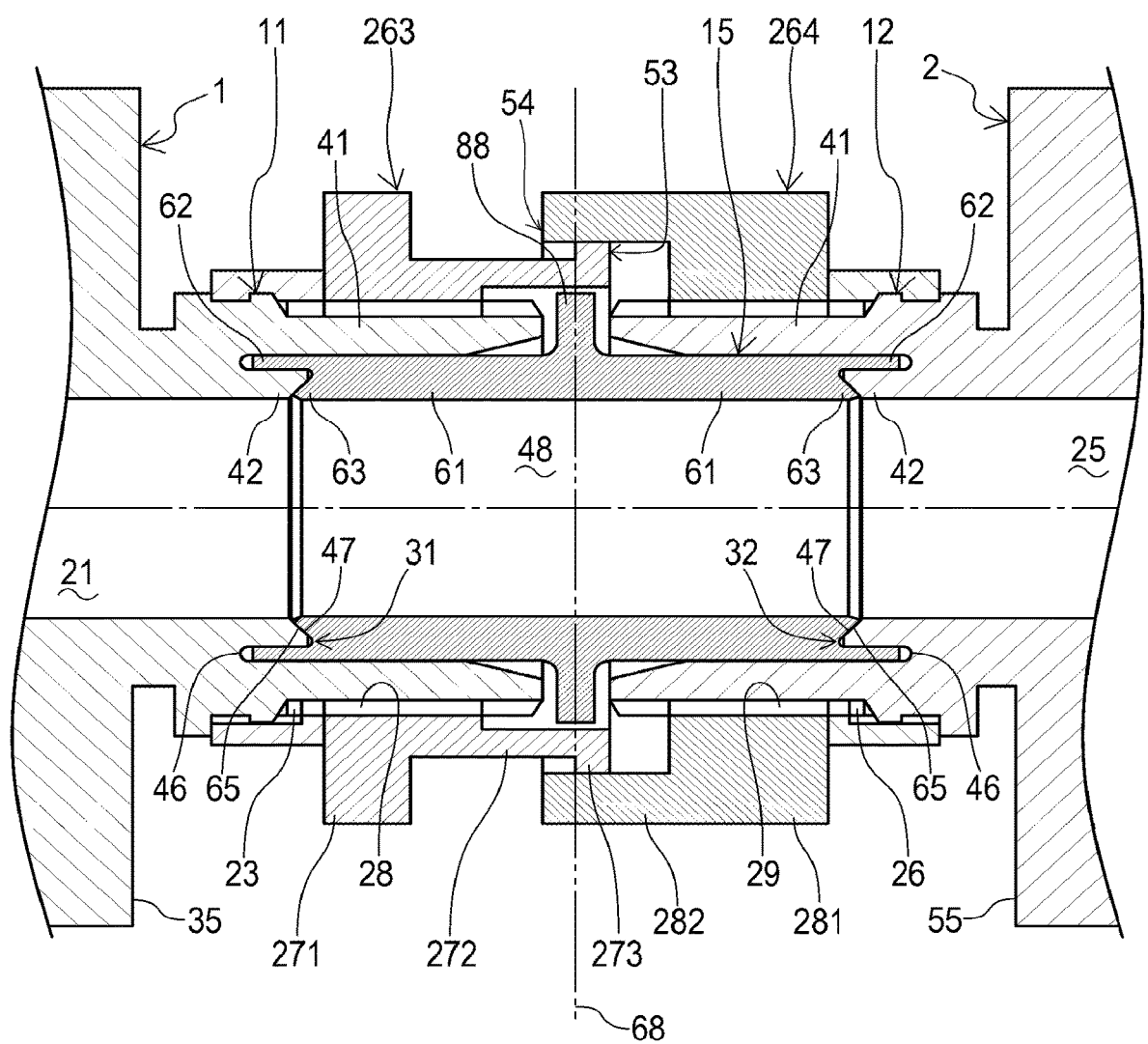
FIG. 10 is a diagram showing the two fluid devices of the fitting assembly of FIG. 8 during a process of connecting one of them with the other.

FIG. 8 is a cross-sectional view of a fitting assembly according to the fifth embodiment of the first invention. FIG. 9 is a partial cross-sectional view of a first coupler 53 of a first annular member 263 and a second coupler 54 of a second annular member 264 of FIG. 8 from the first fluid device 1. FIG. 10 is a diagram showing the two fluid devices 1 and 2 of the fitting assembly of FIG. 8 during a process of connecting one of them with the other.

Figure 11:
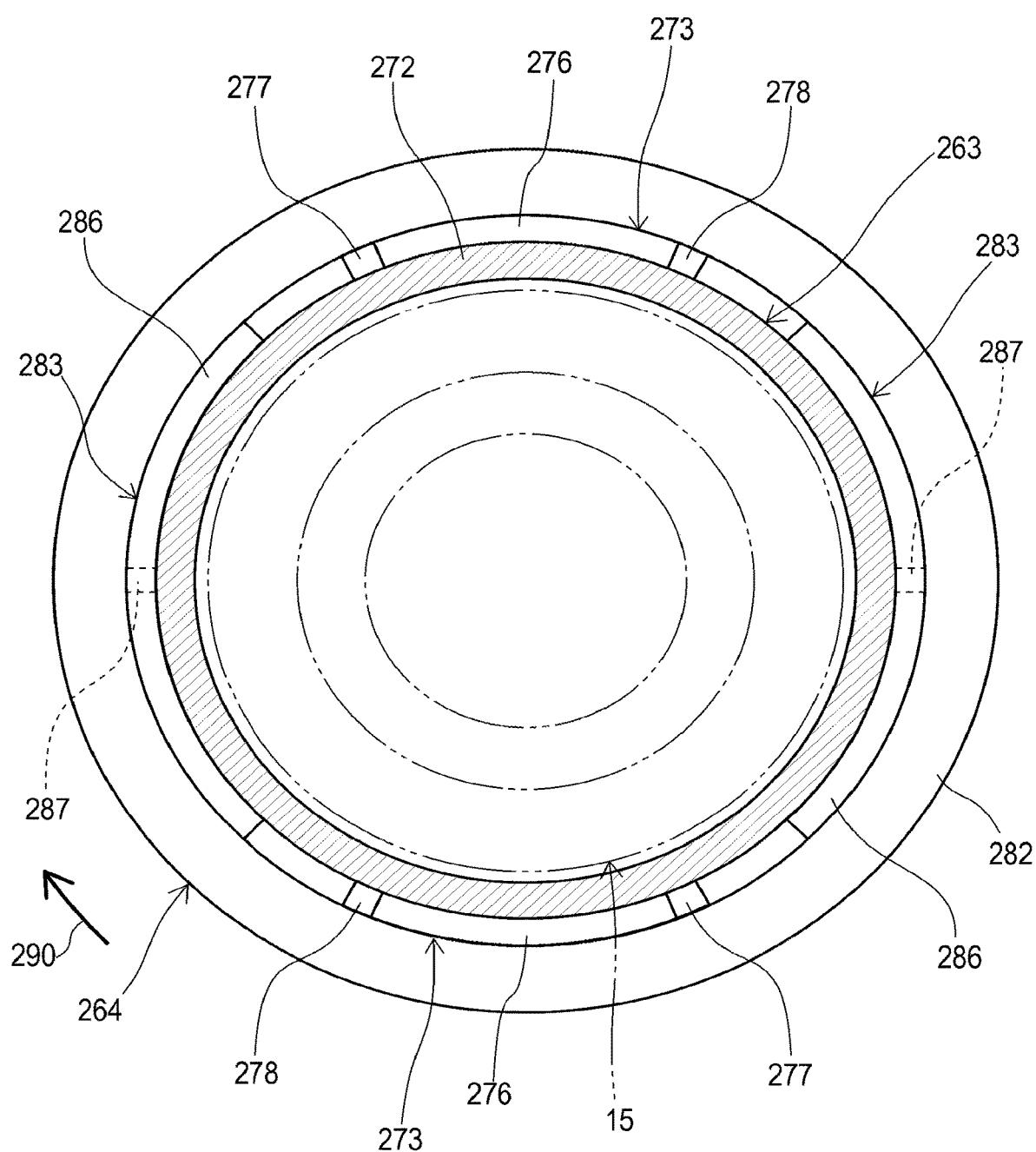
FIG. 11 is a partial cross-sectional view of the first coupler of the first annular member and the second coupler of the second annular member of FIG. 10 from the first fluid device.

FIG. 11 is a partial cross-sectional view of the first coupler 53 of the first annular member 263 and the second coupler of the second annular member 264 of FIG. 10 from the first fluid device 1. Components of the fitting assembly substantially corresponding to ones according to the first embodiment are marked in FIG. 11 with the same reference signs as the ones, and explanation on the components is omitted.

As shown in FIGS. 8-11, the fitting assembly differs from one according to the first embodiment in the first annular member 263 and the second annular member 264.

The first annular member 263 has a third body 271 in addition to the first coupler 53. The third body 271 has an annular shape, whose inner periphery has a third thread 28. The first coupler 53 has a first protrusion 272 and a concave wall 273. The first protrusion 272 protrudes from the third body 271 to the axial direction of the first annular member 263. The concave wall 273 is located at the outer periphery of the first protrusion 272. The concave wall 273 is concave to the first fluid device 1.

The third body 271 surrounds the whole circumference of the outer sleeve 41 of the first port 11 when the third thread 28 is engaged with the first thread 23. The third body 271 extends in the axial direction of the first annular member 263. The third body 271 is located on the second axial side of the first annular member 263, i.e. on the side nearer to the first fluid device 1.

The first protrusion 272 is located on the first axial side of the first annular member 263, i.e. on the side farther from the first fluid device 1. The first protrusion 272 protrudes from the first axial end of the third body 271 to the first axial direction of the first annular member 263. The first protrusion 272 has an annular shape.

The concave wall 273 of the first coupler 53 is located at the tip end of the first protrusion 272 and protrudes from the outer periphery of the first protrusion 272 to the radial outside of the first protrusion 272. The first coupler 53 has at least one concave wall, for example, two concave walls 273, which are arranged along the circumference of the first protrusion 272 (i.e. the first annular member 263) at certain intervals.

The concave walls 273 each have a first body 276 and a pair of first projections 277 and 278. The first body 276 extends along the circumference of the first protrusion 272. The first bodies 276 of the concave walls 273 are located at substantially the same positions in the axial direction of the first annular member 263.

The first projections 277 and 278 protrude from either circumferential end of the first body 276 toward the third body 271, i.e. to the second axial direction of the first annular member 263. The first projections 277 and 278 are separated by a width from each other along the circumference of the first protrusion 272. The first projections 277 and 278 may differ in shape.

The second annular member 264 has a fourth body 281 in addition to the second coupler 54. The fourth body 281 has an annular shape. The inner periphery of the fourth body 281 has a fourth thread 29. The second coupler 54 has a second protrusion 282 and a convex wall 283. The second protrusion 282 protrudes from the fourth body 281 to the axial direction of the second annular member 264.

The convex wall 283 is located on the inner periphery of the second protrusion 282. Note that a convex wall similar to the convex wall 283 may be provided with the outer periphery of the first protrusion 272 of the first coupler 53, and a concave wall similar to the concave wall 273 may be provided with the inner periphery of the second protrusion 282 of the second coupler 54.

The fourth body 281 is mounted on the second port 12 to surround the whole circumference of the outer sleeve 41 of the second port 12 when the fourth thread 29 is engaged with the second thread 26. The fourth body 281 extends in the axial direction of the second annular member 264. The fourth body 281 is located on the second axial side (i.e. on the side nearer to the second fluid device 2) of the second annular member 264.

The second protrusion 282 is located on the first axial side (i.e. the side farther from the second fluid device 2) of the second annular member 264. The second protrusion 282 protrudes from the first axial end of the fourth body 281 to the first axial direction of the second annular member 264. The second protrusion 282 has an annular shape and arranged coaxially with the fourth body 281.

The convex wall 283 of the second coupler 54 is located at the tip end of the second protrusion 282. The convex wall 283 protrudes from the inner periphery of the second protrusion 282 to the radial inside of the second protrusion 282. The second coupler 54 has at least one convex wall, for example, two convex walls 283, which are arranged along the circumference of the second protrusion 282 (i.e. the second annular member 264) at the same intervals as the concave walls 273.

The convex walls 283 each have a second body 286 and a second projection 287. The second body 286 extends along the circumference of the second protrusion 282. The second body 286 has a circumferential width larger than the second projection 287. The second projection 287 protrudes from the second body 286 toward the fourth body 281, i.e. to the second axial direction of the second annular member 264.

The second projections 287 of the convex walls 283 have tip ends at substantially the same positions in the axial direction of the second annular member 264. The second projections 287 each enter the space between one pair of the first projections 277 and 278 and circumferentially separated by certain distances from both the first projections 277 and 278.

A user rotatably couples the first annular member 263 with the second annular member 264 to make the first protrusion 272 and the second protrusion 282 face each other. A portion of the first annular member 263 is located at the radial inside of the second annular member 264. The user brings the first annular member 263 close to the second annular member 264 to make each convex wall 283 pass through circumferential space between the concave walls 273. Then, the user rotates the first annular member 263 relative to the second annular member 264.

Thus, the concave walls 273 and the convex walls 283 are engaged with each other to prevent the first and second annular member 263 and 264 from being separated from each other. The second projection 287 of each convex wall 283 axially contacts the side nearer to the first fluid device 1 of the first body 276 of one of the concave walls 273.

Engagement of the concave walls 273 with the convex walls 283 forms the first and second sealing portions 31 and 32. In other words, the engagement causes the connector 15 to press its first protrusions 62 into the corresponding grooves 46 and press the tapered faces 65 of its second protrusions 63 onto the corresponding slopes 47 of the tip ends 44 of the inner sleeves 42.

The first annular member 263 is made of certain resin, for example, fluoropolymer such as PFA, PVDF, ETFE, FEP, or PTFE. Similarly, the second annular member 264 is made of certain resin, for example, fluoropolymer such as PFA, PVDF, ETFE, FEP, or PTFE.

When the concave walls 273 deviate from the convex walls 283 in the circumferential direction of the second annular member 264, as shown in FIG. 11, the first annular member 263 is coaxially coupled with the second annular member 264. After that, the first annular member 263 rotates relative to the second annular member 264 in the direction of the arrow 290. Thus, the concave walls 273 is engaged with the convex walls 283. See FIG. 9.

Thus, the first annular member 263 and the second annular member 264 are fixed to each other not to move away from each other. This prevents the first and second ports 11 and 12 from moving away from each other and maintains the first and second fluid devices 1 and 2 connected with each other to allow fluid to flow between each other.

Engagement of the concave walls 273 with the convex walls 283 forms the first and second sealing portions 31 and 32. In other words, the engagement causes the connector 15 to press its first protrusions 62 into the corresponding grooves 46 and press the tapered faces 65 of its second protrusions 63 onto the corresponding slopes 47 of the tip ends 44 of the inner sleeves 42.

The fitting assembly according to the fifth embodiment does not need any member such as a tube between the first and second fluid devices 1 and 2 for connection between the fluid devices to allow fluid to flow between them. Accordingly, the fitting assembly enables the two fluid devices to be connected as closely to each other as possible and can reduce space for installation of the fluid devices 1 and 2. The fitting assembly can also prevent fluid leakage from the junction of the two fluid devices 1 and 2.

Preferably, the second projection 287 of the convex wall 283 of the second annular member 264 has substantially the same circumferential width as the first projection pair 277 and 278 of the concave wall 273 of the first annular member 263. This reduce circumferential instability of the first and second annular members 263 and 264.

The following explains the sixth embodiment of the first invention.

Figure 12:
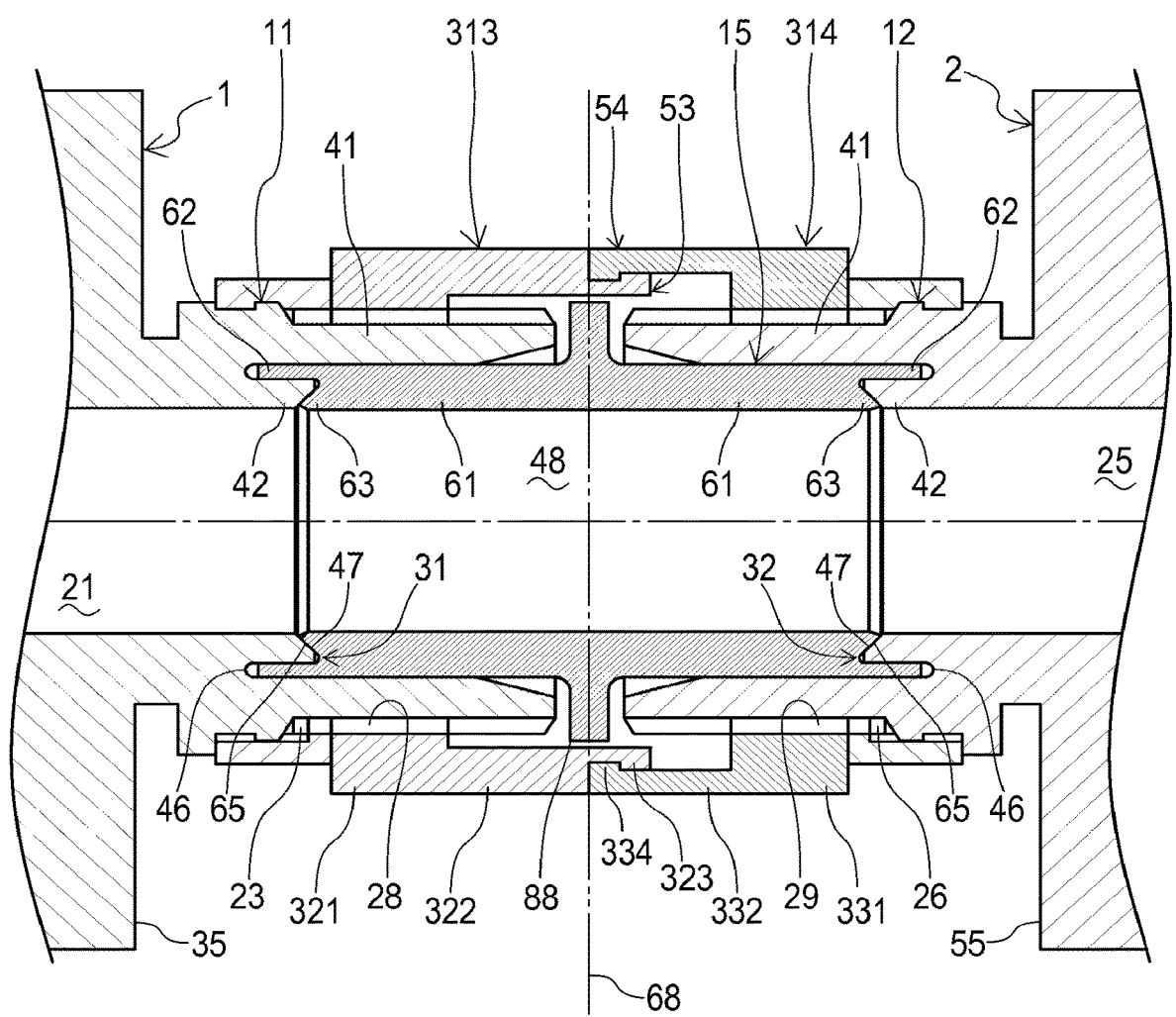
FIG. 12 is a cross-sectional view of a fitting assembly for fluid device according to a sixth embodiment of the first invention.
Figure 13:
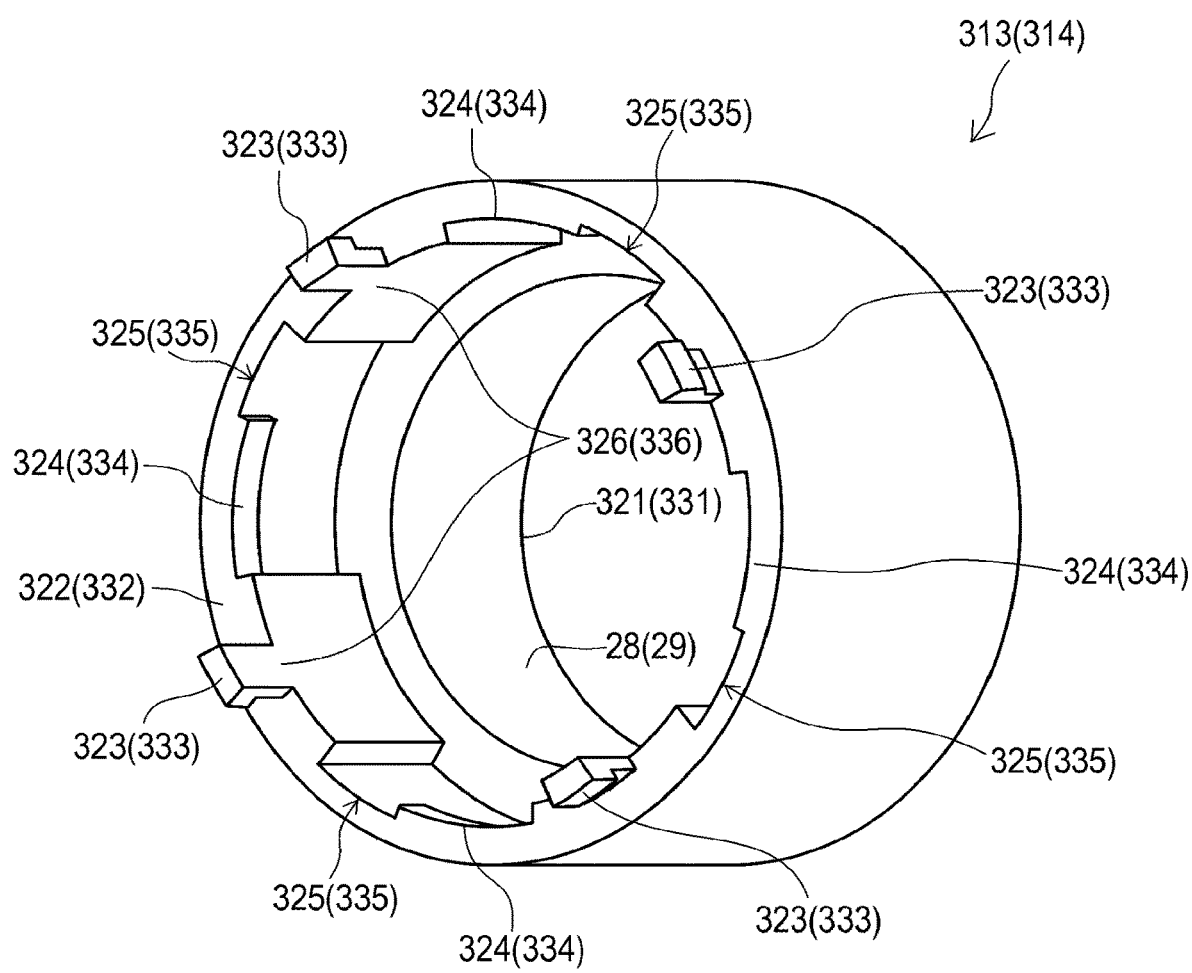
FIG. 13 is a perspective view of the first or second annular member of FIG. 12.
Figure 14:
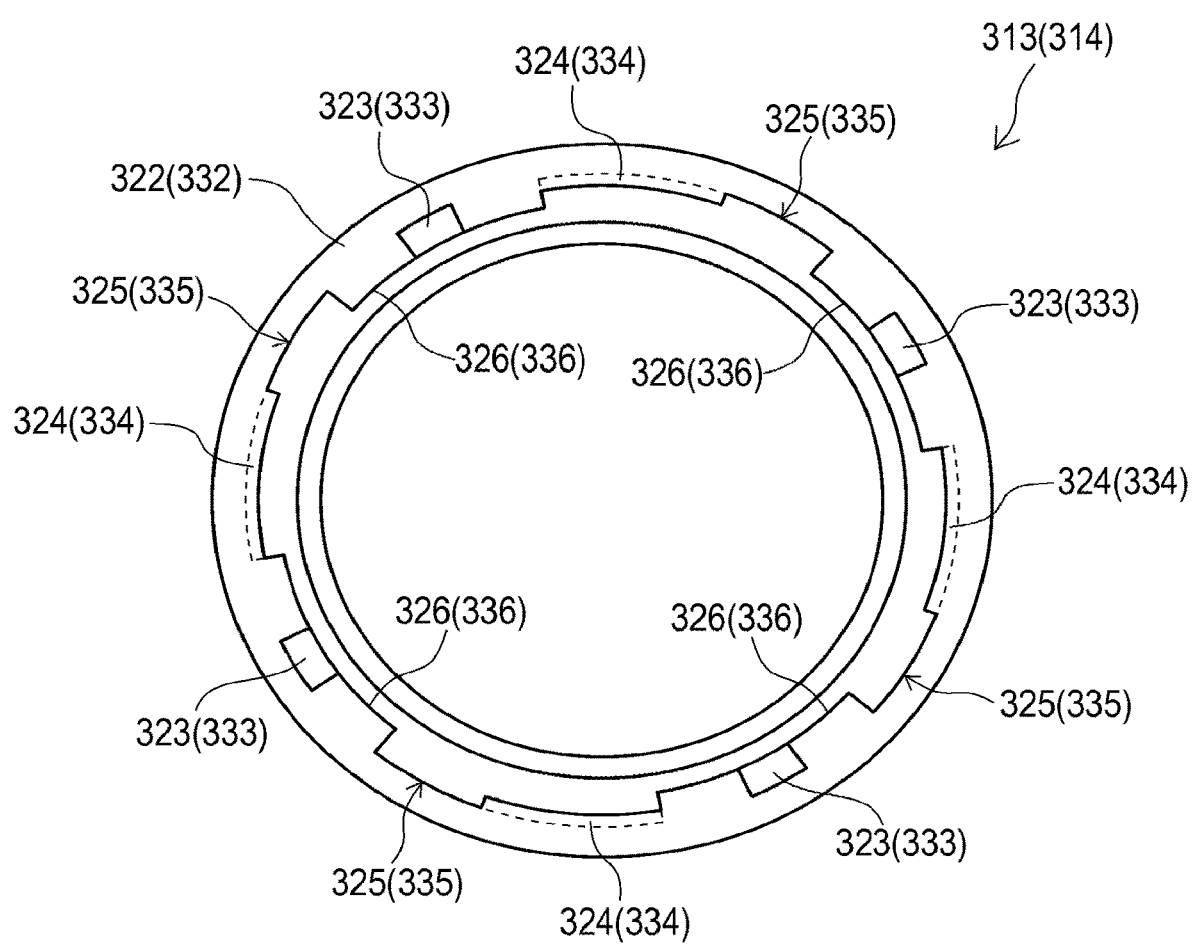
FIG. 14 is a front view of the first or second annular member of FIG. 12.

FIG. 12 is a cross-sectional view of a fitting assembly for fluid device according to the sixth embodiment of the first invention. FIG. 13 is a perspective view of the first or second annular member 313 or 314. FIG. 14 is a front view of the first or second annular member 313 or 314. Components of the fitting assembly substantially corresponding to ones according to the first embodiment are marked in FIGS. 12-14 with the same reference signs as the ones, and explanation on the components is omitted.

As shown in FIGS. 12-14, the fitting assembly differs from one according to the first embodiment in a first annular member 313 and a second annular member 314.

The first annular member 313 includes a fifth body 321 in addition to the first coupler 53. The fifth body 321 has an annular shape. The inner periphery of the fifth body 321 has a third thread 28. The first coupler 53 includes a third protrusion 322, third hooks 323, and first hook rests 324.

The third protrusion 322 protrudes from the fifth body 321 to the axial direction of the first annular member 313. The third hooks 323 protrude from the third protrusion 322 to the axial direction of the first annular member 313. The first hook rests 324 extend on the third protrusion 322 in the circumferential direction of the first annular member 313. Circumferential spaces between the third hooks 323 serve as first passages 325.

The fifth body 321 is mounted on the first port 11 to surround the whole circumference of the outer sleeve 41 of the first port 11 when the third thread 28 is engaged with the first thread 23. The fifth body 321 extends in the axial direction of the first annular member 313. The fifth body 321 is located on the second axial side (i.e. on the side nearer to the first fluid device 1) of the first annular member 313.

The third protrusion 322 of the first coupler 53 is located on the first axial side (i.e. on the side farther from the first fluid device 1) of the first annular member 313. The third protrusion 322 protrudes from the first axial end of the fifth body 321 to the first axial direction of the first annular member 313. The third protrusion 322 has an annular shape and disposed coaxially with the fifth body 321.

The third hooks 323 of the first coupler 53 are placed at the tip end of the third protrusion 322. The third hooks 323 protrude from the first axial end of the third protrusion 322 to the first axial direction of the first annular member 313. The tip end of each third hook 323 has a third corner.

The first coupler 53 has at least one third hook, for example, four third hooks 323, which are arranged along the circumference of the third protrusion 322 (i.e. the first annular member 313) at certain intervals. The third hooks 323 are disposed radially inside the outer periphery of the third protrusion 322.

The first hook rests 324 of the first coupler 53 are placed at the tip end of the third protrusion 322. The first hook rests 324 each extend along the circumference of the third protrusion 322. The first hook rests 324 are located on the inner periphery of the third protrusion 322 and protrude to the radial inside of the third protrusion 322.

The first hook rests 324 are each adjacent to one of the first passages 325 in the circumferential direction of the third protrusion 322 between a pair of the third hooks 323. The first passages 325 each have a wall at the radial outside of one of the first hook rests 324. The first passages 325 extends in the direction in which the third hooks 323 protrude.

The second annular member 314 has the same shape as the first annular member 313. This is not a limited condition. The second annular member 314 may differ in shape from the first annular member 313.

The second annular member 314 has a sixth body 331 in addition to the second coupler 54. The sixth body 331 has an annular shape. The fourth thread 29 is placed at the inner periphery of the sixth body 331. The second coupler 54 includes a fourth protrusion 332, fourth hooks 333, and second hook rests 334.

The fourth protrusion 332 protrudes from the sixth body 331 to the axial direction of the second annular member 314. The fourth hooks 333 protrude from the fourth protrusion 332 to the axial direction of the second annular member 314. The second hook rests 334 are placed along the circumference of the second annular member 314. Circumferential spaces between the fourth hooks 333 serve as second passages 335.

The sixth body 331 is mounted on the second port 12 to surround the whole circumference of the outer sleeve 41 of the second port 12 when the fourth thread 29 is engaged with the second thread 26. The sixth body 331 extends in the axial direction of the second annular member 314. The sixth body 331 is placed on the second axial side (i.e. on the side nearer to the second fluid device 2) of the second annular member 314.

The fourth protrusion 332 of the second coupler 54 is placed on the first axial side (i.e. on the side farther from the second fluid device 2) of the second annular member 314. The fourth protrusion 332 protrudes from the first axial end of the sixth body 331 to the first axial direction of the second annular member 314. The fourth protrusion 332 has an annular shape and disposed coaxially with the sixth body 331.

The fourth hooks 333 of the second coupler 54 are placed at the tip end of the fourth protrusion 332. The fourth hooks 333 protrude from the first axial end of the fourth protrusion 332 to the first axial direction of the second annular member 314. The tip end of each fourth hook 333 has a fourth corner.

The second coupler 54 has at least one fourth hook, for example, two fourth hooks 333, which are arranged along the circumference of the fourth protrusion 332 (i.e. the second annular member 314) at certain intervals. The fourth hooks 333 are located at the radial inside of the outer periphery of the fourth protrusion 332.

The second hook rests 334 of the second coupler 54 are placed at the tip end of the fourth protrusion 332. The second hook rests 334 extends along the circumference of the fourth protrusion 332. The second hook rests 334 are located on the inner periphery of the fourth protrusion 332 and each protrude radially inward to be engaged with one of the fourth hooks 333.

The second hook rests 334 are each adjacent to one of the second passages 335 in the circumferential direction of the fourth protrusion 332 between a pair of the fourth hooks 333. The second passages 335 each have a wall at the radial outside of one of the second hook rests 334. The second passages 335 extends in the direction in which the fourth hooks 333 protrude.

A user rotatably couples the first annular member 313 with the second annular member 314 to make the third protrusion 322 and the fourth protrusion 332 face each other. The first annular member 313 is placed at the radial inside of the second annular member 314 to pass the third hooks 323 through the second passages 335 and pass the fourth hooks 333 through the first passages 325. After that, the user rotates the first annular member 313 relative to the second annular member 314.

Thus, the third hooks 323 are engaged with the second hook rests 334, and the fourth hooks 333 are engaged with the first hook rests 324 to prevent the first and second annular member 313 and 314 from moving away from each other. The third hooks 323 are axially engaged with the second hook rests 334, and the fourth hooks 333 are axially engaged with the first hook rests 324.

Engagement of the third hooks 323 with the second hook rests 334 forms the first and second sealing portions 31 and 32. In other words, the engagement causes the connector 15 to press its first protrusions 62 into the corresponding grooves 46 and press the tapered faces 65 of its second protrusions 63 onto the corresponding slopes 47 of the tip ends 44 of the inner sleeves 42.

Engagement of the fourth hooks 333 with the first hook rests 324 forms the first and second sealing portions 31 and 32. In other words, the engagement causes the connector 15 to press its first protrusions 62 into the corresponding grooves 46 and press the tapered faces 65 of its second protrusions 63 onto the corresponding slopes 47 of the tip ends 44 of the inner sleeves 42.

The first annular member 313 is made of certain resin, for example, fluoropolymer such as PFA, PVDF, ETFE, FEP, or PTFE. Similarly, the second annular member 314 is made of certain resin, for example, fluoropolymer such as PFA, PVDF, ETFE, FEP, or PTFE.

The user coaxially couples the first annular member 313 with the second annular member 314 to pass the third hooks 323 through the second passages 335 and pass the fourth hooks 333 through the first passages 325. After that, the user rotates the first annular member 313 relative to the second annular member 314. Thus, the third hooks 323 are engaged with the second hook rests 334, and the fourth hooks 333 are engaged with the first hook rests 324.

Thus, the first and second annular members 313 and 314 are fixed to each other not to axially move away from each other. This prevents the first and second ports 11 and 12 from moving away from each other and maintains the first and second fluid devices 1 and 2 connected with each other to allow fluid to flow between each other.

Engagement of the third hooks 323 with the second hook rests 334 and engagement of the fourth hooks 333 with the first hook rests 324 form the first and second sealing portions 31 and 32. In other words, such engagements cause the connector 15 to press its first protrusions 62 into the corresponding grooves 46 and press the tapered faces 65 of its second protrusions 63 onto the corresponding slopes 47 of the tip ends 44 of the inner sleeves 42.

The fitting assembly according to the sixth embodiment does not need any member such as a tube between the first and second fluid devices 1 and 2 for connection between the fluid devices to allow fluid to flow between each other. Accordingly, the fitting assembly enables the two fluid devices to be connected as closely to each other as possible and can reduce space for installation of the fluid devices 1 and 2. The fitting assembly can also prevent fluid leakage from the junction of the two fluid devices 1 and 2.

The following explains a first embodiment of the second invention with reference to drawings.

Figure 15:
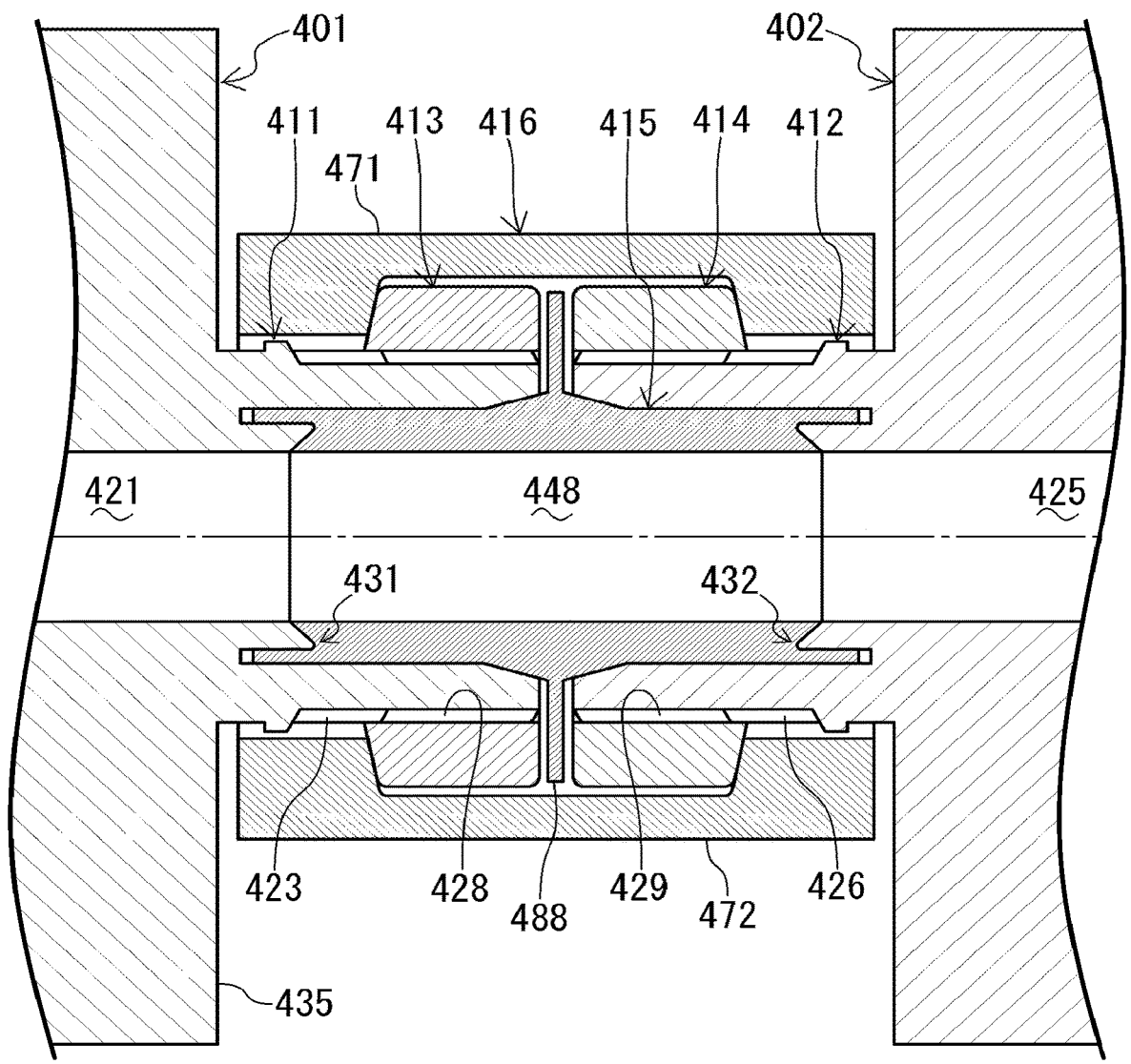
FIG. 15 is a cross-sectional view of a fitting assembly for fluid device according to a first embodiment of the second invention.
Figure 16:
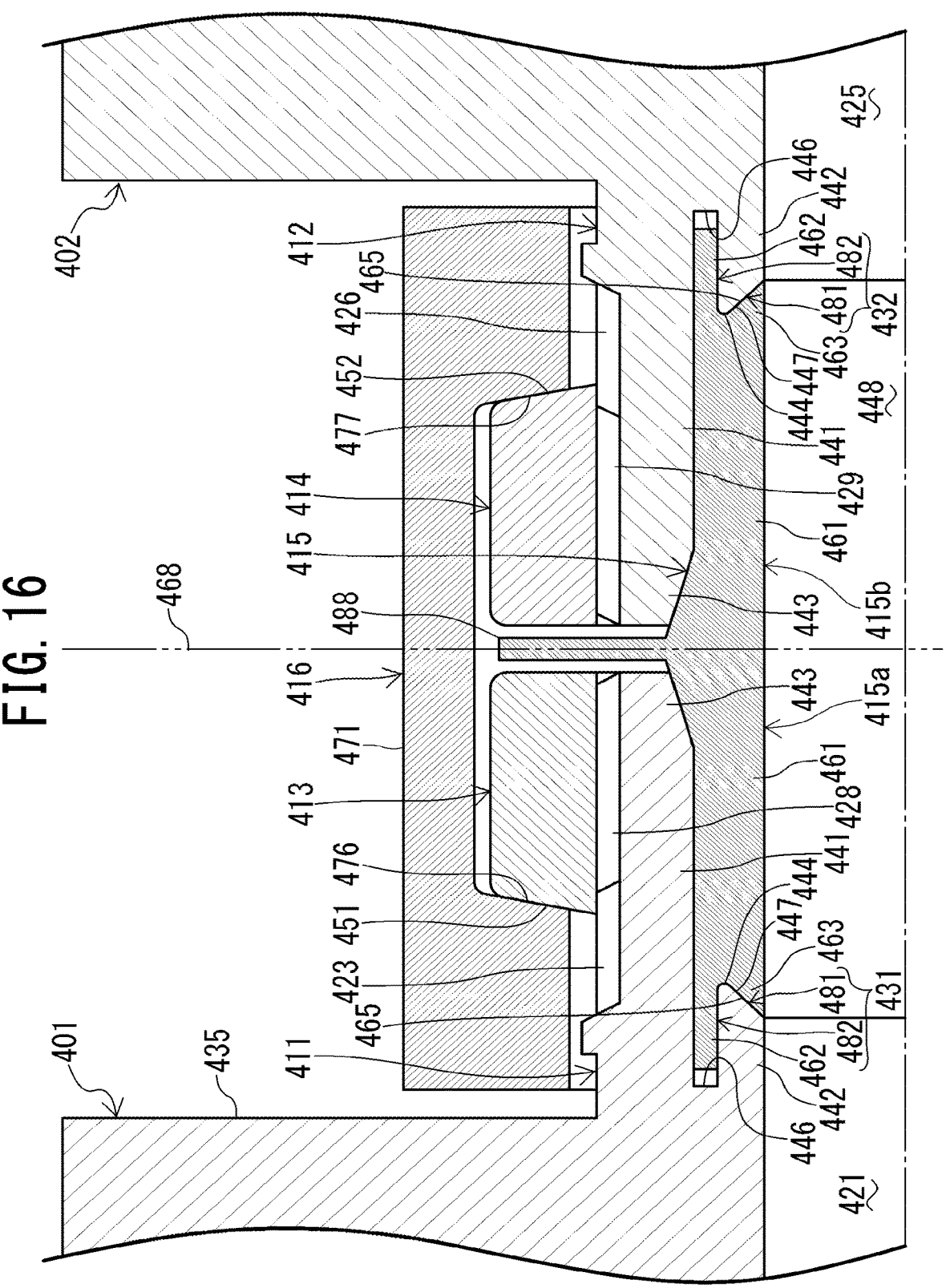
FIG. 16 is a partially enlarged view of FIG. 15.

FIG. 15 is a cross-sectional view of a fitting assembly for fluid device according to the first embodiment of the second invention. FIG. 16 is a partially enlarged view of FIG. 15.

As shown in FIGS. 15 and 16, the fitting assembly is used to connect the first fluid device 401 with the second fluid device 402 to allow fluid to flow between the devices.

The first fluid device 401 and the second fluid device 402 have shapes to be placed as closely to each other as possible. The first and second fluid devices 401 and 402 include, but are not limited to, devices with certain fluid channels such as valves, fluid meters, pumps, and fittings.

The fitting assembly includes a first port 411, a second port 412, a first annular member 413, a second annular member 414, a connector 415, and a securing member 416.

The first port 411 is installed at the first fluid device 401. The first port 411 is connected with the first fluid channel 421 of the first fluid device 401. The first port 411 has an annular shape.

The second port 412 is installed at the second fluid device 402. The second port 412 is connected with the second fluid channel 425 of the second fluid device 402. The second port 412 has an annular shape.

The first annular member 413 is mounted on the outer periphery of the first port 411.

The second annular member 414 is mounted on the outer periphery of the second port 412.

The connector 415 is installed between the first port 411 and the second port 412. The connector 415 seals a gap between the connector 415 and the first port 411 and seals a gap between the connector 415 and the second port 412.

A first sealing portion 431 is a volume where a gap between the connector 415 and the first port 411 is sealed. A second sealing portion 432 is a volume where a gap between the connector 415 and the second port 411 is sealed.

The securing member 416 secures one of the first annular member 413 and the second annular member 414 to the other to bring the one closer to the other when the connector 415 is installed between the first port 411 and the second port 412.

The two fluid devices 401 and 402 make their respective ports 411 and 412 axially face each other.

The first port 411 is installed at the first fluid device 401 and integrated with the casing 435 of the first fluid device 401. This is not a limited condition. The first port 411 may be separated from the casing 435.

The first port 411 has an outer sleeve 441 and an inner sleeve 442. The outer sleeve 441 is a circular cylinder of substantially constant diameters, which is disposed around the opening of the first fluid channel 421 in the casing 435 to protrude to the outside of the casing 435.

The outer sleeve 441 allows a portion of the connector 415 to enter the tip end (i.e. the first axial end) 443 of the outer sleeve 441. When the outer sleeve 441 receives the portion of the connector 415, there is substantially no radial gap between the outer sleeve 441 and the portion of the connector 415.

The outer sleeve 441 includes a first thread 423, which is located on the outer periphery of the outer sleeve 441 and extends along the axial direction of the outer sleeve 441. The first thread 423 is an external thread.

The inner sleeve 442 is a circular cylinder of substantially constant outer diameters smaller than the inner diameter of the outer sleeve 441. The inner sleeve 442 is disposed around the opening of the first fluid channel 421 in the casing 435 to protrude in the same direction as the outer sleeve 441, i.e. in the first axial direction of the first port 411. The inner sleeve 442 is located inside the outer sleeve 441 and separated by a radial distance from the outer sleeve 441. The inner sleeve 442 extends coaxially with the outer sleeve 441.

The tip end 444 of the inner sleeve 442 is located nearer to the casing 435 than the tip end 443 of the outer sleeve 441. In other words, the inner sleeve 442 protrudes from the casing 435 to a distance shorter than the outer sleeve 441. Thus, the first port 411 has a twofold-annular structure on the second axial side (i.e. the side nearer to the casing 435) of the outer sleeve 441.

The inner sleeve 442 has substantially the same inner diameter as the first fluid channel 421 and the connector 415. The inner sleeve 442 is located between the first fluid device 401 and the connector 415 to connect the first fluid channel 421 with the internal space 448 of the connector 415, thus making the first port 411 connect the first fluid device 401 with the connector 415 to allow fluid to flow between them.

There is an annular groove 446 between the outer periphery of the inner sleeve 442 and the inner periphery of the outer sleeve 441. The groove 446 is open in the direction in which the outer and inner sleeves 441 and 442 protrude and extends along the whole circumference of the sleeves 441 and 442. There is a slope 447 around the tip end 444 of the inner sleeve 442. The slope 447 increases in diameter from its side nearer to the first fluid channel 421 to the tip end 444 of the inner sleeve 442.

The first port 411 is made of certain resin, for example, fluoropolymer such as PFA, PVDF, ETFE, FEP, or PTFE. The resin is not limited to fluoropolymer, but it may be PP or other resin.

The second port 412 has a reflected shape of the first port 411 with respect to a virtual center plane 468. Since the second port 412 has substantially the same shape as the first port 411, components of the second port 412 corresponding to ones of the first port 411 are marked with the same reference signs as the corresponding ones of the first port 411, and explanation on the components is omitted. For the explanatory convenience, substantially the corresponding components can be marked with different reference signs, such as the first thread 423 and the second thread 426.

The first annular member 413 surrounds the first port 411, esp. its outer sleeve 441 and is releasably fixed to (the outer sleeve 441 of) the first port 411.

The first annular member 413 has an axial length shorter than the first thread 423 of the first port 411. The first annular member 413 is separated by an axial distance from the first fluid device 401.

The first annular member 413 has a third thread 428, which is located on the inner periphery of the first annular member 413. The third thread 428 is engaged with the first thread 423. The first annular member 413 is, for example, a nut.

The axial end nearer to the first fluid device 401 of the first annular member 413 has a tapered face 451, which reduces in diameter from the side nearer to the virtual center plane 468 (i.e. nearer to the second annular member 414) toward the first fluid device 401. Preferably, the first annular member 413 protrudes to a radius shorter than the radius of the casing 435 of the first fluid device 401.

The tapered face 451 and a below-described tapered face 452 may have reflected shapes of those shown in FIG. 16. In other words, the tapered faces 451 and 452 may increase in diameter from the side nearer to the virtual center plane 468 toward the fluid device 401 or 402.

The second annular member 414 surrounds the second port 412, esp. its outer sleeve 441 and is releasably fixed to (the outer sleeve 441 of) the second port 412. The second annular member 414 axially faces the first annular member 413.

The second annular member 414 surrounds the outer sleeve 441 of the second port 412. The second annular member 414 is releasably mounted on the outer sleeve 441 of the second port 412.

The second annular member 414 has an axial length shorter than the second thread 426 of the second port 412. The second annular member 414 is separated by an axial distance from the second fluid device 402.

The second annular member 414 has a fourth thread 429, which is located on the inner periphery of the second annular member 414. The fourth thread 429 is engaged with the second thread 426. The second annular member 414 is, for example, a nut.

The axial end nearer to the second fluid device 402 of the second annular member 414 has a tapered face 452, which reduce in diameter from the side nearer to the virtual center plane 468 (i.e. nearer to the first annular member 413) to the side nearer to the second fluid device 402. The second annular member 414 has a reflected shape of the first annular member 413 with respect to the virtual center plane 468. The second annular member 414 has substantially the same shape as the first annular member 413.

The first annular member 413 is made of certain resin, for example, fluoropolymer such as PFA, PVDF, ETFE, FEP, or PTFE. Similarly, the second annular member 414 is made of certain resin, for example, fluoropolymer such as PFA, PVDF, ETFE, FEP, or PTFE.

The connector 415 has a first sealing portion 431 and a second sealing portion 432. The first sealing portion 431 seals a gap between the connector 415 and the first port 411. The second sealing portion 432 seals a gap between the connector 415 and the second port 412.

The connector 415 has an annular shape. The connector 415 has a first portion 415a in contact with the first port 411 and a second portion 415b in contact with the second port 412. See FIG. 16. The first portion 415a is a circular cylinder of substantially constant diameters and has a fluid channel, which is a portion of the internal space 448 of the connector 415. The first portion 415a is mounted on the first port 411 such that it is placed on the outer sleeve 441 to connect the fluid channel with the first fluid channel 421.

The first portion 415a includes a body 461, a first protrusion 462, and a second protrusion 463. The body 461 is a circular cylinder, which is coupled with the outer sleeve 441 such that its outer periphery is surrounded by the outer sleeve 441 when the first portion 415a is mounted on the first port 411. The first protrusion 462 and the second protrusion 463 are located at an axial end (nearer to the first fluid device 401) of the body 461.

The first and second protrusions 462 and 463 each have a circular ring shape. The whole circumference of the first protrusion 462 is pressed into the groove 446 of the first port 411 when the first portion 415a is mounted on the first port 411. The first protrusion 462 does not contact an inner face of the groove 446 on its side nearer to the first fluid device 401.

The second protrusion 463 has a tapered face 465, which reduces in diameter from its side nearer to the virtual center plane 468 to its side nearer to the first fluid device 401. The tapered face 465 is located radially inside the first protrusion 462. The tapered face 465 axially faces the slope 447 of the inner sleeve 442. The tapered face 465 is pressed onto the slope 447 of the inner sleeve 442 when the first portion 415a is mounted on the first port 411.

The connector 415 has a shape symmetric with respect to the virtual center plane 468, which is perpendicular to the axial direction of the connector 415 and located at the axial center of the connector 415. Since the first portion 415a has substantially the same shape as the second portion 415b, components of the second portion 415b and substantially the same ones of the first portion 415a are marked with the same reference signs, and details on the components are omitted.

The connector 415 is made of certain resin, for example, fluoropolymer such as PFA, PVDF, ETFE, FEP, or PTFE, or other thermoplastic resin.

The connector 415 is a body integrated with the first and second portions 415a and 415b, which have substantially the same shape. Alternatively, the connector 415 may be an assembly of first and second portions, which differ in shape.

The securing member 416 secures one of the first and second annular members 413 and 414 to the other when the third thread 428 of the first annular member 413 is engaged with the first thread 423 of the first port 411 and the fourth thread 429 of the second annular member 414 is engaged with the second thread 426 of the second port 412. The two fluid devices 401 and 402 make their respective ports 411 and 412 face each other.

Figure 17:
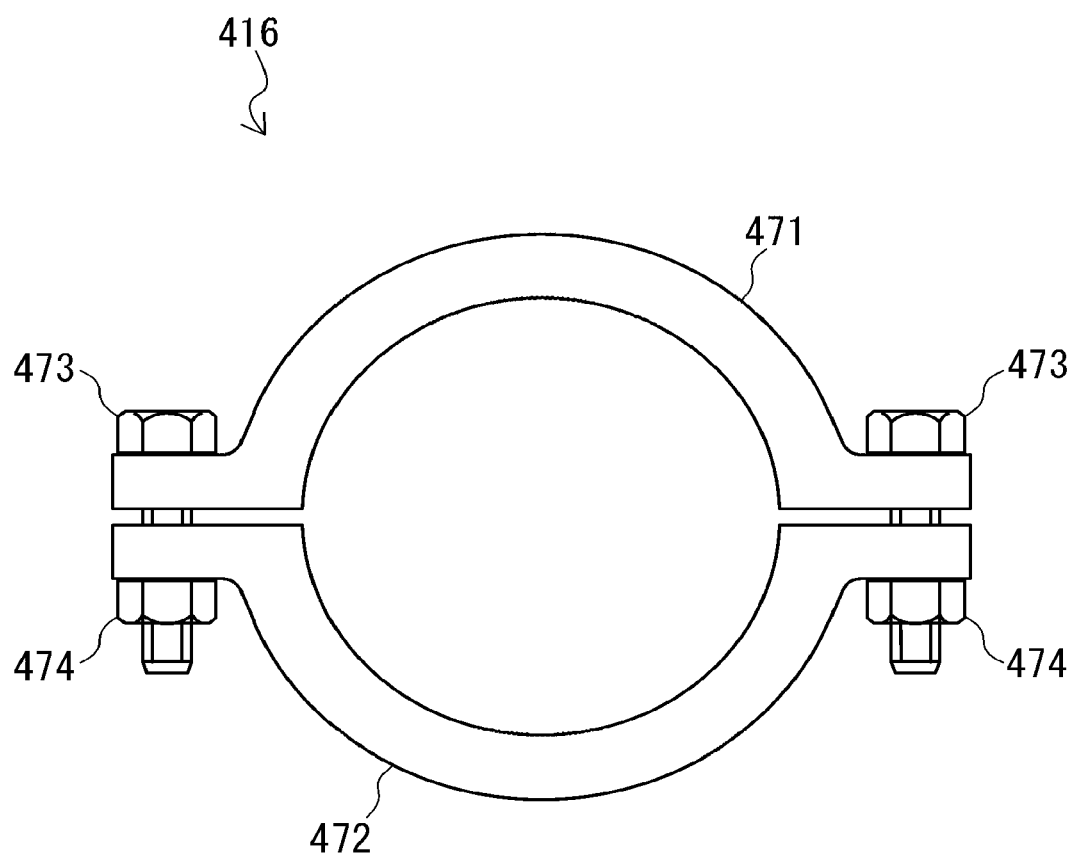
FIG. 17 is a side view of a securing member of the fitting assembly of FIG. 15.

The securing member 416 is, for example, a clump. As shown in FIG. 17, the clump has a pair of clump pieces 471 and 472 and two pairs of bolts 473 and annular members 474 such as nuts. The clump pieces 471 and 472 each have substantially a semicircular shape.

The pair of the clump pieces 471 and 472 is combined to form a circle. The pair of the clump pieces 471 and 472 (the securing member 416) are arranged coaxially with the first and second annular member 413 and 414.

The inner periphery of each clump piece 471 or 472 has a slope 476 or 477, which contacts the tapered face 451 or 452 of the first or second annular member 413 or 414. The slope 476 or 477 faces the tapered face 451 or 452 in the axial direction of the securing member 416 (i.e. the pair of the clump pieces 471 and 472).

The slope 476 is located nearer to the first fluid device 401 than the first annular member 413. The slope 476 is substantially parallel to the tapered face 451. The slope 476 reduces in diameter from the side nearer to the virtual center plane 468 (i.e. nearer to the second annular member 414) to the side nearer to the first fluid device 401.

The slope 477 is located nearer to the second fluid device 402 than the second annular member 414. The slope 477 is substantially parallel to the tapered face 452. The slope 477 reduces in diameter from the side nearer to the virtual center plane 468 (i.e. nearer to the first annular member 413) to the side nearer to the second fluid device 402.

The clump piece 471 makes the slope 476 contact the tapered face 451. The clump piece 472 makes the slope 477 contact the tapered face 452. Axially between the clump pieces 471 and 472, the first and second annular members 413 and 414 are placed. In addition, the annular members 474 at both longitudinal (or circumferential) ends of the clump pieces 471 and 472 are secured with the bolts 473.

The above-described structure connects the first fluid device 401 with the second fluid device 402 to allow fluid to flow between them. The clump serving as the securing member 416 is placed radially outside the first and second ports 411 and 412. The securing member 416 acts force to secure the first and second annular members 413 and 414 to the virtual center plane 468, which is located axially inside the first and second annular members 413 and 414. Thus, the first protrusion 462 of the connector 415 is pressed into the groove 446, and the tapered face 465 of the second protrusion 463 is pressed onto the tip end 444 and the slope 447 of the inner sleeve 442.

Accordingly, the first sealing portion 431 seals the gap between the connector 415 and the first port 411, and the second sealing portion 432 seals the gap between the connector 415 and the second port 412. The first and second sealing portions 431 and 432 each form a primary sealing area 481 and a secondary sealing area 482. The primary sealing area 481 acts axially sealing force, and the secondary sealing area 482 acts radially sealing force.

Under the condition that the first fluid device 401 is connected with the second fluid device 402 to allow fluid to flow between each other, the securing member 416 is further secured with the bolt 473. Accordingly, the first annular member 413 axially approaches the second annular member 414. Thus, the slopes 476 and 477 are further pressed onto the tapered faces 451 and 452. As a result, the tapered face 465 of each second protrusion 463 is further pressed onto the slope 447 of the tip end 444 of the inner sleeve 442.

The fitting assembly according to the first embodiment of the second invention can prevent fluid leakage from the junction of the two fluid devices 401 and 402. The fitting assembly does not need any member such a tube between the first and second fluid devices 401 and 402 to connect the first fluid device 401 with the second fluid device 402 to allow fluid to flow between them. Accordingly, the fitting assembly enables the two fluid devices 401 and 402 to be placed as closely to each other as possible and connect one with the other to allow fluid to flow between them. This can reduce space for installation of the fluid devices 401 and 402.

The first and second fluid devices 401 and 402 can be moved by the first and second annular members 413 and 414 moving when the securing member 416 is being secured with the bolts 473. This is not a limited condition. The first and second fluid devices may be fixed to somewhere not to be moved by the first and second annular members 413 and 414. Even in this case, the invention is also applicable.

The connector 415 has an extending portion 488, which is located between the first port 411 and the second port 412 when the first fluid device 401 is connected with the second fluid device 402 to allow fluid to flow between each other.

The extending portion 488 is separated from both the first and second ports 411 and 412. The extending portion 488 is a ring extending radially outside the connector 415.

The extending portion 488 has an outer diameter larger than the tip ends 443 of the first and second ports 411 and 412. The extending portion 488 is located on the virtual center plane 468 of the connector 415 and at the axial intermediate portion of the connector 415, i.e. the boundary between the first and second portions 415a and 415b of the connector 415.

The extending portion 488 is located between the tip ends 443 and 443 of the first and second ports 411 and 412 when the connector 415 is mounted on the first and second ports 411 and 412. The extending portion 488 axially faces the tip ends 443 and 443 of the first and second ports 411 and 412. The extending portion 488 facilitates release of the connector 415 from the first and second ports 411 and 412.

The securing member 416 is the above-described clump. This is not a limited condition. The securing member may be a clump with a pair of clump pieces rotatably coupled with each other with a pivot pin. The clump secures the pair of clump pieces stacked one on top of another with bolts and nuts.

The following explains second to fifth embodiments of the second invention with reference to FIGS. 18-21. Components of fitting assemblies substantially corresponding to ones of the fitting assembly according to the first embodiment of the second invention are marked in FIGS. 18-21 with the same reference signs as the ones, and explanation on the components is omitted.

Figure 18:
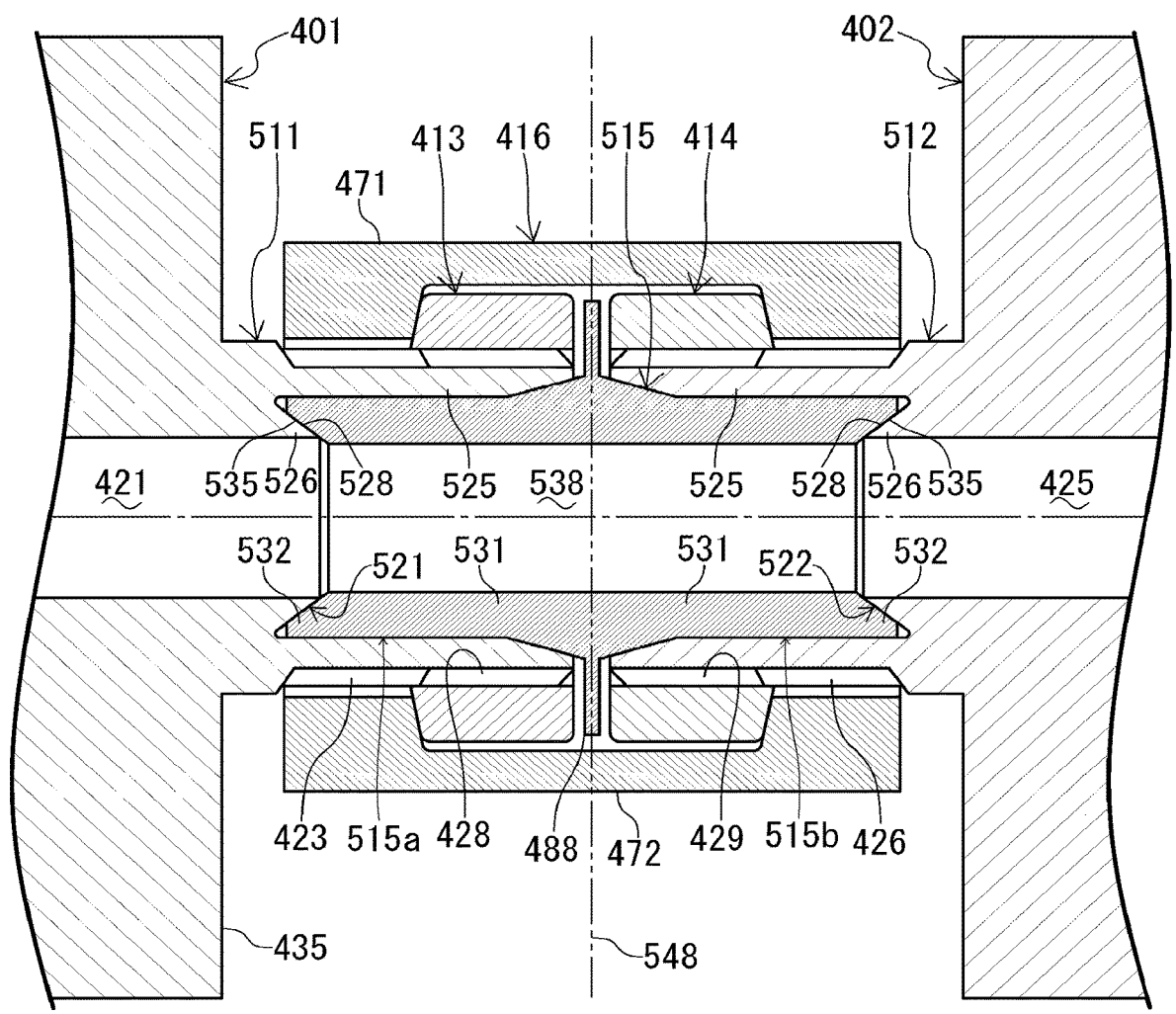
FIG. 18 is a cross-sectional view of a fitting assembly for fluid device according to a second embodiment of the second invention.

FIG. 18 is a cross-sectional view of a fitting assembly for fluid device according to the second embodiment of the second invention. As shown in FIG. 18, the fitting assembly differs from one according to the first embodiment of the second invention in the following configuration: a first sealing portion 521 that seals a gap between the first port 511 and the connector 515; and a second sealing portion 522 that seals a gap between the second port 512 and the connector 515.

The first port 511 is installed at the first fluid device 401 and integrated with the casing 435 of the first fluid device 401. The first port 511 has an annular body 525 and a protruding ring 526. The annular body 525 is a circular cylinder of substantially constant inner diameters, which is installed around the opening of the first fluid channel 421 in the casing 435 to protrude toward the outside of the casing 435.

The annular body 525 allows a portion of the connector 515 to enter the tip end (i.e. the first axial end) of the annular body 525. When the annular body 525 receives the portion of the connector 515, there is substantially no gap between the annular body 525 and the portion of the connector 515. The outer periphery of the annular body 525 has a first thread 423 extending in the axial direction of the annular body 525. The first thread 423 is an external thread.

The protruding ring 526 is a ring of an outer diameter smaller than the inner diameter of the annular body 525. The protruding ring 526 is placed around the opening of the first fluid channel 421 in the casing 435 to protrude to the same direction as the annular body 525 (i.e. to the first axial direction of the annular body 525). The protruding ring 526 is located inside the annular body 525 to be separated by a radial distance from the annular body 525.

The protruding ring 526 has substantially the same inner diameter as the first fluid channel 421 and the connector 515. The protruding ring 526 is placed between the first fluid device 401 and the connector 515 to connect the first fluid channel 421 with the internal space 538 of the connector 515. The port 511 connects the first fluid device 401 with the connector 515 to allow fluid to flow between them.

The outer periphery of the protruding ring 526 includes a tapered face 528, which reduces in diameter to the direction in which the protruding ring 526 protrudes, i.e. to the first axial direction of the first port 511. The tapered face 528 extends along the whole circumference of the protruding ring 526 and is separated by a distance from the inner periphery of the annular body 525.

The second port 512 has substantially the same shape as the first port 511. Accordingly, components of the second port 512 substantially corresponding to ones of the first port 511 are marked with the same reference signs as the ones, and explanation on the components is omitted. For explanatory convenience, substantially the same components can be marked with different reference signs, such as the first thread 423 and the second thread 426.

The connector 515 has a first portion 515a in contact with the first port 511 and a second portion 515b in contact with the second port 512. The first portion 515a is a circular cylinder of substantially constant inner diameters, whose internal space serves as a fluid channel. The first portion 515a is mounted on the first port 511 such that it is placed on the annular body 525 to connect its fluid channel with the first fluid channel 421.

The first portion 515a includes a body 531 and a protrusion 532. The body 531 is a circular cylinder, which is placed on the inner periphery of the annular body 525 when the first portion 515a is mounted on the first port 511. The protrusion 532 axially protrudes from the first axial end (i.e. the end nearer to the first fluid device 401) of the body 531.

The protrusion 532 has a circular ring shape with a slope 535 on the inner periphery of the protrusion 532. The protrusion 532 presses the slope 535 onto the tapered face 528 of the protruding ring 526 when the first portion 515a is mounted on the first port 511. The slope 535 increases in diameter to the direction in which the protrusion 532 protrudes (i.e. toward the first fluid device 401). The slope 535 extends along the whole circumference of the protrusion 532.

The connector 515 has a shape symmetric with respect to a virtual center plane 548, which is perpendicular to the axial direction of the connector 515 and located at the axial center of the connector 515. The first portion 515a and the second portion 515b have substantially the same shape.

The fitting assembly, like one according to the first embodiment of the second invention, can reduce space for installation of the first fluid device 401 and the second fluid device 402 connected with each other to allow fluid to flow between each other. The connector 515 forms a first sealing portion 521 and a second sealing portion 522 during connection between the first and second fluid devices 401 and 402. The connector 515 presses the slope 535 of the first portion 515a onto the tapered face 528 of the first port 511 and presses the slope 535 of the second portion 515b onto the tapered face 528 of the second port 512.

This prevents fluid leakage from the junction of the first and second fluid devices 401 and 402 and achieves short-distance connection between the first and second fluid device 401 and 402 without any member such as tubes.

Figure 19:
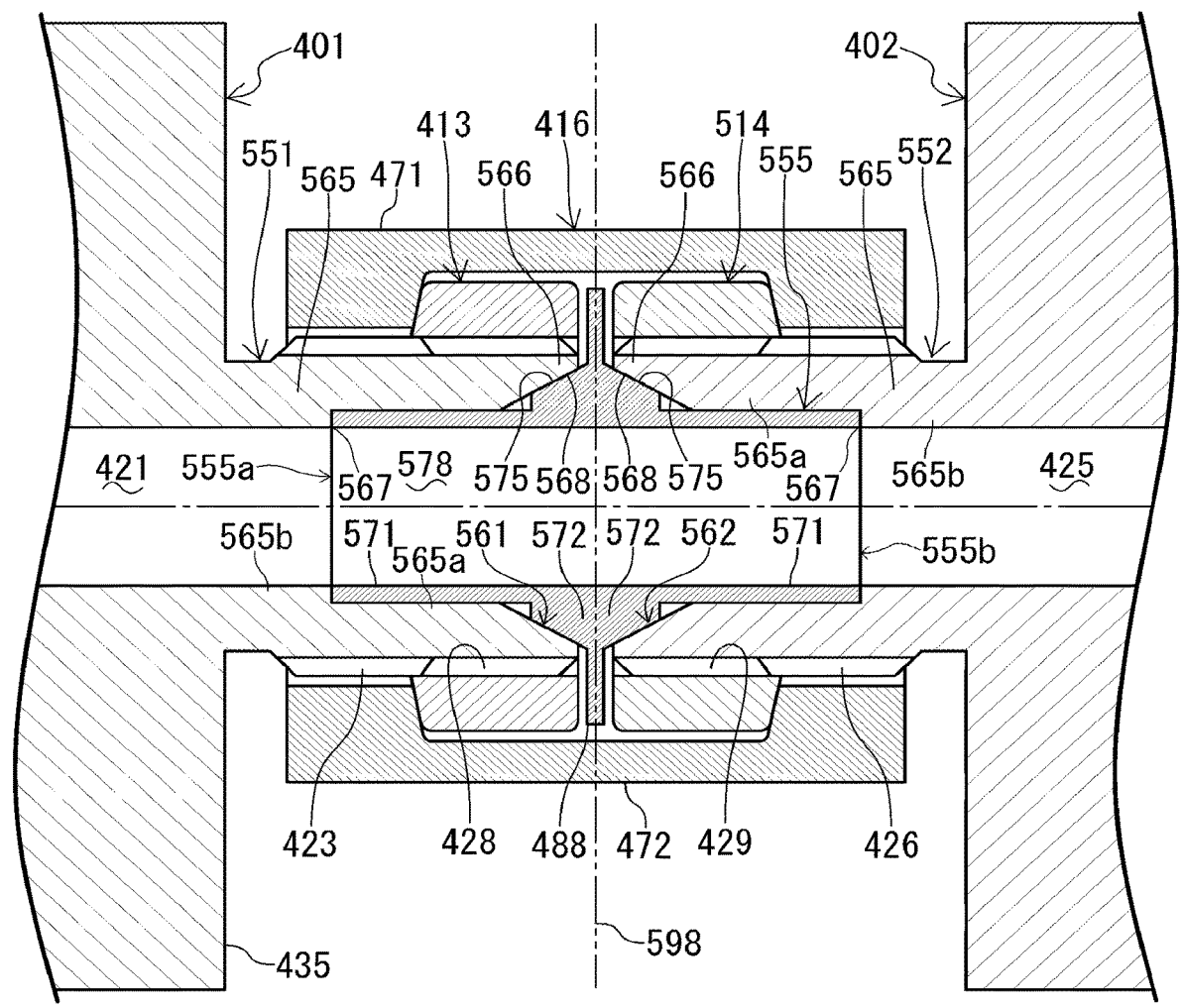
FIG. 19 is a cross-sectional view of a fitting assembly for fluid device according to a third embodiment of the second invention.

FIG. 19 is a cross-sectional view of a fitting assembly for fluid device according to a third embodiment of the second invention. As shown in FIG. 19, the fitting assembly differs from one according to the first embodiment of the second invention in the following configuration: a first sealing portion 561 that seals a gap between the first portion 551 and the connector 555; and a second sealing portion 562 that seals a gap between the second portion 552 and the connector 555.

The first portion 551 is installed at the first fluid device 401 and integrated with the casing 435 of the first fluid device 401. The outer periphery of the first port 551 has a first thread 423 extending along the axial direction of the first port 551. The first thread 423 is an external thread.

The first port 551 has an annular body 565 and a protrusion 566. The annular body 565 is a circular cylinder with a step on its inner periphery. The annular body 565 protrudes away from the casing 435. The annular body 565 is located around the opening of the first fluid channel 421 in the casing 435.

The annular body 565 has a first annular portion 565*a* on the first axial side (i.e. the side nearer to the opening of the first port 551) of the step 567. The first annular portion 565*a* allows a portion of the connector 555 to enter the first annular portion 565*a*. When receiving the portion of the connector 555, the first annular portion 565*a* closely contacts substantially the whole outer periphery of the portion of the connector 555.

The annular body 565 has a second annular portion 565*b* on the second axial side (i.e. the side nearer to the first fluid device 401) of the step 567. The second annular portion 565*b* has substantially the same inner diameter as the first fluid channel 421 and the connector 555. The second annular portion 565*b* is disposed between the first fluid device 401 and the connector 555 to connect the first fluid channel 421 with the internal space 578 of the connector 555, and thereby, to make the first port 551 connect the first fluid device 401 with the connector 555 to allow fluid to flow between them.

The protrusion 566 is a ring protruding from the first annular portion 565*a* to the first axial direction of the annular body 565. The inner periphery of the protrusion 566 has a slope 568, which increases in diameter from the annular body 565 to the tip end of the protrusion 566, i.e. to the opening of the first port 551. The slope 568 extends along the whole circumference of the protrusion 566.

The second port 552 has a reflected shape of the first port 551 with respect to the virtual center plane 598, i.e. substantially the same shape as the first port 551.

The connector 555 has a first portion 555*a* in contact with the first port 551 and a second portion 555*b* in contact with the second port 552. The first portion 555*a* is a circular cylinder of substantially constant inner diameters, whose internal space serves as a fluid channel. The first portion 555*a* is placed on the annular body 565 and mounted on the first port 551 to connect the internal space 578, which serves as the fluid channel, with the first fluid channel 421.

The first portion 555*a* has a body 571 and a protrusion 572. The body 571 is a circular cylinder, which is coupled with the annular body 565 to be surrounded by the annular body 565 when the first portion 555*a* is mounted on the first port 551. The protrusion 572 protrudes from an end of the body 571 (i.e. an axially intermediate portion of the connector 555) to the radial outside of the connector 555.

The protrusion 572 has a circular ring shape with a tapered face 575 on the outer periphery of the protrusion 572. The protrusion 572 presses the tapered face 575 onto the slope 568 of the protrusion 566. The tapered face 575 increases in diameter from the side nearer to the annular body 565 to the opposite side. The tapered face 575 extends along the whole circumference of the protrusion 572.

The connector 555 has a shape symmetric with respect to the virtual center plane 598, which is perpendicular to the axial direction of the connector 555 and located at the axial center of the connector 555. The first portion 555*a* and the second portion 555*b* have substantially the same shape.

The connector 555 forms the first sealing portion 561 and the second sealing portion 562 during connection between the first and second fluid devices 401 and 402. The connector 555 presses the tapered face 575 of the first portion 555*a* onto the slope 568 of the first port 551 and presses the tapered face 575 of the second portion 555*b* onto the slope 568 of the second port 552. This prevents fluid leakage from the junction of the first and second fluid devices 401 and 402 and achieves short-distance connection between the first and second fluid devices 401 and 402 without any member such as tubes.

Accordingly, the fitting assembly, like one according to the first embodiment of the second invention, can reduce space for installation of the first and second fluid devices 401 and 402 connected with each other to allow fluid to flow between each other.

Figure 20:
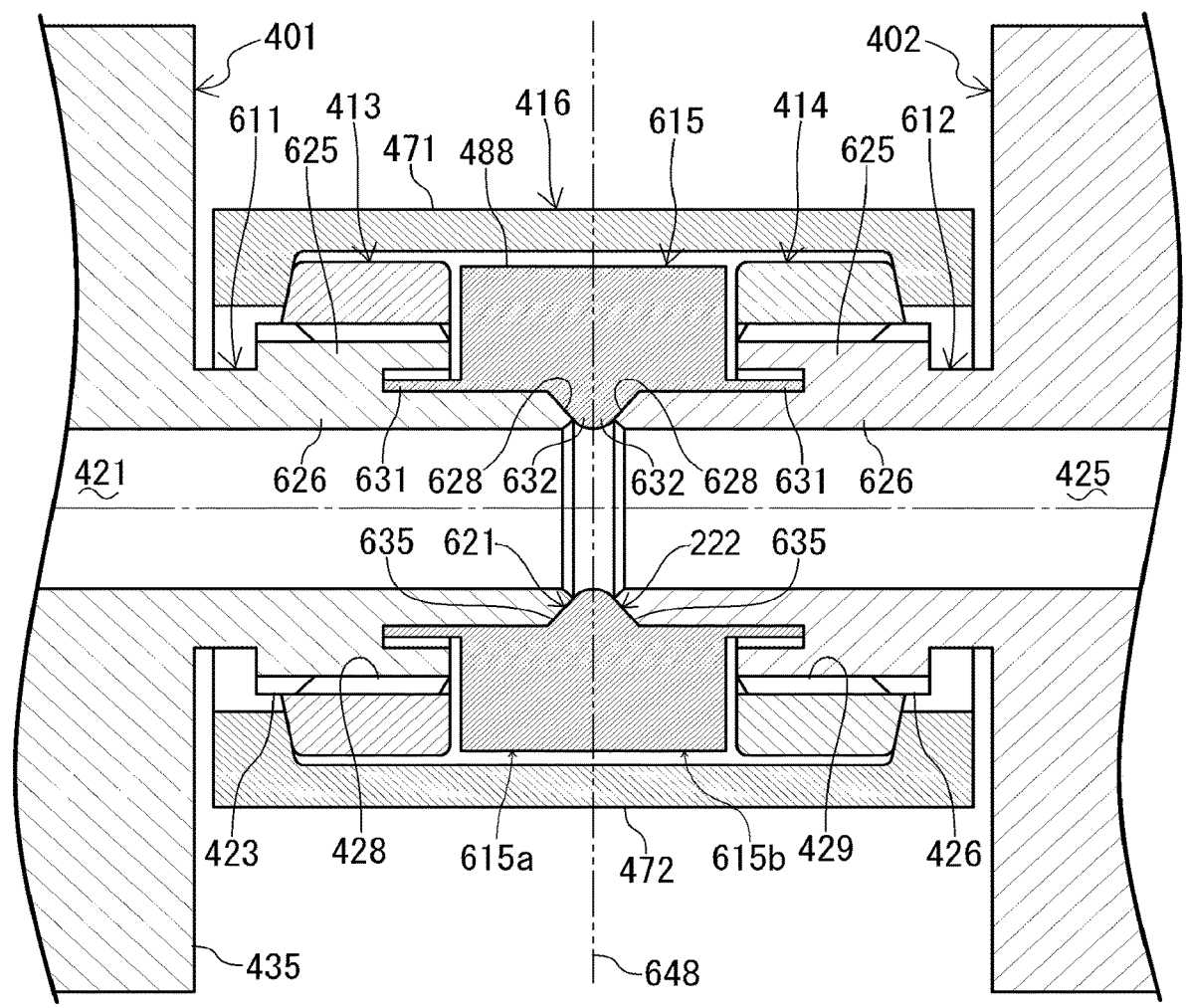
FIG. 20 is a cross-sectional view of a fitting assembly for fluid device according to a fourth embodiment of the second invention.

FIG. 20 is a cross-sectional view of a fitting assembly for fluid device according to a fourth embodiment of the second invention. As shown in FIG. 20, the fitting assembly differs from one according to the first embodiment of the second invention in the following configuration: a first sealing portion 621 that seals a gap between the first portion 611 and the connector 615; and a second sealing portion 622 that seals a gap between the second portion 612 and the connector 615.

The first port 611 is installed at the first fluid device 401 and integrated with the casing 435 of the first fluid device 401. The first port 611 has an outer sleeve 625 and an inner sleeve 626. The outer sleeve 625 is a circular cylinder of substantially constant inner diameters and protrudes from the vicinity of the first fluid channel 421 in the casing 435 to the outside of the casing 435.

The outer sleeve 625 allows a portion of the connector 615 to enter the tip end (i.e. the first axial end) of the outer sleeve 625. When the outer sleeve 625 receives the portion of the connector 615, there is substantially no gap between the outer sleeve 625 and the portion of the connector 615. The outer periphery of the outer sleeve 625 has a first thread 423 extending along the axial direction of the outer sleeve 625. The first thread 423 is an external thread.

The inner sleeve 626 is a circular cylinder of substantially constant outer diameters smaller than the inner diameter of the outer sleeve 625. The inner sleeve 626 protrudes from the vicinity of the first fluid channel 421 in the casing 435 to the direction in which the outer sleeve 625 protrudes, i.e. to the first axial direction of the first port 611. The inner sleeve 626 is placed inside the outer sleeve 625 to be separated by a radial distance from the outer sleeve 625.

The tip end of the inner sleeve 626 is located farther from the first or second fluid device 401 or 402 than the tip end of the outer sleeve 625. In other words, the inner sleeve 626 protrudes from the casing 435 to a distance longer than the outer sleeve 625. Thus, the first port 611 has a twofold-annular structure at an axial intermediate portion of the outer sleeve 625.

The inner sleeve 626 has substantially the same inner diameter as the first fluid channel 421 and the connector 615. The inner sleeve 626 is placed between the first fluid device 401 and the connector 615 to connect the first fluid channel 421 with the internal space of the connector 615. The first port 611 connects the first fluid device 401 with the connector 615 to allow fluid to flow between them.

The tip end of the inner sleeve 626 is tapered in the direction in which the inner sleeve 626 protrudes. The outer periphery of the tip end of the inner sleeve 626 has a tapered face 628, which reduces in diameter to the direction in which the inner sleeve 626 protrudes, i.e. to the first axial direction of the first port 611, or toward the virtual center plane 648. The tapered face 628 extends along the whole circumference of the tip end of the inner sleeve 626.

The second port 612 has substantially the same shape as the first port 611.

The connector 615 has a first portion 615*a* in contact with the first port 611 and a second portion 615*b* in contact with the second port 612. The first portion 615a is a circular cylinder, whose internal space serves as a fluid channel. The first portion 615a is mounted on the first port 611 such that it is coupled with the inner sleeve 626 to connect its fluid channel with the first fluid channel 421.

The first portion 615a includes a body 631 and a protrusion 632. The body 631 is a circular cylinder, which is placed on the outer periphery of the inner sleeve 626 when the first portion 615a is mounted on the first port 611. The protrusion 632 protrudes from an axial end of the body 631, i.e. an axial intermediate portion of the connector 615 to the radial inside of the connector 615.

The protrusion 632 has a circular ring shape with a slope 635 on the inner periphery of the protrusion 632. The protrusion 632 presses the slope 635 onto the tapered face 628 of the inner sleeve 626 when the first portion 615a is mounted on the first port 611. The slope 635 increases in diameter from the virtual center plane 648 toward the first or second fluid device 401 or 402. The slope 635 extends along the whole circumference of the protrusion 632.

The connector 615 has a shape symmetric with respect to the virtual center plane 648, which is perpendicular to the axial direction of the connector 615 and located at the axial center of the connector 615. The first and second portions 615a and 615b have substantially the same shape.

The fitting assembly makes the connector 615 form the first sealing portion 621 and the second sealing portion 622 during connection between the first and second fluid devices 401 and 402. The connector 615 presses the slope 635 of the first portion 615a onto the tapered face 628 of the first port 611 and presses the slope 635 of the second portion 615b onto the tapered face 628 of the second port 612. This prevents fluid leakage from the junction of the first and second fluid devices 401 and 402 and achieves short-distance connection between the first and second fluid device 401 and 402 without any member such as a tube.

The fitting assembly, like one according to the first embodiment of the second invention, can reduce space for installation of the first and second fluid devices 401 and 402 connected with each other to allow fluid to flow between each other.

Figure 21:
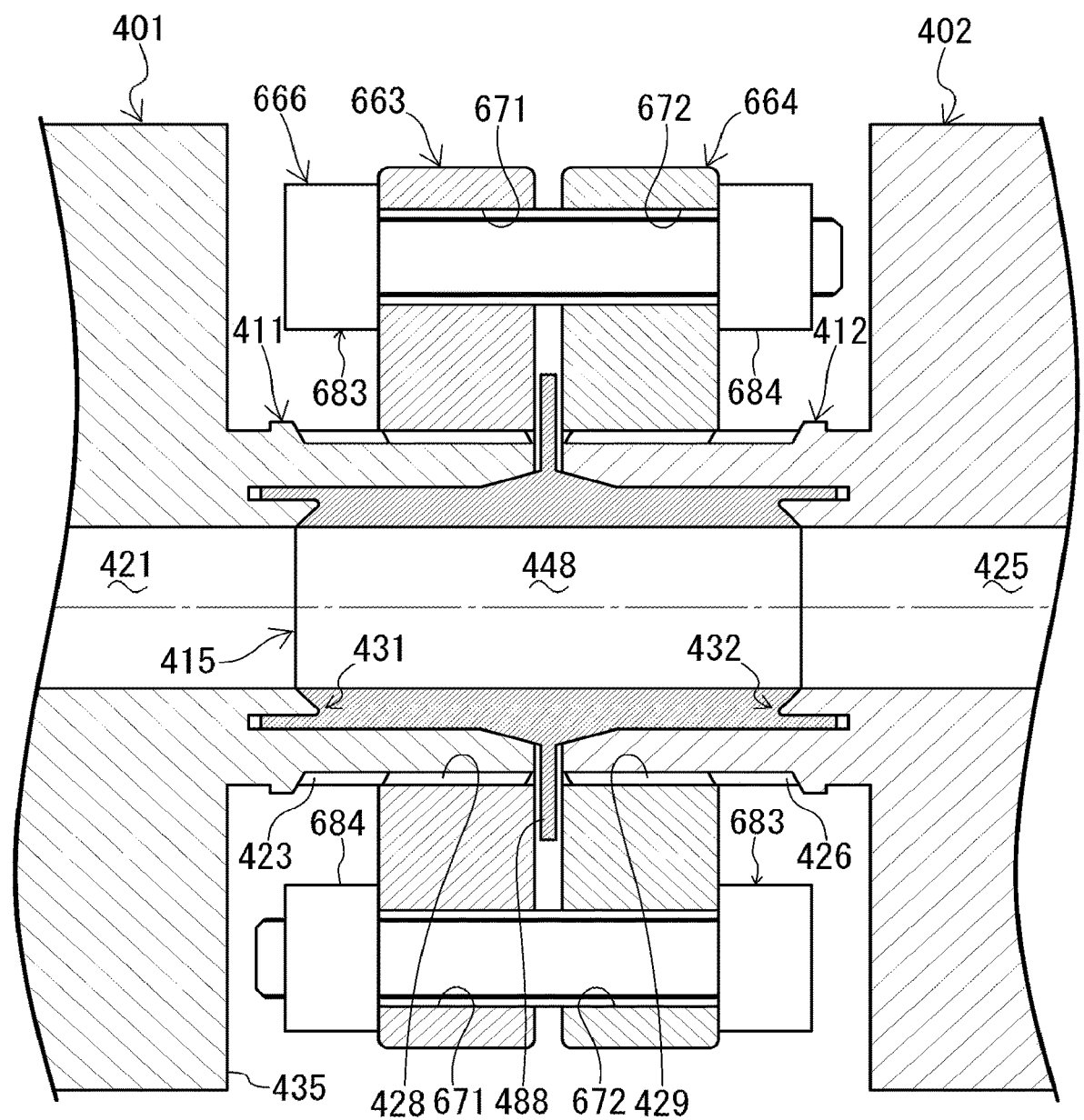
FIG. 21 is a cross-sectional view of a fitting assembly for fluid device according to a fifth embodiment of the second invention.

FIG. 21 is a cross-sectional view of a fitting assembly for fluid device according to a fifth embodiment of the second invention.

As shown in FIG. 21, the fitting assembly differs from one according to the first embodiment of the second invention in a securing member 666 and portions relating to it, i.e. a first annular member 663 and a second annular member 664.

The first annular member 663 has two or more first through holes 671 along its circumference. The first through holes 671 each extend in the same direction as an axial opening of the first annular member 663, i.e. a third thread 428. The first through holes 671 are aligned along a circumference radially outside the opening of the first annular member 663 at certain intervals.

The second annular member 664 has two or more second through holes 672 along its circumference. The second through holes 672 each extend in the same direction as an axial opening of the second annular member 664, i.e. a fourth thread 429. The second through holes 672 are aligned along a circumference radially outside the opening of the second annular member 664 at certain intervals.

The securing members 666 are bolts 683 and annular members 684 such as nuts. The bolts 683 are each placed in a coaxially-arranged pair of the first through hole 671 and the second through hole 672. The annular members 684 are secured to the bolts 683 protruding from the first or second through hole 671 or 672.

The securing members 666 secure the first annular member 663 to the second annular member 664 at the radial outside of the first and second ports 411 and 412. As the bolts 683 rotate, the first annular member 663 approaches the second annular member 664.

The fitting assembly does not need any member such as a tube between the first and second fluid devices 401 and 402 to connect the first fluid device 401 with the second fluid device 402 to allow fluid to flow between them. The fitting assembly can prevent fluid leakage from the junction of the two fluid devices 401 and 402, and in addition, can reduce space for installation of the two fluid devices 401 and 402.

The following explains a first embodiment of the third invention with reference to figures.

Figure 22:
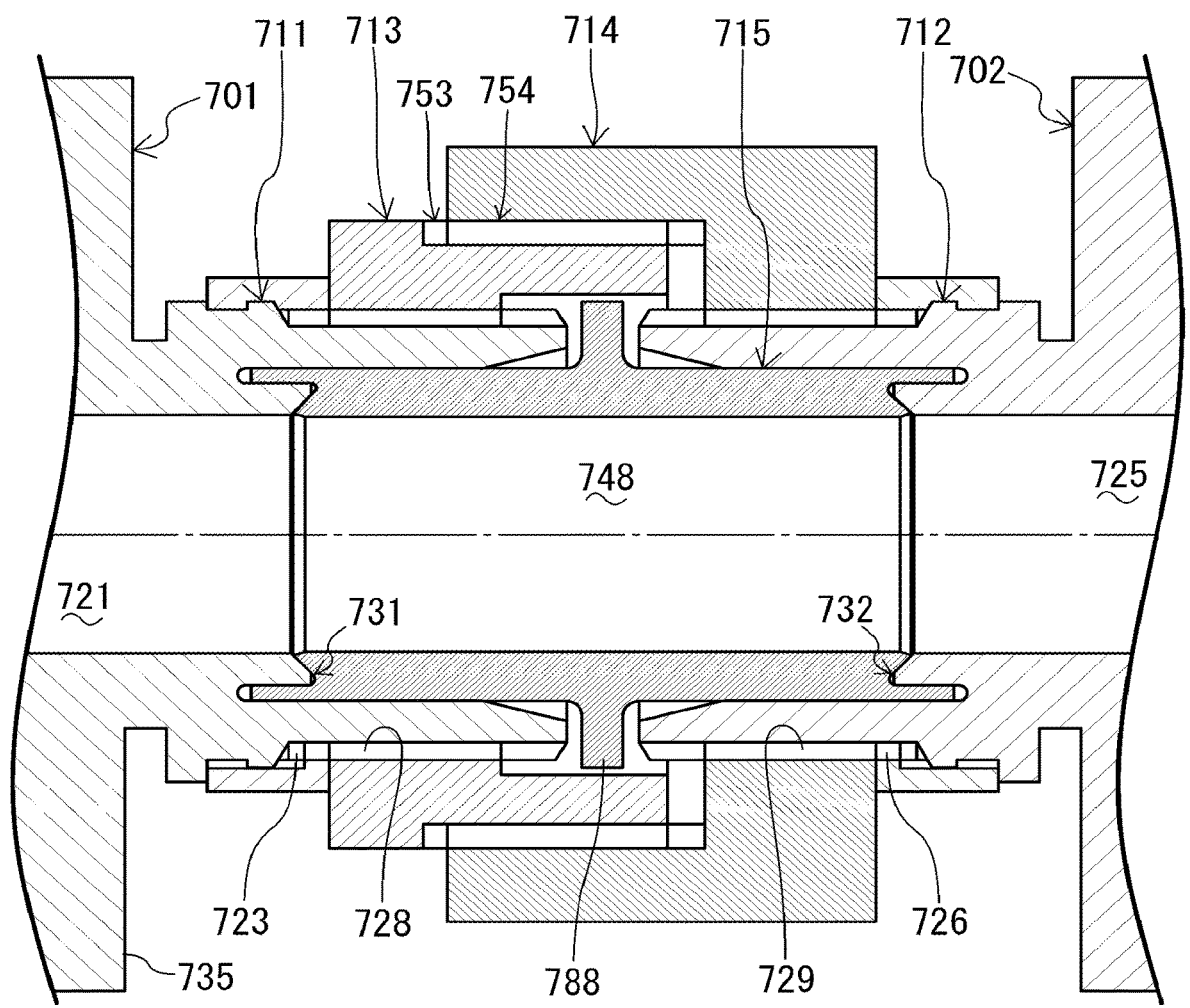
FIG. 22 is a cross-sectional view of a fitting assembly for fluid device according to a first embodiment of the third invention.
Figure 23:
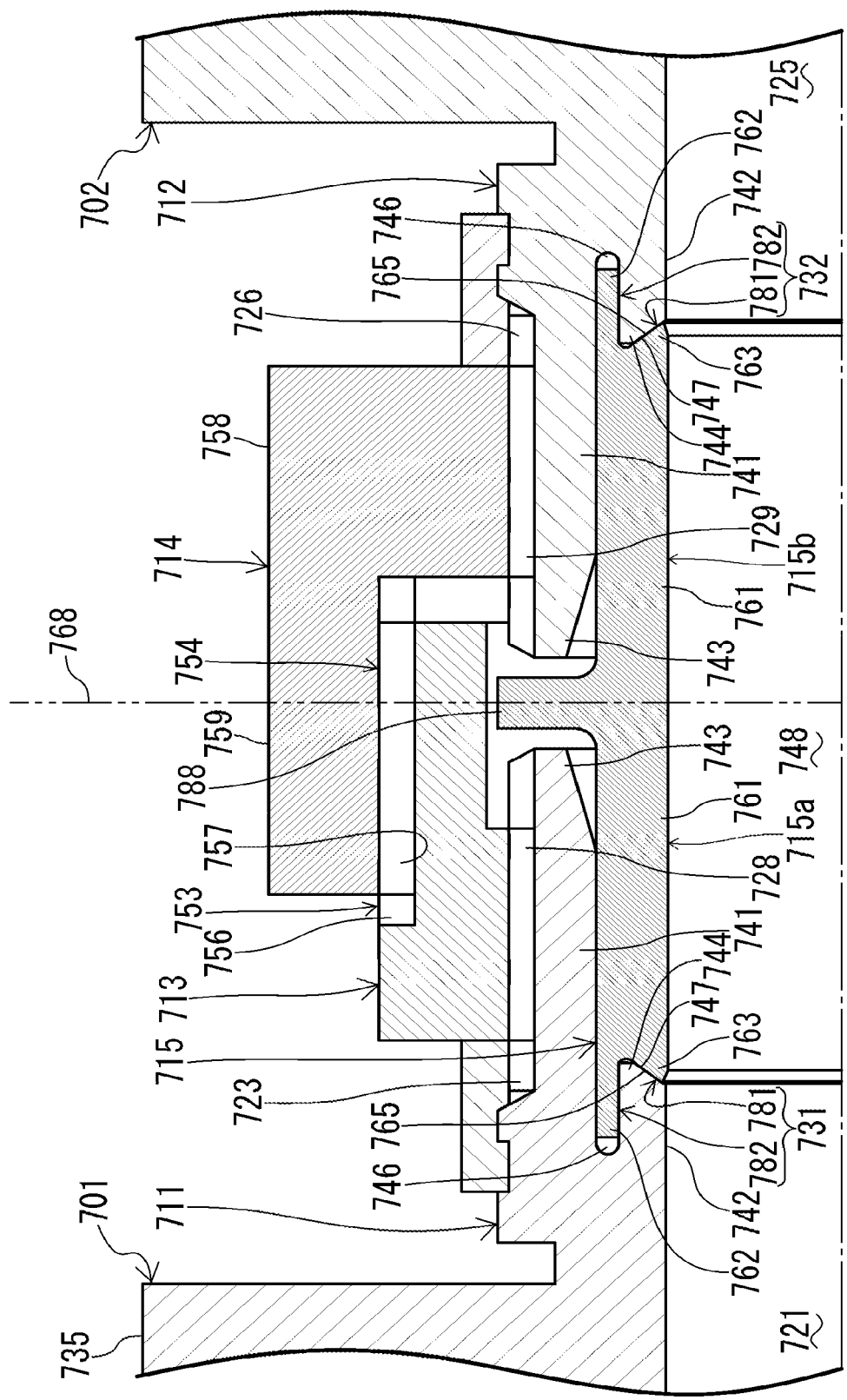
FIG. 23 is a partially enlarged view of FIG. 22.
Figure 24:
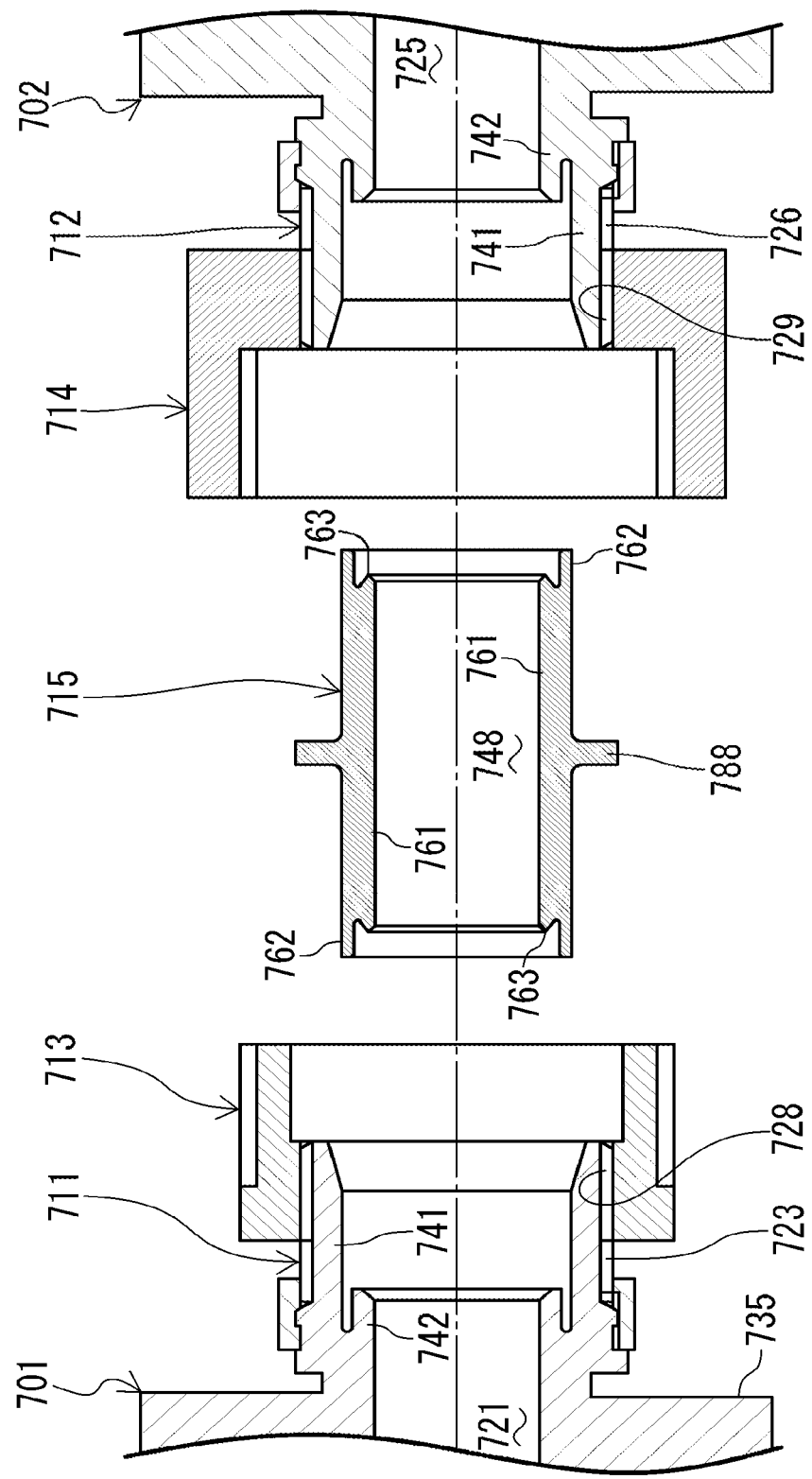
FIG. 24 is a diagram showing two fluid devices of the fitting assembly of FIG. 22 separated from each other.
Figure 25:
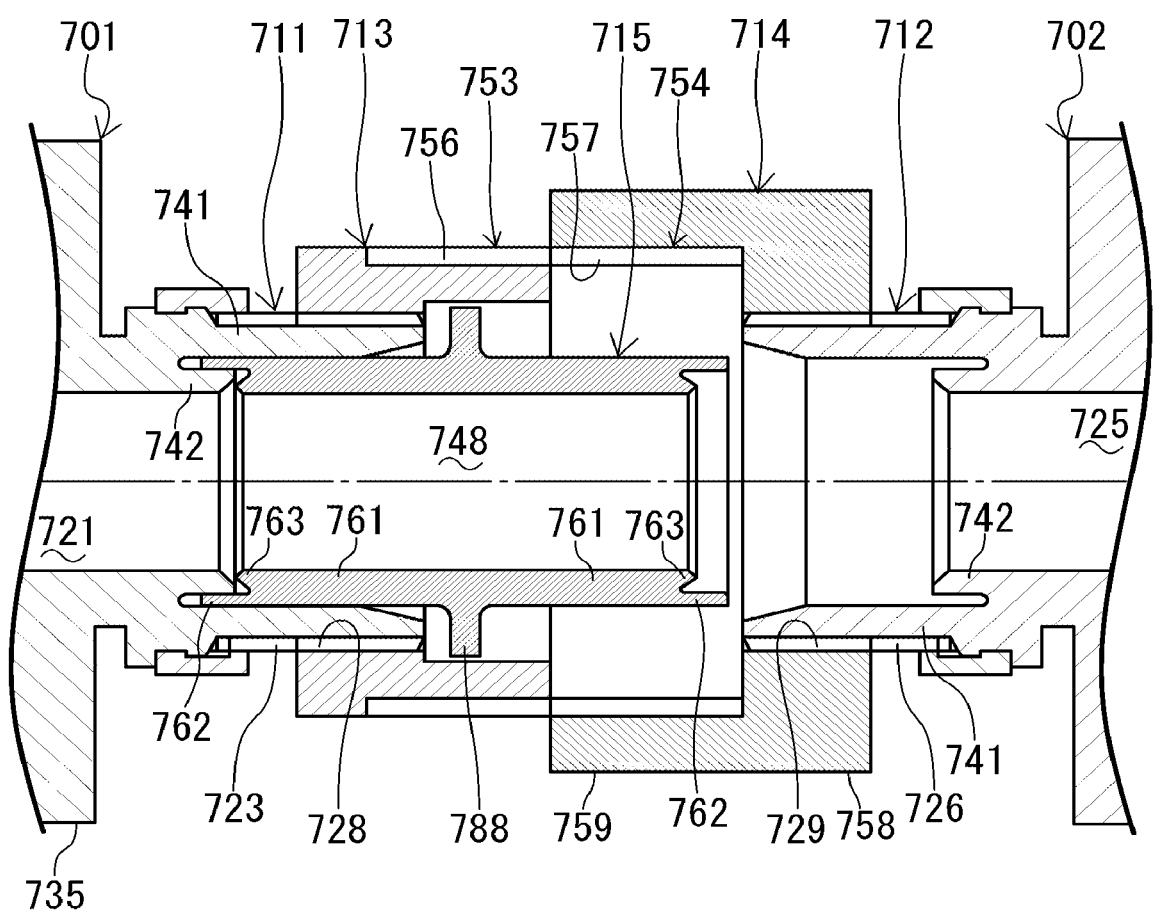
FIG. 25 is a diagram showing the two fluid devices of the fitting assembly of FIG. 22 during a process of connecting one of them with the other.

FIG. 22 is a cross-sectional view of a fitting assembly for fluid device according to the first embodiment of the third invention. FIG. 23 is a partially enlarged view of FIG. 22. FIG. 24 is a diagram showing two fluid devices of the fitting assembly in FIG. 22 separated from each other. FIG. 25 is a diagram showing the two fluid devices of the fitting assembly in FIG. 22 during a process of connecting one of them with the other.

As shown in FIGS. 22-25, the fitting assembly is used to connect a first fluid device 701 with a second fluid device 702 to allow fluid to flow between them.

The first and second fluid devices 701 and 702 have shapes to be placed closely to each other. The first and second fluid devices 701 and 702 include, but are not limited to, devices with certain fluid channels such as valves, fluid meters, pumps, and fittings.

The fitting assembly has a first port 711, a second port 712, a first annular member 713, a second annular member 714, and a connector 715.

The first port 711 is installed at the first fluid device 701. The first port 711 is connected with the first fluid channel 721 of the first fluid device 701. The first port 711 has an annular shape.

The second port 712 is installed at the second fluid device 702. The second port 712 is connected with the second fluid channel 725 of the second fluid device 702. The second port 712 has an annular shape.

The first annular member 713 is installed at the first port 711. The outer periphery of the first annular member 713 has a first coupler 753.

The second annular member 714 is installed at the second port 712. The inner periphery of the second annular member 714 has a second coupler 754.

The connector 715 is located between the first port 711 and the second port 712. The connector 715 seals a gap between the connector 715 and the first port 711 and seals a gap between the connector 715 and the second port 712.

The first annular member 713 is fixed to the second annular member 714 with the first coupler 753 and the second coupler 754.

The two fluid devices 701 and 702 are placed such that their respective ports 711 and 712 axially face each other.

The first port 711 is installed at the first fluid device 701. The first port 711 is integrated with the casing 735 of the first fluid device 701. This is not a limited condition. The first port 711 may be separated from the casing 735.

The first port 711 has an outer sleeve 741 and an inner sleeve 742. The outer sleeve 741 is a circular cylinder of substantially constant inner diameters. The outer sleeve 741 protrudes from the vicinity of the opening of the first fluid channel 721 in the casing 735 to the outside of the casing 735.

The outer sleeve 741 allows a portion of the connector 715 to enter the tip end (i.e. the first axial end) 743 of the outer sleeve 741. When the outer sleeve 741 receives the portion of the connector 715, there is substantially no radial gap between the outer sleeve 741 and the portion of the connector 715.

The outer sleeve 741 includes a first thread 723, which extends on the outer periphery of the outer sleeve 741 along the axial direction of the outer sleeve 741. The first thread 723 is an external thread.

The inner sleeve 742 is a circular cylinder of substantially constant outer diameters smaller than the inner diameter of the outer sleeve 741. The inner sleeve 742 protrudes from the vicinity of the opening of the first fluid channel 721 in the casing 735 to the same direction as the outer sleeve 741, i.e. to the first axial direction of the first port 711. The inner sleeve 742 is placed inside the outer sleeve 741 to be separated by a radial distance from the outer sleeve 741.

The tip end 744 of the inner sleeve 742 is located nearer to the casing 735 than the tip end 743 of the outer sleeve 741. In other words, the inner sleeve 742 protrudes from the casing 735 to a distance shorter than the outer sleeve 741. Thus, the first port 711 has a twofold-annular structure on the second axial side (i.e. the side nearer to the casing 735) of the outer sleeve 741.

The inner sleeve 742 has substantially the same inner diameter as the first fluid channel 721 and the connector 715. The inner sleeve 742 is disposed between the first fluid device 701 and the connector 715 to connect the first fluid channel 721 with the internal space 748 of the connector 715, and thus, to make the first port 711 connect the first fluid device 701 with the connector 715 to allow fluid to flow between them.

There is an annular groove 746 between the outer periphery of the inner sleeve 742 and the inner periphery of the outer sleeve 741. The groove 746 is open to the direction in which the outer and inner sleeves 741 and 742 protrude, i.e. to the side nearer to the second port 712. The groove 746 extends along the whole circumference of the outer and inner sleeves 741 and 742. The inner sleeve 742 has a slope 747 near the tip end 744 of the inner sleeve 742. The slope 747 increases in diameter from the side nearer to the first fluid channel 721 toward the tip end 744 of the inner sleeve 742.

The first port 711 is made of certain resin, for example, fluoropolymer such as PFA, PVDF, ETFE, FEP, or PTFE. The resin is not limited to fluoropolymer and may be other resin such as PP.

The second port 712 is a reflected shape of the first port 711 with respect to the virtual center plane 768. Since the second port 712 has substantially the same shape as the first port 711, components of the second port 712 corresponding to ones of the first port 711 are marked with the same reference signs as the ones. Explanation of the components is omitted. For explanatory convenience, substantially the same components can be marked with different reference signs, such as the first thread 723 and the second thread 726.

The connector 715 has a first sealing portion 731 and a second sealing portion 732. The first sealing portion 731 seals a gap between the connector 715 and the first port 711. The second sealing portion 732 seals a gap between the connector 715 and the second port 712.

The connector 715 has an annular shape. The connector 715 has a first portion 715a in contact with the first port 711 and a second portion 715b in contact with the second port 712. See FIG. 23. The first portion 715a is a circular cylinder of substantially constant inner diameters and has a fluid channel, which is a portion of the internal space 748 of the connector 715. The first portion 715a is mounted on the first port 711 such that it is placed on the outer sleeve 741 to connect the fluid channel of the first portion 715a with the first fluid channel 721.

The first portion 715a includes a body 761, a first protrusion 762, and a second protrusion 763. The body 761 is a circular cylinder, which is coupled with the whole circumference of the outer sleeve 741 to be surrounded by the outer sleeve 741 when the first portion 715a is mounted on the first port 711. The first and second protrusions 762 and 763 are placed on an axial end (i.e. the end nearer to the first fluid device 701) of the body 761.

The first and second protrusions 762 and 763 each have a circular ring shape. The whole circumference of the first protrusion 762 is pressed into the groove 746 of the first port 711 when the first portion 715a is mounted on the first port 711. The first protrusion 762 is separated from an inner side nearer to the first fluid device 701 of the groove 746.

The second protrusion 763 has a tapered face 765, which reduces in diameter from the side nearer to the virtual center plane 768 toward the first fluid device 701. The tapered face 765 is located inside the first protrusion 762 in the radial direction of the first portion 715a. The tapered face 765 faces the slope 747 of the inner sleeve 742 in the axial direction of the first portion 715a. The tapered face 765 is pressed onto the slope 747 of the inner sleeve 742 when the first portion 715a is mounted on the first port 711.

The connector 715 has a shape symmetric with respect to the virtual center plane 768, which is perpendicular to the axial direction of the connector 715 and located at the axial center of the connector 715. Since the second portion 715b has substantially the same shape as the first portion 715a, components of the second portion 715b corresponding to ones of the first portion 715a are marked with the same reference signs as the ones, and explanation on the components is omitted.

The connector 715 is made of certain resin, for example, fluoropolymer such as PFA, PVDF, ETFE, FEP, or PTFE, or other thermoplastic resin.

The connector 715 is a body integrated with the first and second portions 715a and 715b, which have substantially the same shape. Alternatively, the connector 715 may be an assembly of first and second portions, which differ in shape.

The first annular member 713 is releasably fixed to (the outer sleeve 741 of) the first port 711 such that it surrounds the first port 711, esp. its outer sleeve 741. The first annular member 713 has, in addition to the first coupler 753, a third thread 728 to be engaged with the first thread 723 of the first port 711. The third thread 728 is located on the inner periphery of the first annular member 713. The first coupler 753 is located on the outer periphery of the first annular member 713.

The second annular member 714 is releasably fixed to (the outer sleeve 741 of) the second port 712 such that it surrounds the second port 712, esp. its outer sleeve 741. The second annular member 714 has, in addition to the second coupler 754, a fourth thread 729 to be engaged with the second thread 726 of the second port 712. The fourth thread 729 is located on the inner periphery of the second annular member 714. The second coupler 754 is located on the inner periphery of the second annular member 714.

The first annular member 713 is mounted on the first port 711 such that it surrounds the whole circumference of the outer sleeve 741 of the first port 711 when the third thread 728 is engaged with the first thread 723. The third thread 728 is an internal thread. The third thread 728 is located on the side nearer to the first fluid device 701 (i.e. the second axial side) of the first annular member 713.

The first coupler 753 is located on the side farther from the first fluid device 701 (i.e. the first axial side) of the first annular member 713. The first coupler 753 has a fifth thread 756 on the outer periphery of the first annular member 713. The fifth thread 756 is an external thread extending in the axial direction of the first annular member 713.

The second annular member 714 is mounted on the second port 712 such that it surrounds the whole circumference of the outer sleeve 741 of the second port 712 when the fourth thread 729 is engaged with the second thread 726. The fourth thread 729 is an internal thread, which is located on the side nearer to the second fluid device 702 (i.e. the second axial side) of the second annular member 714.

The second coupler 754 is located on the side farther from the second fluid device 702 (i.e. the first axial side) of the second annular member 714. The second coupler 754 has a sixth thread 757 on the inner periphery of the second annular member 714. The sixth thread 757 is an internal thread extending in the axial direction of the second annular member 714.

The sixth thread 757 is engaged with the fifth thread 756 of the first annular member 713 to prevent the second annular member 714 from being separated from the first annular member 713. The fifth and sixth threads 756 and 757 wrap in the direction opposite to the direction in which the second and fourth threads 726 and 729 wrap. Handedness of the fifth and sixth threads 756 and 757 is the reverse of handedness of the second and fourth threads 726 and 729.

The second annular member 714 has a base 758 with the fourth thread 729 and a tip 759 with the sixth thread 757. The base 758 has an inner diameter smaller than the tip 759. In contrast to the tip 759, the base 758 is located on the second axial side of the second annular member 714. The sixth thread 757 engaged with the fifth thread 756 of the first annular member 713 fixes the tip 759 to the first annular member 713 such that the tip 759 almost surrounds the fifth thread 756.

The first annular member 713 is made of certain resin, for example, fluoropolymer such as PFA, PVDF, ETFE, FEP, or PTFE. Similarly, the second annular member 714 is made of certain resin, for example, fluoropolymer such as PFA, PVDF, ETFE, FEP, or PTFE.

The above-described configuration connects the first fluid device 701 with the second fluid device 702 to allow fluid to flow between them. In this case, the sixth thread 757 of the second annular member 714 is engaged with the fifth thread 756 of the first annular member 713. Thus, the second annular member 714 is fixed to the first annular member 713. The first protrusion 762 of the connector 715 is pressed into the groove 746, and the tapered face 765 of the second protrusion 763 is pressed onto the tip end 444 and slope 747 of the inner sleeve 742.

A user connects the first fluid device 701 with the second fluid device 702 as follows. First, as shown in FIG. 24, the user engages the third thread 728 with the first thread 723 to releasably fix the first annular member 713 to the first port 711. The user engages the fourth thread 729 with the second thread 726 to releasably fix the second annular member 714 to the second port 712.

Next, the user inserts the connector 715 into one of the first port 711 and the second port 712. Then, as shown in FIG. 25, while the user makes the first and second fluid devices 701 and 702 separated from each other face each other, the user brings the connector 715 close to the other of the first and second ports 711 and 712.

The user inserts the connector 715 into the other of the first and second ports 711 and 712 and brings the first annular member 713 close to the second annular member 714. Then, the user engages the fifth thread 756 with the sixth thread 757 and couples the first annular member 713 with the second annular member 714. Thus, the user secures the first annular member 713 to the second annular member 714 with the fifth and sixth threads 756 and 757.

After the first annular member 713 is secured to the second annular member 714, i.e. after the first fluid device 701 is connected with the second fluid device 702, the first sealing portion 731 seals the gap between the connector 715 and the first port 711, and the second sealing portion 732 seals the gap between the connector 715 and the second port 712. The first and second sealing portions 731 and 732 each form a primary sealing area 781 acting axial sealing force and a secondary sealing area 782 acting radial sealing force.

Accordingly, the fitting assembly can prevent fluid leakage from the junction of the two fluid devices 701 and 702. The fitting assembly does not need any member such as a tube between the first and second fluid devices 701 and 702 to connect the first fluid device 701 with the second fluid device 702 to allow fluid to flow between them. Thus, the two fluid devices 701 and 702 are placed as closely to each other as possible. This can reduce space for installation of the fluid devices 701 and 702.

The connector 715 has an extending portion 788, which is located between the first port 711 and the second port 712 when the first fluid device 701 is connected with the second fluid device 702 to allow fluid to flow between each other.

The extending portion 788 is separated from both the first and second ports 711 and 712. The extending portion 788 has a ring shape extending radially outside the connector 715.

The extending portion 788 has an outer diameter larger than the tip ends 743 of the first and second ports 711 and 712. The extending portion 788 is placed on the virtual center plane 768 of the connector 715 and at the axial intermediate portion of the connector 715, i.e. at the boundary between the first and second portions 715a and 715b of the connector 715.

The extending portion 788 is disposed between the tip ends 743 and 743 of the first and second ports 711 and 712 when the connector 715 is mounted on the ports 711 and 712. The extending portion 788 axially faces the tip ends 743 and 743 of the first and second ports 711 and 712. The extending portion 788 facilitates release of the connector 715 from the first and second ports 711 and 712.

Figure 26:
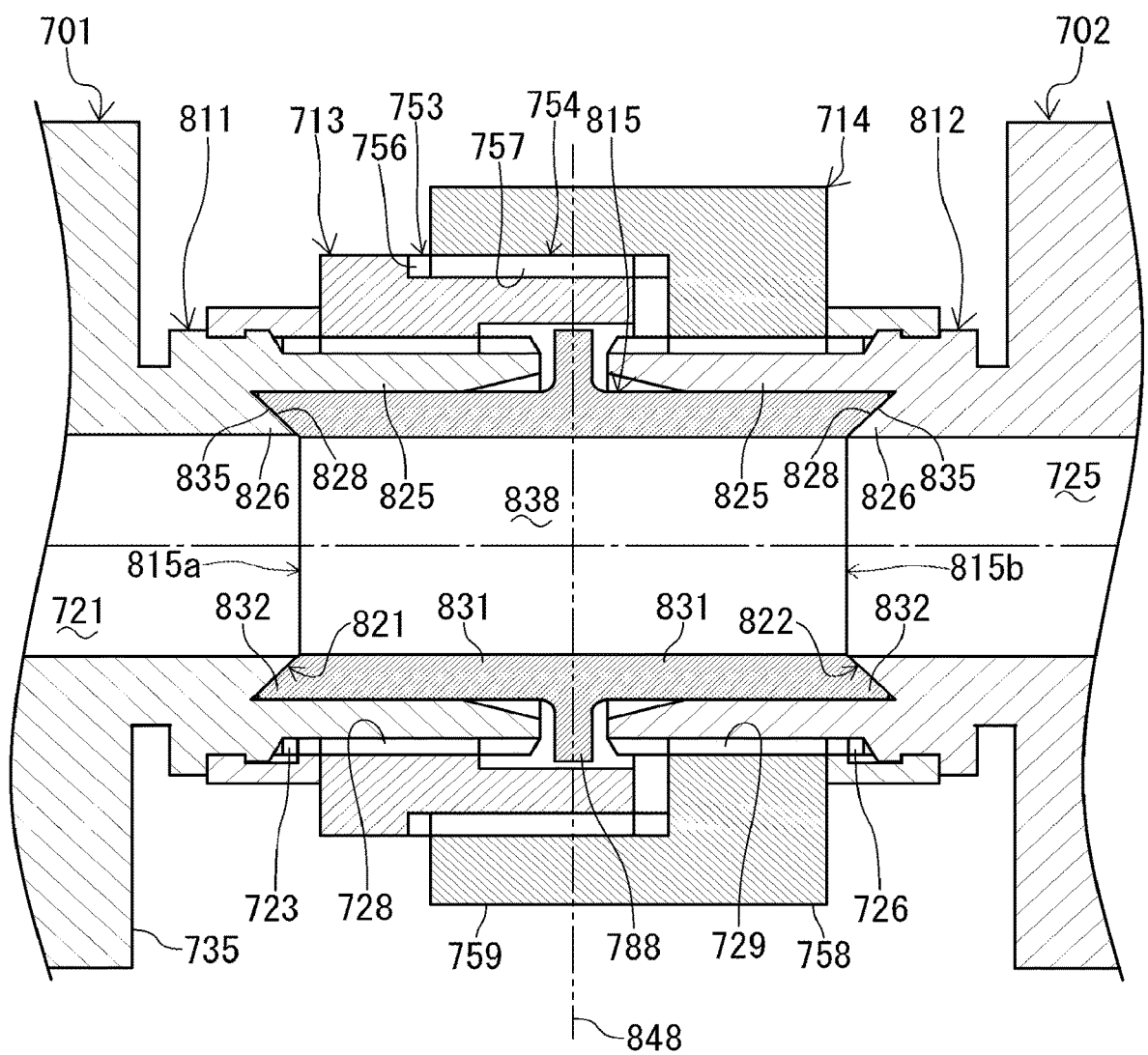
FIG. 26 is a cross-sectional view of a fitting assembly for fluid device according to a second embodiment of the third invention.
Figure 27:
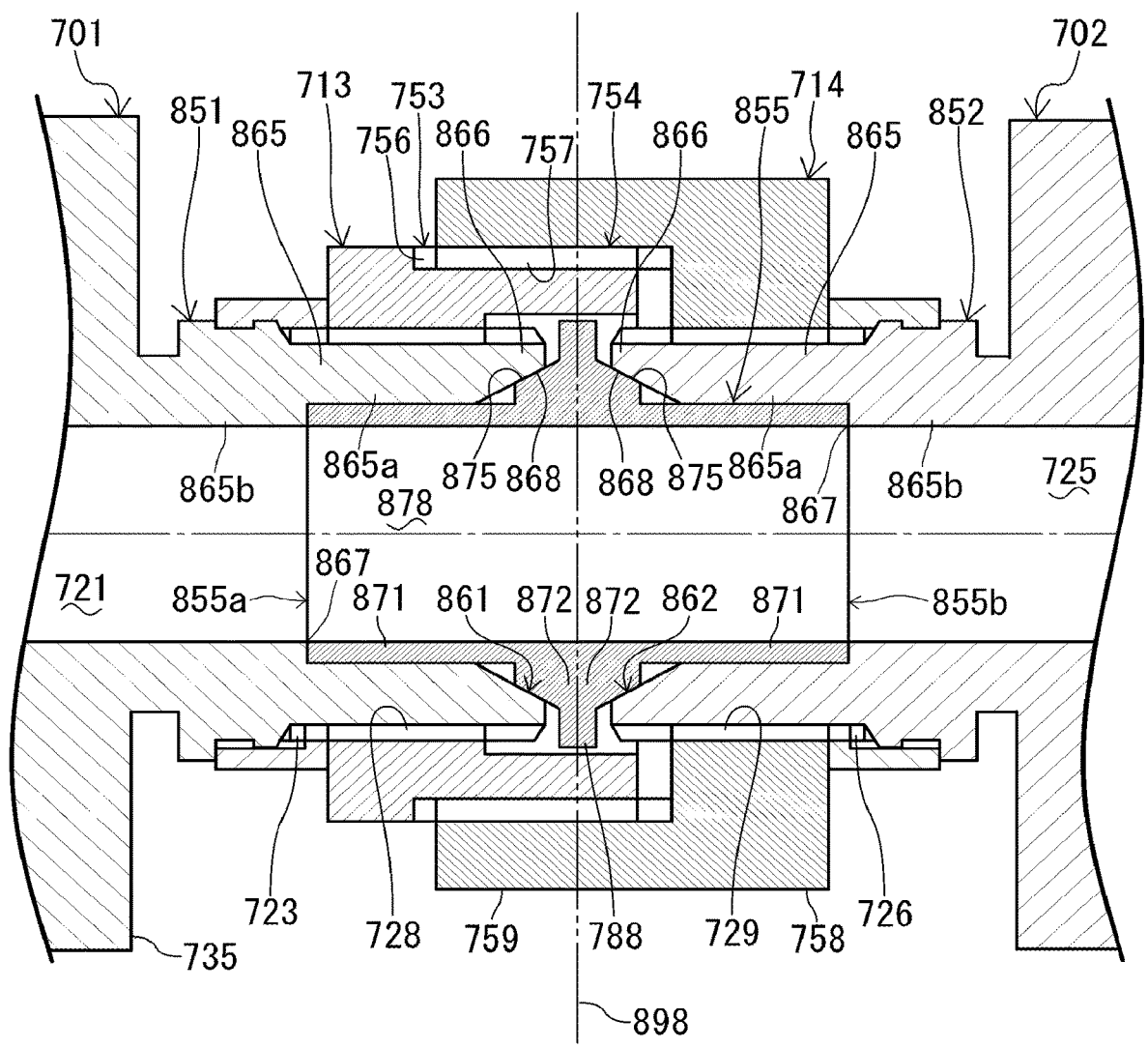
FIG. 27 is a cross-sectional view of a fitting assembly for fluid device according to a third embodiment of the third invention.
Figure 28:
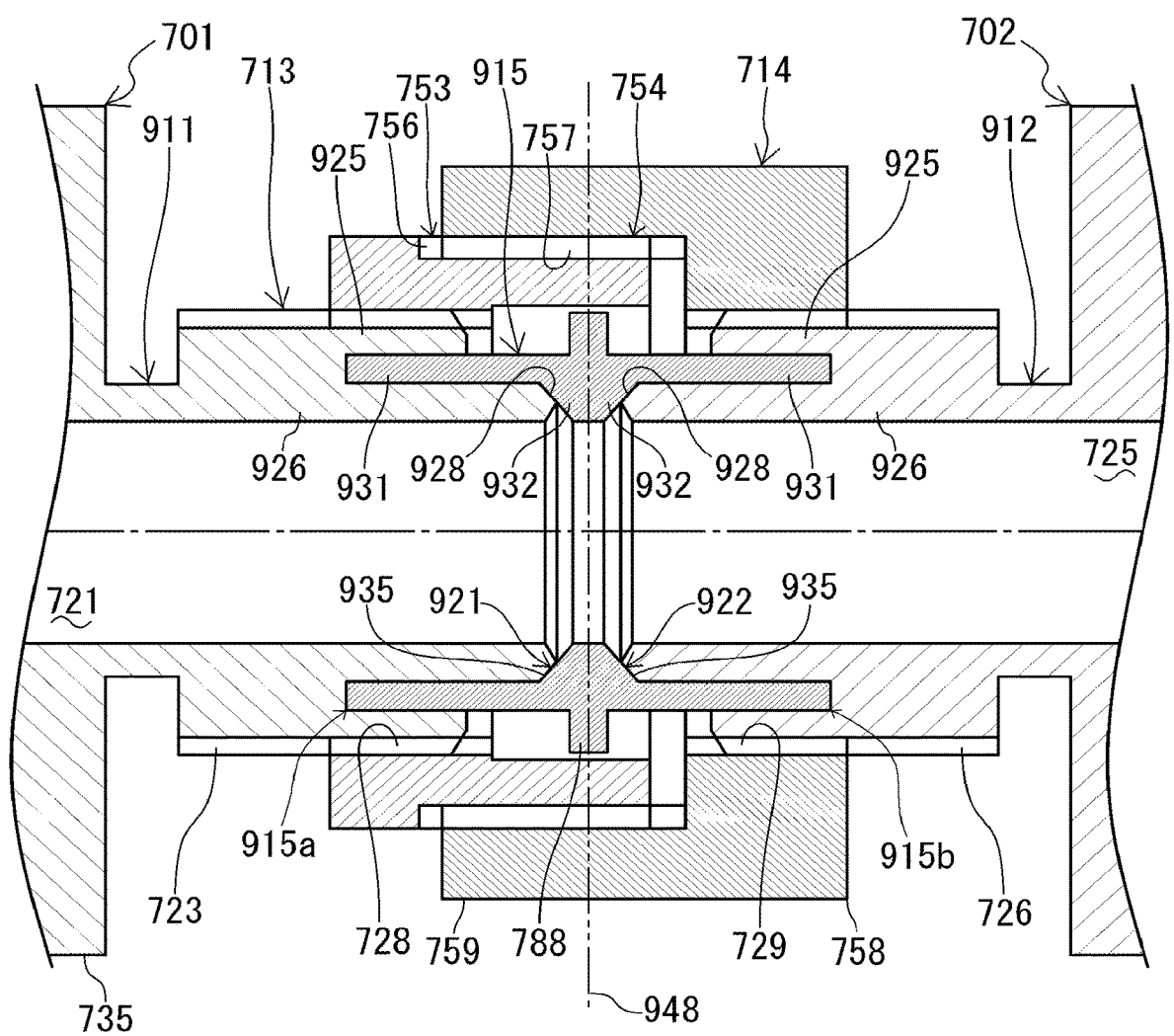
FIG. 28 is a cross-sectional view of a fitting assembly for fluid device according to a fourth embodiment of the third invention.

The following explains second to fourth embodiments of the third invention with reference to FIGS. 26-28. Components of fitting assemblies substantially corresponding to ones of the fitting assembly according to the first embodiment of the third invention are marked in FIGS. 26-28 with the same reference signs as the ones, and explanation on the components is omitted.

FIG. 26 is a cross-sectional view of a fitting assembly for fluid device according to a second embodiment of the third invention. As shown in FIG. 26, the fitting assembly differs from one according to the first embodiment of the third invention in the following configuration: a first sealing portion 821 that seals a gap between the first port 811 and the connector 815; and a second sealing portion 822 that seals a gap between the second port 812 and the connector 815.

The first port 811 is installed on the first fluid device 701 and integrated with the casing 735 of the first fluid device 701. The first port 811 has an annular body 825 and a protruding ring 826. The annular body 825 is a circular cylinder of substantially constant inner diameters, which is placed around the opening of the first fluid channel 721 in the casing 735 to protrude to the outside of the casing 735.

The annular body 825 allows a portion of the connector 815 to enter the tip end (i.e. the first axial end) of the annular body 825. When the annular body 825 receives the portion of the connector 815, there is substantially no gap between the annular body 825 and the portion of the connector 815 except for the tip end of the annular body 825 and its vicinity. The outer periphery of the annular body 825 has a first thread 723 extending along the axial direction of the annular body 825. The first thread 723 is an external thread.

The protruding ring 826 is a ring of an outer diameter smaller than the inner diameter of the annular body 825. The protruding ring 826 is disposed around the opening of the first fluid channel 721 in the casing 735 to protrude in the same direction as the annular body 825, i.e. in the first axial direction of the annular body 825. The protruding ring 826 is located inside the annular body 825 and separated by a radial distance from the annular body 825.

The protruding ring 826 has substantially the same inner diameter as the first fluid channel 721 and the connector 815. The protruding ring 826 is disposed between the first fluid device 701 and the connector 815 to connect the first fluid channel 721 with the internal space 838 of the connector 815. The first port 811 connects the first fluid device 701 with the connector 815 to allow fluid to flow between them.

The outer periphery of the protruding ring 826 includes a tapered face 828, which reduces in outer diameter to the direction in which the protruding ring 826 protrudes, i.e. to the first axial direction of the first port 811. The tapered face 828 extends along the whole circumference of the outer periphery of the protruding ring 826. The tapered face 828 is separated by a distance from the inner periphery of the annular body 825.

The second port 812 has substantially the same shape as the first port 811. Accordingly, components of the second port 812 substantially corresponding to ones of the first port 811 are marked with the same reference signs as the ones, and explanation on the components is omitted. For the explanatory convenience, substantially the same components can be marked with different reference signs, such as the first thread 723 and the second thread 726.

The connector 815 has a first portion 815a in contact with the first port 811 and a second portion 815b in contact with the second port 812. The first portion 815a is a circular cylinder of substantially constant inner diameters, whose internal space serves as a fluid channel. The first portion 815a is mounted on the first port 811 such that it is placed on the annular body 825 to connect its fluid channel with the first fluid channel 721.

The first portion 815a includes a body 831 and a protrusion 832. The body 831 is a circular cylinder, which is placed on the inner periphery of the annular body 825 when the first portion 815a is mounted on the first port 811. The protrusion 832 axially protrudes from an axial end (nearer to the first fluid device 701) of the body 831.

The protrusion 832 is a circular ring with a slope 835 on its inner periphery. When the first portion 815a is mounted on the first port 811, the protrusion 832 presses the slope 835 onto the tapered face 828 of the protrusion ring 826. The slope 835 increases in diameter to the direction in which the protrusion 832 protrudes, i.e. toward the first fluid device 701. The slope 835 extends along the whole circumference of the protrusion 832.

The connector 815 has a shape symmetric with respect to the virtual center plane 848, which is perpendicular to the axial direction of the connector 815 and located at the axial center of the connector 815. Accordingly, the second portion 815b has substantially the same shape as the first portion 815a.

The fitting assembly, like one according to the first embodiment of the third invention, can reduce space for installation of the first and second fluid devices 701 and 702 to connect with each other to allow fluid to flow between each other. During connection between the first and second fluid devices 701 and 702, the connector 815 forms the first sealing portion 821 and the second sealing portion 822. The connector 815 presses the slope 835 of the first portion 815a onto the tapered face 828 of the first port 811 and presses the slope 835 of the second portion 815b onto the tapered face 828 of the second port 812.

Thus, the fitting assembly can prevent fluid leakage from the junction of the first and second fluid devices 701 and 702 and achieve short-distance connection between the first and second fluid devices 701 and 702 without any member such as a tube.

FIG. 27 is a cross-sectional view of a fitting assembly for fluid device according to a third embodiment of the third invention. As shown in FIG. 27, the fitting assembly differs from one according to the first embodiment of the third invention in the following configuration: a first sealing portion 861 that seals a gap between the first port 851 and the connector 855; and a second sealing portion 862 that seals a gap between the second port 852 and the connector 855.

The first port 851 is installed on the first fluid device 701 and integrated with the casing 735 of the first fluid device 701. The outer periphery of the first port 851 has a first thread 723 extending in the axial direction of the first port 851. The first thread is an external thread.

The first port 851 has an annular body 865 and a protrusion 866. The annular body 865 is a circular cylinder with a step on its inner periphery. The annular body 865 is located around the opening of the first fluid channel 721 in the casing 735 and protrude to the outside of the casing 735.

The annular body 865 has a first annular portion 865a on the first axial side (i.e. the side nearer to the opening of the first port 851) of the step 867. The first annular portion 865a allows a portion of the connector 855 to enter the first annular portion 865a. When receiving the portion of the connector 855, the first annular portion 865a closely contacts substantially the whole outer periphery of the portion of the connector 855.

The annular potion 865 has a second annular portion 865b on the second axial side (i.e. the side nearer to the first fluid device 701) of the step 867. The second annular portion 865b has substantially the same inner diameter as the first fluid channel 721 and the connector 855. The second annular portion 865b is disposed between the first fluid device 701 and the connector 855 to connect the first fluid channel 721 with the internal space 878 of the connector 855 so that the first port 851 connects the first fluid device 701 with the connector 855 to allow fluid to flow between them.

The protrusion 866 is a ring to protrude from the first annular portion 865a to the first axial direction of the annular body 865. The inner periphery of the protrusion 866 has a slope 868, which increases in diameter from the annular body 865 to the tip end of the protrusion 866 (i.e. toward the opening of the first port 851). The slope 868 extends along the whole circumference of the protrusion 866.

The second port 852 is a reflected shape of the first port 851 with respect to the virtual center plane 898 and has substantially the same shape as the first port 851.

The connector 855 has a first portion 855*a* in contact with the first port 851 and a second portion 855*b* in contact with the second port 852. The first portion 855*a* is a circular cylinder of substantially constant inner diameters, whose internal space serves as a fluid channel. The first portion 855*a* is placed on the annular body 865 and mounted on the first port 851, and thereby, it connects its internal space 878, which serves as the fluid channel, with the first fluid channel 721.

The first portion 855*a* has a body 871 and a protrusion 872. The body 871 is a circular cylinder, which is placed on the annular body 865 such that its whole circumference is surrounded by the annular body 865 when the first portion 855*a* is mounted on the first port 851. The protrusion 872 protrudes from an end of the body 871 (i.e. an axial intermediate portion of the connector 855) to the radial outside of the connector 855.

The protrusion 872 is a circular ring with a tapered face 875 on its outer periphery. When the first portion 855*a* is mounted on the first port 851, the protrusion 872 presses the tapered face 875 onto the slope 868 of the protrusion 866. The tapered face 875 increases in diameter from the annular body 865 to its axial outside. The tapered face 875 extends along the whole circumference of the protrusion 872.

The connector 855 has a shape symmetric with respect to the virtual center plane 898, which is perpendicular to the axial direction of the connector 855 and located at the axial center of the connector 855. Accordingly, the second portion 855*b* has substantially the same shape as the first portion 855*a*.

During connection between the first and second fluid devices 701 and 702, the connector 855 forms the first sealing portion 861 and the second sealing portion 862. The connector 855 presses the tapered face 875 of the first portion 855*a* onto the slope 868 of the first port 851 and presses the tapered face 875 of the second portion 855*b* onto the slope 868 of the second port 852. This can prevent fluid leakage from the junction of the first and second fluid devices 701 and 702 and achieve short-distance connection between the first and second fluid device 701 and 702 without any member such as a tube.

The fitting assembly, like one according to the first embodiment of the third invention, can reduce space for installation of the first and second fluid devices 701 and 702 connected with each other to allow fluid to flow between each other.

FIG. 28 is a cross-sectional view of a fitting assembly for fluid device according to a fourth embodiment of the third invention. As shown in FIG. 28, the fitting assembly differs from one according to the first embodiment of the third invention in the following configuration: a first sealing portion 921 that seals a gap between the first port 911 and the connector 915; and a second sealing portion 922 that seals a gap between the second port 912 and the connector 915.

The first port 911 is installed on the first fluid device 701 and integrated with the casing 735 of the first fluid device 701. The first port 911 has an outer sleeve 925 and an inner sleeve 926. The outer sleeve 925 is a circular cylinder of substantially constant inner diameters, which is placed around the opening of the first fluid channel 721 in the casing 735 to protrude to the outside of the casing 735.

The outer sleeve 925 allows a portion of connect 915 to enter the tip end (i.e. the first axial end) of the outer sleeve 925. When the outer sleeve 925 receives the portion of the connector 915, there is substantially no gap between the outer sleeve 925 and the portion of the connector 915. The outer periphery of the outer sleeve 925 has a first thread 723 extending along the axial direction of the outer sleeve 925. The first thread 723 is an external thread.

The inner sleeve 926 is a circular cylinder of substantially constant outer diameters smaller than the inner diameter of the outer sleeve 925. The inner sleeve 926 is located near the fluid channel 721 in the casing 735 to protrude to the direction in which the outer sleeve 925 protrudes, i.e. to the first axial direction of the first port 911. The inner sleeve 926 is disposed inside the outer sleeve 925 and separated by a radial distance from the outer sleeve 925.

The tip end of the inner sleeve 926 is located farther from the first or second fluid device 701 or 702 than the tip end of the outer sleeve 925. In other words, the inner sleeve 926 protrudes from the casing 735 to a distance longer than the outer sleeve 925. Thus, the first port 911 has a twofold-annular structure at an axial intermediate portion of the outer sleeve 925.

The inner sleeve 926 has substantially the same inner diameter as the first fluid channel 721 and the connector 915. The inner sleeve 926 is disposed between the first fluid device 701 and the connector 915 to connect the first fluid channel 721 with the internal space of the connector 915. The first port 911 connects the first fluid device 701 with the connector 915 to allow fluid to flow between them.

The tip end of the inner sleeve 926 is tapered in the direction in which the inner sleeve 926 protrudes. The outer periphery of the tip end of the inner sleeve 926 has a tapered face 928, which reduces in diameter to the direction in which the inner sleeve 926 protrudes, i.e. to the first axial direction of the first port 911, or toward the virtual central plane 948. The tapered face 928 extends along the whole circumference of the tip end of the inner sleeve 926.

The second port 912 has substantially the same shape as the first port 911.

The connector 915 has a first portion 915*a* in contact with the first port 911 and a second portion 915*b* in contact with the second port 912. The first portion 915*a* is a circular cylinder, whose internal space serves as a fluid channel. The first portion 915*a* is mounted on the first port 911 such that it is placed on the inner sleeve 926, and thus, it connects its fluid channel with the first fluid channel 721.

The first portion 915*a* includes a body 931 and a protrusion 932. The body 931 is a circular cylinder. When the first portion 915*a* is mounted on the first port 911, the body 931 is placed on the outer periphery of the inner sleeve 926. The protrusion 932 protrudes from a first axial end of the body 931 (i.e. from an axial intermediate portion of the connector 915) to the radial inside of the connector 915.

The protrusion 932 is a circular ring with a slope 935 on its inner periphery. When the first portion 915*a* is mounted on the first port 911, the protrusion 932 presses the slope 935 onto the tapered face 928 of the inner sleeve 926. The slope 935 increases in diameter from the virtual center plane 948 toward the first or second fluid device 701 or 702. The slope 935 extends along the whole circumference of the protrusion 932.

The connector 915 has a shape symmetric with respect to the virtual center plane 948, which is perpendicular to the axial direction of the connector 915 and located at the axial center of the connector 915. Accordingly, the second portion 915b has substantially the same shape as the first portion 915a.

During connection between the first and second fluid devices 701 and 702, the connector 915 forms the first sealing portion 921 and the second sealing portion 922. The connector 915 presses the slope 935 of the first portion 915a onto the tapered face 928 of the first port 911 and presses the slope 935 of the second portion 915b onto the tapered face 928 of the second port 912. This can prevent fluid leakage from the junction of the first and second fluid devices 701 and 702 and achieve short-distance connection between the first and second fluid device 701 and 702 without any member such as a tube.

The fitting assembly, like one according to the first embodiment of the third invention, can reduce space for installation of the first and second fluid devices 701 and 702 connected with each other to allow fluid to flow between each other.

In view of the explanation described above, the invention can obviously have variations and modifications. Accordingly, it should be understood that the invention can have embodiments other than those in the description within the scope of the claims attached to the description.

LIST OF REFERENCE SYMBOLS 1 first fluid device, 2 second fluid device, 11 first port, 12 second port, 13 first annular member, 14 second annular member, 15 connector, 21 first fluid channel, 25 second fluid channel, 53 first coupler, 54 second coupler, 71 first body, 72 first hook, 76 second body, 77 second hook, 111 first port, 112 second port, 115 connector, 151 first port, 152 second port, 155 connector, 211 first port, 212 second port, 215 connector, 271 third body, 272 first protrusion, 273 concave wall, 281 fourth body, 282 second protrusion, 283 convex wall, 321 fifth body, 322 third protrusion, 323 third hook, 331 sixth body, 332 fourth protrusion, 333 fourth hook, 401 first fluid device, 402 second fluid device, 411 first port, 412 second port, 413 first annular member, 414 second annular member, 415 connector, 416 securing member, 421 first fluid channel, 425 second fluid channel, 488 extending portion, 496 securing member, 511 first port, 512 second port, 515 connector, 551 first port, 552 second port, 555 connector, 611 first port, 612 second port, 615 connector, 663 first annular member, 664 second annular member, 666 securing member, 701 first fluid device, 702 second fluid device, 711 first port, 712 second port, 713 first annular member, 714 second annular member, 715 connector, 721 first fluid channel, 723 first thread, 725 second fluid channel, 726 second thread, 728 third thread, 729 fourth thread, 753 first coupler, 754 second coupler, 756 fifth thread, 757 sixth thread, 788 extending portion, 811 first port, 812 second port, 815 connector, 851 first port, 852 second port, 855 connector, 911 first port, 912 second port, 915 connector.

What is claimed is:

1. A fitting assembly for fluid device connecting a first fluid device with a second fluid device, comprising:

a first port being annular, integrated with a casing of the first fluid device as a single piece so that the first port cannot rotate independently of the casing of the first fluid device, connected with a first fluid channel of the first fluid device, and an outer periphery of the first port including a first thread;

a second port being annular, integrated with a casing of the second fluid device as a single piece so that the second port cannot rotate independently of the casing of the second fluid device, connected with a second fluid channel of the second fluid device, and an outer periphery of the second port including a second thread;

a first annular member installed at the first port, an inner periphery of the first annular member including a third thread configured to engage the first thread, the first annular member including
a first body fixed to the first port by the third thread engaged with the first thread, and
a first hook protruding axially from an axial end of the first body;

a second annular member installed at the second port, an inner periphery of the second annular member including a fourth thread configured to engage the second thread, the second annular member including
a second body fixed to the second port by the fourth thread engaged with the second thread, and
a second hook protruding axially from an axial end of the second body; and a connector installed between the first port and the second port, sealing a gap between the connector and the first port, and sealing a gap between the connector and the second port, wherein at least one of the first hook and the second hook is radially bendable, and circumferentially angular ranges of the first hook and the second hook around a common axis overlap each other regardless of what angle the first annular member rotates with respect to the second annular member around the common axis, and when the first annular member is separated from and coaxially approaches the second annular member, one of the first hook and the second hook pushes away the other of the first hook and the second hook radially, and then the one of the first hook and the second hook is engaged with the other to prevent the first annular member and the second annular member from separating from each other.

2. The fitting assembly according to claim 1, wherein: the first port has the same shape as the second port; and the first annular member has the same shape as the second annular member.

3. The fitting assembly according to claim 1, wherein the first port and the second port are arranged coaxially and connected with each other only through the connector.

4. The fitting assembly according to claim 1, wherein the connector includes an extending portion that is placed between the first port and the second port and separated from both the first port and the second port, and
an outer diameter of the extending portion is larger than outer diameters of axial ends of the first port and the second port, the axial ends facing each other.

* * * * *